(12) United States Patent
Lundberg et al.

(10) Patent No.: US 8,892,419 B2
(45) Date of Patent: *Nov. 18, 2014

(54) SYSTEM AND METHODS FOR SEMIAUTOMATIC GENERATION AND TUNING OF NATURAL LANGUAGE INTERACTION APPLICATIONS

(71) Applicant: Artificial Solutions Iberia SL, Barcelona (ES)

(72) Inventors: Sonja Petrovic Lundberg, Saltsjöbaden (SE); Eric Aili, Bandhagen (SE); Andreas Wieweg, Stockholm (SE); Rebecca Jonsson, Barcelona (ES); David Hjelm, Bagarmossen (SE)

(73) Assignee: Artificial Solutions Iberia SL (ES)

( * ) Notice: Subject to any disclaimer, the term of this patent is extended or adjusted under 35 U.S.C. 154(b) by 38 days.

This patent is subject to a terminal disclaimer.

(21) Appl. No.: 13/731,091

(22) Filed: Dec. 30, 2012

(65) Prior Publication Data

US 2013/0268260 A1    Oct. 10, 2013

Related U.S. Application Data

(63) Continuation-in-part of application No. 13/565,790, filed on Aug. 2, 2012, now Pat. No. 8,346,563.

(60) Provisional application No. 61/622,381, filed on Apr. 10, 2012.

(51) Int. Cl.
*G06F 17/20* (2006.01)

(52) U.S. Cl.
USPC .................. 704/8; 704/270; 704/9; 704/257

(58) Field of Classification Search
USPC .............. 704/1–10, 251, 255, 257, 231, 275, 704/270, 270.1; 706/62; 714/48
See application file for complete search history.

(56) References Cited

U.S. PATENT DOCUMENTS

| | | | |
|---|---|---|---|
| 6,606,598 B1 * | 8/2003 | Holthouse et al. ............ 704/275 |
| 7,835,911 B2 | 11/2010 | Balchandran et al. |
| 8,495,002 B2 * | 7/2013 | Nelken et al. ................... 706/62 |
| 2003/0204791 A1 * | 10/2003 | Helgren et al. ................. 714/48 |
| 2010/0235167 A1 * | 9/2010 | Bourdon ....................... 704/231 |

* cited by examiner

*Primary Examiner* — Huyen X. Vo
(74) *Attorney, Agent, or Firm* — Galvin Patent Law LLC; Brian R. Galvin

(57) ABSTRACT

A system for supervised automatic code generation and tuning for natural language interaction applications, comprising a build environment comprising a developer user interface, automated coding tools, automated testing tools, and automated optimization tools, and an analytics framework software module. Text samples are imported into the build environment and automated clustering is performed to assign them to a plurality of input groups, each input group comprising a plurality of semantically related inputs. Language recognition rules are generated by automated coding tools. Automated testing tools carry out automated testing of language recognition rules and generate recommendations for tuning language recognition rules. The analytics framework performs analysis of interaction log files to identify problems in a candidate natural language interaction application. Optimizations to the candidate natural language interaction application are carried out and an optimized natural language interaction application is deployed into production and stored in the solution data repository.

2 Claims, 40 Drawing Sheets

Fig. 14

SYSTEM AND METHODS FOR SEMIAUTOMATIC GENERATION AND TUNING OF NATURAL LANGUAGE INTERACTION APPLICATIONS

CROSS-REFERENCE TO RELATED APPLICATIONS

The instant application is a continuation-in-part of the jointly-owned U.S. patent application Ser. No. 13/565,790, titled "SYSTEM AND METHODS FOR DELIVERING ADVANCED NATURAL LANGUAGE INTERACTION APPLICATIONS", filed on Aug. 2, 2012, the entire specification of which is hereby incorporated by reference. This application also claims priority to U.S. provisional patent application Ser. No. 61/622,381, titled "SYSTEM AND METHOD FOR DEVELOPING A VIRTUAL ASSISTANT", which was filed on Apr. 10, 2012, the entire specification of which is incorporated herein by reference.

BACKGROUND OF THE INVENTION

1. Field of the Invention

The invention relates to the field of artificial intelligence, and more particularly to the field of natural language interaction-based applications, such as virtual assistants.

2. Discussion of the State of the Art

Virtual assistants are an example of a class of software applications, referred to herein as natural language interaction applications that use natural language to interact with a human user. With respect to virtual assistants in particular, these applications perform functions similar to those provided by human assistants, in that they can engage in conversations with their users in order to for example provide information, carry out routine tasks, or perform other operations as required. Many virtual assistants have been used in association with web sites, with these virtual assistants often featuring the use of graphical images or avatars to simulate the experience of interacting with a human being.

While some natural language interaction applications known in the art may possess rudimentary natural language understanding capabilities, in reality most such applications, and particularly most virtual assistants known in the art, are tightly scripted applications that carry out a limited range of activities. While scripted agents have proven useful in many online scenarios, their acceptance has generally been limited because, when users are restricted in their ways of expressing themselves in natural language, the communication language is not natural. Any notion of the virtual assistant's behaving like a real assistant disappears because too much effort is demanded of the user when the user is expected to know precisely what to say or what to do in order to achieve her goals. Thus there is a distinct need in the art for interpreting fluid and freely expressed natural language in various applications, for example by virtual assistants. This challenge is exacerbated by the fact that, even when equipped with rudimentary natural language interpretation, natural language interaction applications such as virtual assistants that seem to only "know" a small number of facts and who only "talk about" a very limited range of subjects (such as appointment management) do not seem very realistic to humans, who are used to being able to say things in a fluid way, shifting subjects easily and intermixing casual banter with task-oriented speech.

The use of natural language interaction applications generally, and virtual assistants more particularly, has also been hampered by the high degree of complexity and cost associated with developing and deploying virtual assistants, particularly those that have any significant degree of natural language interpretation and interaction capability. Because applications capable of even basic natural language interpretation and interaction tend to require teams of linguistic experts with technical skills to develop, the rate of adoption has been limited and the range of entities that have used virtual assistants tends to be limited to large companies that can afford the high time and cash investments needed to implement even marginal natural language interaction applications. Moreover, testing of natural language interaction applications tends to be manual, difficult for humans to oversee, and extremely time-consuming, as developers must either test the behavior of such applications manually or carry out tests with users.

Accordingly, what are needed in the art are a system and various methods that enable organizations of all sizes to efficiently develop, test, deploy, and maintain useful natural language interaction applications such as virtual assistants that are able to interpret and react properly to a wide range of natural language inputs from users, including casual off-topic conversational elements as well as task-oriented language.

What are further needed in the art, in order to decrease the development time, are a system and various methods for automatically generating and tuning code for natural language interaction applications.

SUMMARY OF THE INVENTION

Accordingly, the inventor has conceived and reduced to practice, in a preferred embodiment of the invention, various systems and methods for automatic language recognition rule generation and tuning for natural language interaction applications.

According to a preferred embodiment of the invention, a system for supervised automatic code generation and tuning for natural language interaction applications is disclosed. According to the embodiment, the system comprises a build environment comprising a developer user interface, automated coding tools, automated testing tools, and automated optimization tools, and an analytics framework software module. Text samples are assigned to input groups based on semantic content, each input group comprising semantically related inputs, and where the assignment of the plurality of text samples into input groups is performed either with automatic clustering or manually. For each input group a plurality of language recognition rules, a plurality of language objects and a plurality of flow elements are automatically generated by the plurality of the automatic coding tools. Text samples are imported into the build environment and automated clustering is performed to assign them to a plurality of input groups, each input group comprising a plurality of semantically related inputs. Language recognition rules are generated by automated coding tools. Automated testing tools carry out automated testing of language recognition rules and generate recommendations for tuning language recognition rules. The analytics framework performs analysis of interaction log files to identify problems in a candidate natural language interaction application. Optimizations to the candidate natural language interaction application are carried out and an optimized natural language interaction application is deployed into production and stored in the solution data repository.

According to another preferred embodiment of the invention, a method for semi-automatic generation and tuning of natural language interaction applications is disclosed, comprising the steps of: (a) importing, into a build environment comprising a plurality of software modules stored or operating on a computer, the plurality of software modules comprising a developer user interface, a plurality of automated coding tools, a plurality of automated testing tools, and a plurality of automated optimization tools, a plurality of text samples; (b) performing, using at least one of the developer user interface and the plurality of automated coding tools, automated clustering based on semantic content on the plurality of text samples to assign at least a substantial portion of the plurality of text samples to a plurality of input groups, each input group comprising a plurality of semantically related inputs; (c) generating, using at least one of the plurality of automated coding tools, a plurality of language recognition rules for each of the plurality of input groups; (d) performing, using at least one of the plurality of automated testing tools, automated testing of language recognition rules generated in step (c); (e) automatically generating, based on results obtained in step (d), a plurality of recommendations for tuning or correcting language recognition rules; (f) providing the plurality of recommendations to a developer via the developer user interface; (g) deploying a candidate natural language interaction application to a plurality of users; (h) delivering log files of natural language interaction sessions of the plurality of users to an analytics framework software module operating on a server computer for analysis; (i) performing analysis, using the analytics framework software module, of the log files to identify problems in the candidate natural language interaction application; (j) carrying out, using the plurality of optimization tools, a plurality of optimizations to the candidate natural language interaction application; and (k) deploying an optimized natural language interaction application into production.

BRIEF DESCRIPTION OF THE DRAWING FIGURES

The accompanying drawings illustrate several embodiments of the invention, and together with the description, serve to explain the principles of the invention according to the embodiments. One skilled in the art will recognize that the particular embodiments illustrated in the drawings are merely exemplary, and are not intended to limit the scope of the present invention.

FIG. 14 is a diagram illustrating an exemplary equivalence between the two complex language recognition rules, according to an embodiment of the invention.

DETAILED DESCRIPTION

Figure 1:
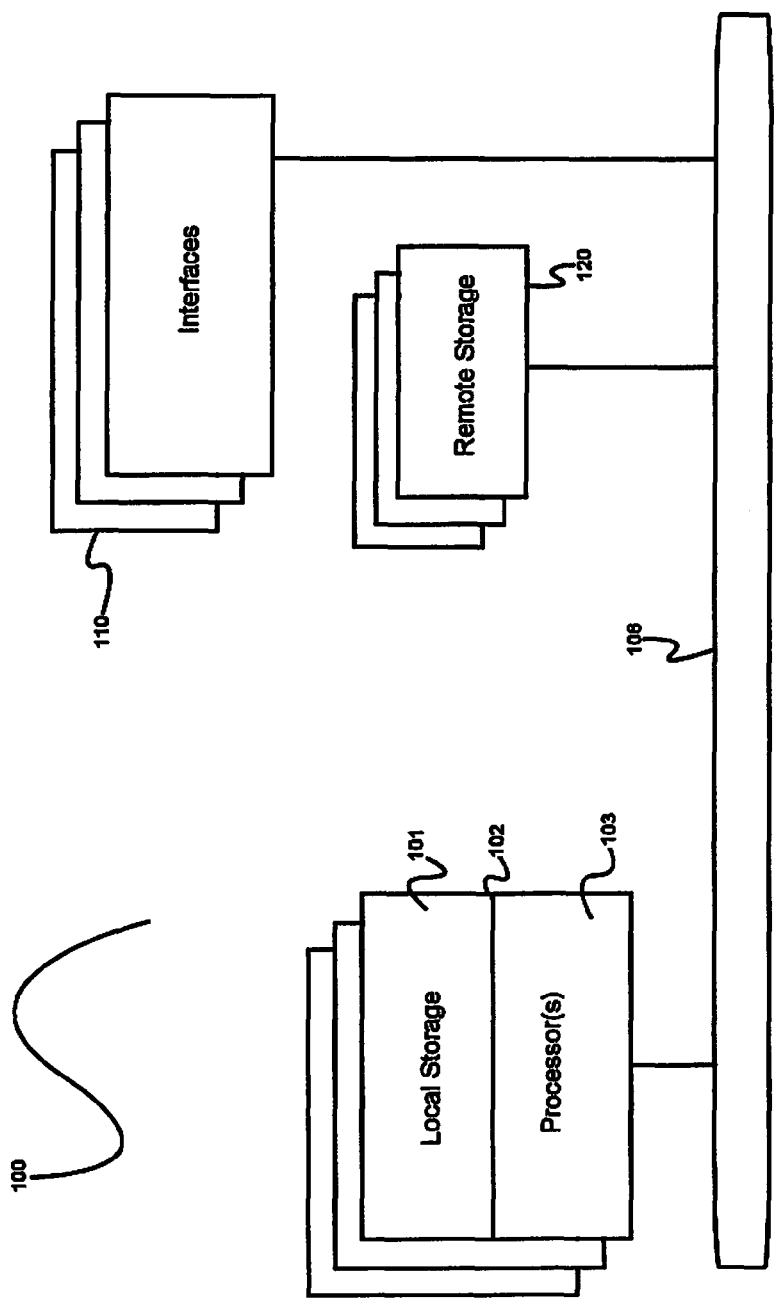
FIG. 1 is a block diagram illustrating an exemplary hardware architecture of a computing device used in an embodiment of the invention.

The inventor has conceived, and reduced to practice, various systems and methods for supervised automatic code generation and tuning for natural language interaction applications.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, "virtual assistant" means a software, hardware, or hybrid hardware/software application that provides assistance to humans analogous to that provided by human assistants, generally using an intuitive user interface, such as one that allows a user to express her needs in natural language.

As used herein, "natural language interpretation" means interpretation, by a machine, of one or a series of utterances made by a human user speaking or writing naturally; in some cases "natural language" may be supplemented by gestural, haptic, or other input combined with natural language input (for example, saying "move this here" while pointing or clicking on an object and a later a location). That is, a "natural language interpreter" generally does not require users to format their requests in simple, fixed patterns (such as a program might be required to do, as for example when invoking a web service or an application programming interface (API)).

As used herein, a "dialog" is a conversational exchange between two or more participants consisting of a generally unstructured sequence of natural language contributions in the form of requests, responses, statements and the like. A dialog is an interaction sequence that actually occurs (i.e., in run-time) during a conversation exchange between a user and a natural language system.

As used herein, a "flow" is a logical task unit comprising a set of related interaction steps required (and preconfigured) in order to perform a task. Typically a flow may comprise one or more transition conditions and operative nodes. A flow is typically defined in a natural language system as a series of predefined steps to perform when some triggering condition is satisfied.

As used herein, an "instructional path" is a sequence of instructions from one or more flows that were invoked or executed during the delivery of a dialog by a natural language system. In effect, an instructional path is the realization of one or more flows that occurs in an actual conversation (or dialog) between a user and a natural language system; it represents the sequence of decisions (or instructions) taken in support of natural language conversation (whereas the corresponding dialog is the actual sequence of what was "said" during the conversation by the parties involved, rather than why it was said).

As used herein, a "natural language interaction system" or a "natural language system" is a computer-based system capable of interacting via dialogs with one or more users using natural language (perhaps augmented by haptics, gestures, or other nonverbal means). Natural language systems carry out their function using dialogs, which can be thought of also as the actual, as executed, sequence of interaction steps between a user and a natural language system. A natural language system may participate in a dialog, by following the instructional steps of flows.

As used herein, a "language object" means an abstract representation of a logical unit of human linguistic expression that has meaning and is suitable for processing by automated systems such as virtual assistants. Language objects, in their simplest form, are represented as single words that represent a plurality of variants of a single common meaning, including inflectional variants and variants connected by synonymy. That is, generally a language object represents all variants and synonyms of the core word that represents it, and language objects may contain grammatical variants of words as well (such as verb tenses, contractions, and so forth).

As used herein, "script" means an executable sequence of instructions, generally stored (or at least rendered for execution) as plain text, which can be executed by an appropriate script interpreter. Scripts may be written in any scripting language known in the art, such as Perl, Python, PHP, Ruby, Groovy, and the like, or in any similar scripting language including proprietary scripting languages. As described variously herein, scripts generally are executed upon occurrence of specific events, such as initiation or termination of a user interaction session, or the triggering of a business rule such as "execute the following script if the number of active sessions exceed a configured number". Scripts can be nodes in flows (in which case they are referred to as "script nodes").

As used herein, "request" or "question" means a user-supplied or automatically supplied input to a natural language interaction-based system (as opposed to a system-supplied output).

As used herein, "response" means a system-supplied output from a natural language interaction system (as opposed to a user-supplied or automatically supplied input).

As used herein, "condition" means a rule or logical expression used for interpreting natural language utterances that, if satisfied, will allow for execution of one or more actions or will generate one or more effects. There are several types of conditions envisioned according to the invention, comprising for example: language recognition rules, skip conditions and transition conditions.

As used herein, a "language recognition rule" is a specific type of condition built up from language objects and used for capturing natural language expressions. For example, a language recognition rule can be used to interpret or capture the intention of a user request.

As used herein, "trigger" or a "flow trigger" is a construct which holds a condition, and which makes the system activate and start executing a flow if the condition is fulfilled.

As used herein, "listener" means is a rule construct with a conditional part and an operational part. When the conditional part is fulfilled, the operational part is invoked or executed, whereupon it updates current state based on information present in the current state and in the natural language input (the user request). Listeners may be configured to operate on a global level, on a flow level, or on a transition level, and they are generally evaluated in that order.

As used herein, "transition" or "transition condition" means a condition that determines whether the system should pass a transition to enter a new instructive step or process, a node (or a new transition). Transition may be input consuming (requires user input) or non-input consuming (does not require user input). Transitions may comprise one or more conditions and transitions can follow each other directly.

As used herein, "skip condition" means a condition that is verified prior to executing an instructive step (i.e., entering a node, for example of a flow). If the condition is met (e.g. some values have already been set previous in the system), the system will skip executing the instructional step and will continue as if it has already been executed.

As used herein, "small talk" means generally off-topic conversation elements that may be used to respond to user request. For example, if, during a flow devoted to making an airline reservation, a user asks "do you like to fly yourself?" a preprogrammed response (or a random or other selection from a plurality of possible responses) may be invoked which causes a response such as "I never fly myself, because I live in a machine!".

As used herein, "safety net" means a special flow type which is invoked when a user request fails to satisfy any condition (i.e., no matches were found); it is used to ensure that some form of response is made, after which generally the last active flow is resumed where it left off.

As used herein, "lemma" means a word form chosen to represent a substantially complete set of inflectional variants of a given word. A lemma is typically the canonical or dictionary head form of a word, e.g., the nominative singular for nouns or the infinitive for verbs. The inflectional variants may be seen as possible instances of the lemma, whereas the lemma itself is an abstraction.

As used herein, an "example input" is a text sample that is used to describe, build, and test language recognition rules, triggers, and flows. Example inputs are typically obtained from text sample corpora, which are often obtained for example from logs of actual interactions between users and service representatives such as agents handling chat interactions or phone calls (which can be transcribed to generate example inputs). Typically, an example input (EI) will belong to at least one group of EIs that are related to a specific part of a natural language solution, such as a trigger and a language recognition rule (the trigger's condition). So an EI may "belong to" a specific trigger of a flow, and represents an example of what type of input should fulfill the language recognition rule of the trigger (in other words, the EI is assigned to a specific language recognition rule; often this occurs automatically because the language recognition rules was auto-generated from a set of example inputs, each of which is then assigned as a positive example input for the language recognition rule by default. Each language recognition rule (which can be linked to a trigger, language object, listener, internal flow transition or a skip condition) typically comprises four sets of assigned EIs: positive local EIs (that should match the language recognition rule when tested in isolation, but may not necessarily trigger it when tested in the context of the whole solution); negative local EIs (that should not match it); positive global EIs (that should both match and trigger it); and negative global EIs (that maybe could match it, but should never trigger it). Those sets may be empty. For example, example input "Insurance" may trigger a general language recognition rule; "Vehicle insurance" may fulfill a more specific language recognition rule; and "Car insurance" may trigger the most specific rule of the three. In this situation, the "car insurance" EI will always match the general "insurance" rule; a designer can solve the implied conflict here by setting an ordering relation that always evaluates the "car insurance" rule before the more general "insurance" rule. In that way, the more general rule is triggered only when the more specific condition isn't fulfilled. Alternatively, systems according to the invention may automatically identify conflicts (such as tangles) and propose a new ordering relation that may be reviewed by a developer.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101

(such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
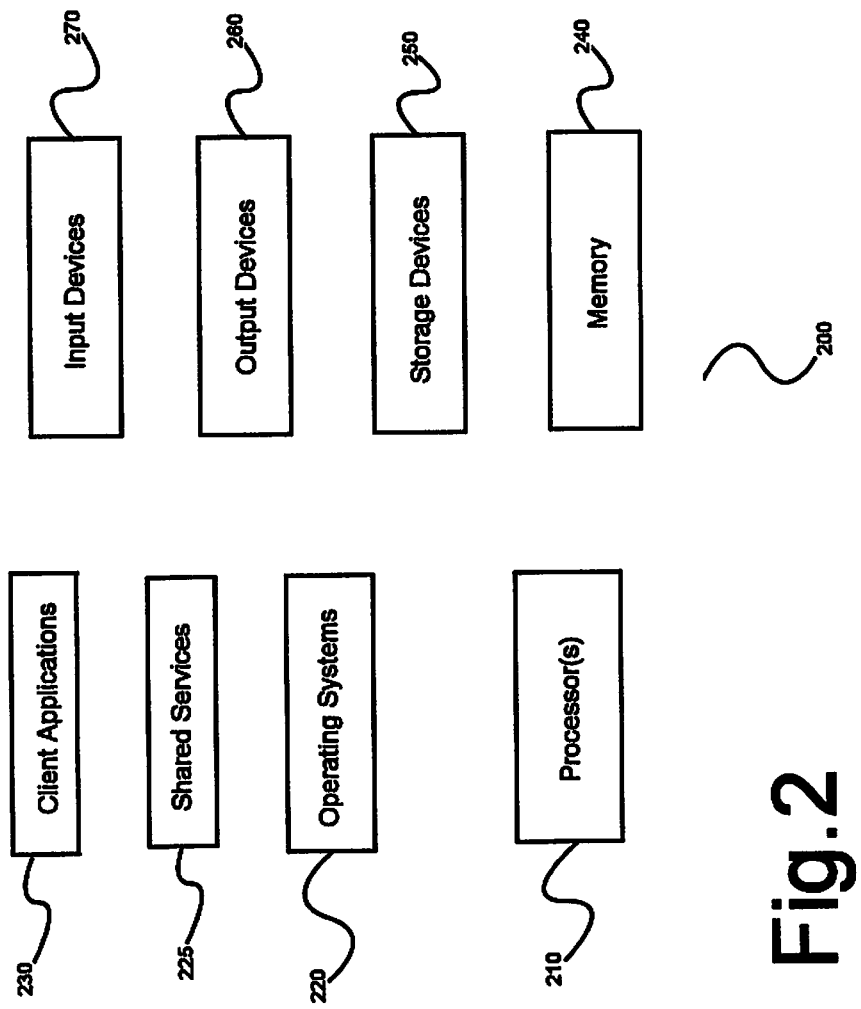
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
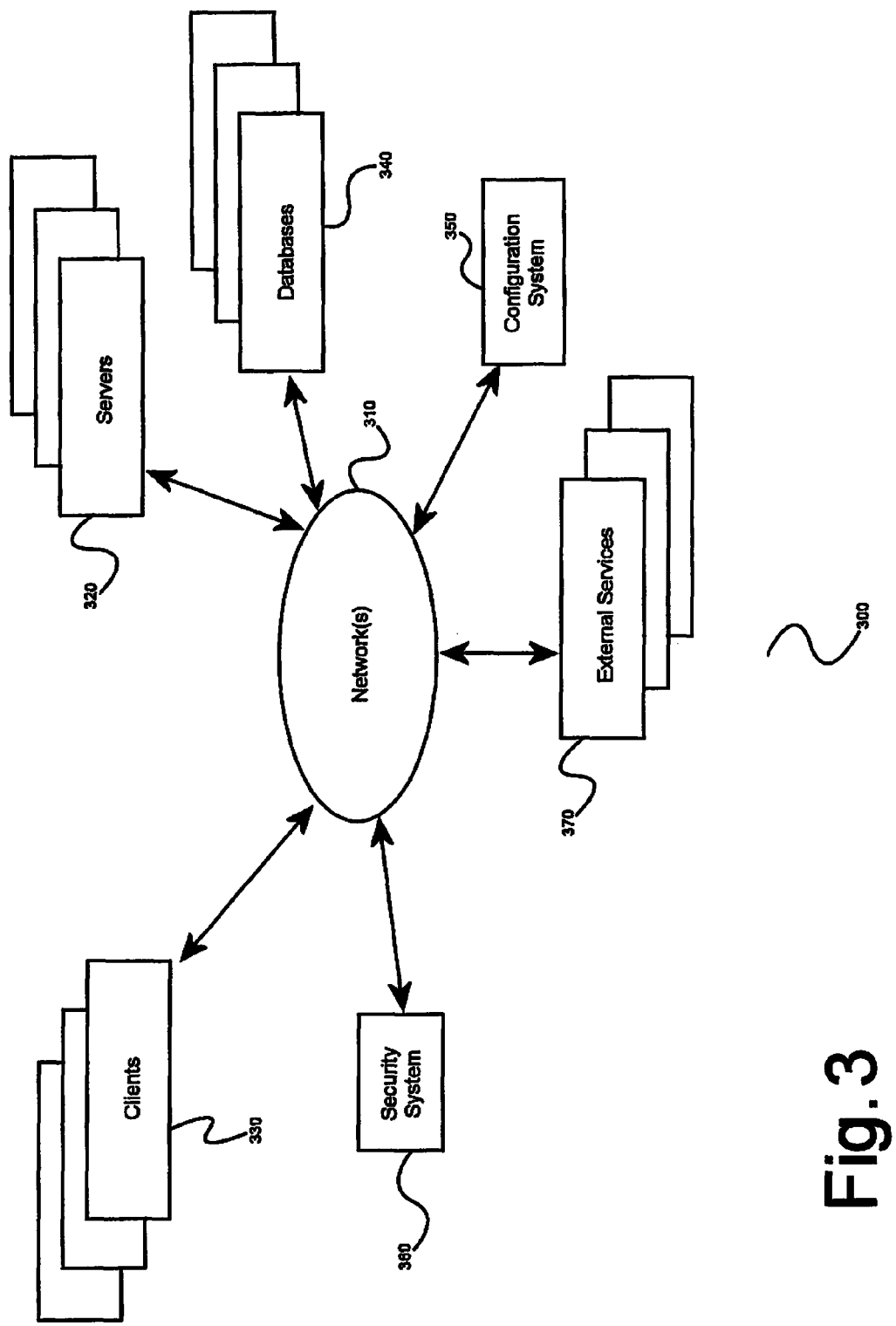
FIG. 3 is a block diagram illustrating an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

Figure 4:
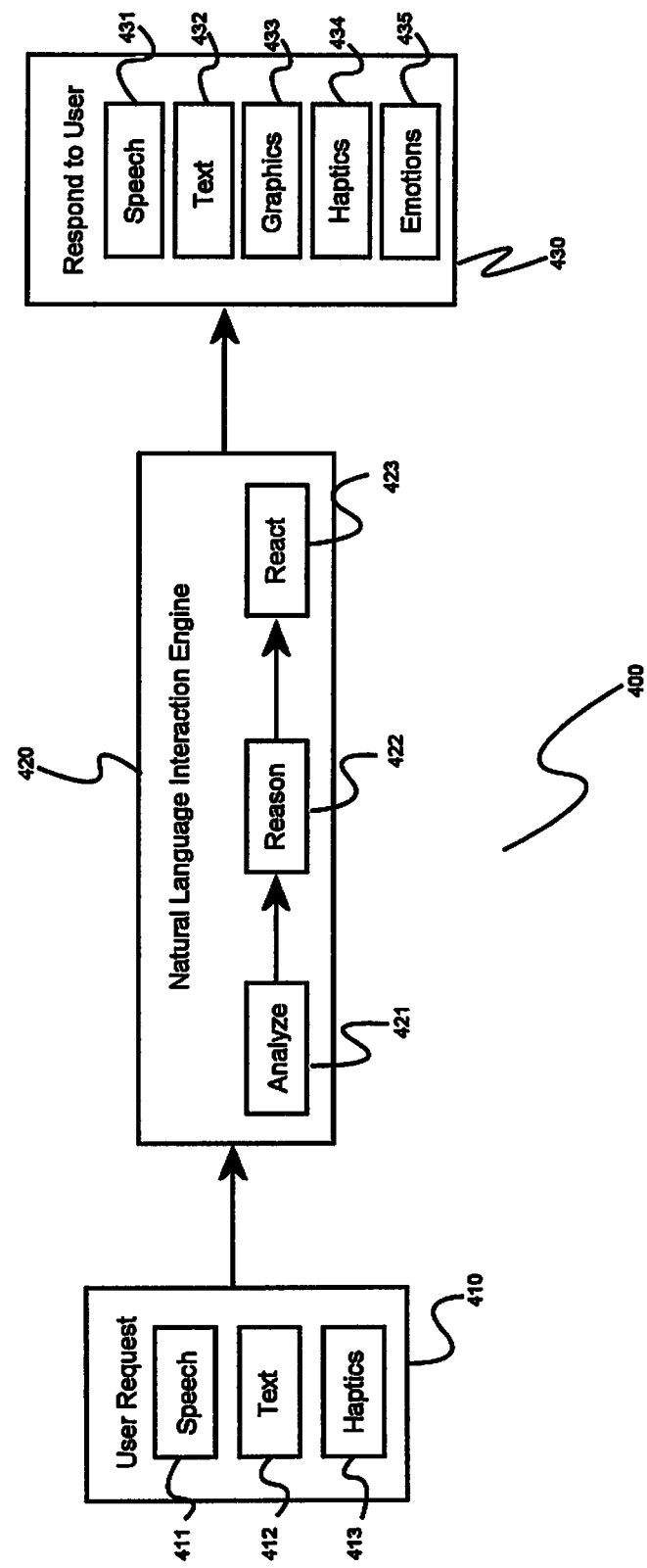
FIG. 4 is a block diagram providing a conceptual overview of a method by which human users may interact with a virtual assistant according to an embodiment of the invention

FIG. 4 is a block diagram providing a conceptual overview of a method 400 by which human users may interact with a natural language interaction application such as a virtual assistant, according to an embodiment of the invention. According to the embodiment, user input or user request 410 is provided to a natural language interaction engine 420, which attempts to interpret the intention of the user request 410 and construct one or more appropriate responses to request 410 and provides any resulting responses 430 to user queries (or, analogously, responses or reactions to requests, for example when a virtual system does something as a result of being requested to do it, such as filling in a form or scheduling a meeting) using those constructed responses. Requests 410 to natural language interaction engine 420 may be made using any of a number of user interface means known in the art, including but not limited to use of text-based requests 412 (for instance, generated by typing a question or command into a text entry field in a user interface, such as on a mobile device application, on a consumer device, on a web site, or in an email or other message), spoken requests 411 (for example, if a user speaks a command or a question into a microphone on a mobile device or consumer device, the command or question then being converted into a more computer-usable form—typically but not necessarily a text string that comprises either a full transcription of the spoken command or request, or a standardized text element that is substantially semantically related to the spoken command or request), or even haptic or other user interface means 413 (for instance, taking actions such as pressing a button on a mobile device, or shaking or orienting a mobile device in a specific way, or similar actions). Similarly, in general responses 430 may be rendered as speech 431, text 432, graphics 433 (for example, a plurality of images to allow a user to review possible hotel choices), haptics 434 (for example, touch-sensitive or mechanical buttons, slide bars, selection interface elements that allow a user to select a region or a plurality of specific elements of a screen, and so forth), or emotions 435 (for example, an avatar adapted to dynamically display different emotions as appropriate for particular responses 430). Indeed, response 430 may take any appropriate form or combination of forms (for example, in a multimodal interaction, a response might also be multimodal, comprising for example speech output and approximately simultaneous display of an appropriate image on a device screen). Responses 430 may comprise a natural language response (including for example text-based output, spoken output), or changes in one or more graphical user interface elements (for example, in response to a request, "Please tell me where I can eat near here", a list of selected restaurants might be displayed on a screen of a consumer device or a map with nearby restaurants might be shown on a mobile device), or both, for example. Responses 430 may also be actions directed by natural language interaction application 420 in response to an explicit or implicit request 410 from a user.

In order to formulate one or more appropriate responses to request 410, natural language interaction engine 420 carries out a process that may be broadly described as taking place in three steps. First, natural language interaction engine 420 analyzes 421 request 410 to determine its meaning (usually, by determining the user's intent). Analysis 421 may require preprocessing, for example to convert a spoken request 411 into a textual form suitable for further analysis (although it should be noted that, in some embodiments, audio data obtained from a spoken request 411 could be analyzed directly using one or more speech analytics technologies known in the art). Analysis 421 typically involves parsing request 410 and then analyzing its semantic content to determine one or more possible user intentions that motivated request 410. In many cases this may be straightforward (for instance, a request might be "Please set my alarm for 8 am", and accordingly the user's intent would easily be understood once the sentence was parsed), but in other cases it might be anything but straightforward (for instance, a user might say "Get out of here!" which has several possible intentions, depending on context). Thus it could be that output from analysis 421 could involve a certain amount of uncertainty, for instance in cases where an output of analysis step 421 comprises a list of possible user intents, perhaps with weights indicating their likelihood of being the user's actual intention.

Once analysis 421 is completed, natural language interaction engine 420 may undertake a reasoning step 422 to further elaborate or to better determine user intent. Interaction engine 420 may use advanced linguistic interpretation and business rules to simulate "intelligent thinking", allowing interaction engine 420 to appear to reason like a human and to determine a most appropriate way to respond to a user request 410. During this reasoning process 422, interaction engine 420 may take into account many contextual factors such as date, time, location of user, entities and facts discussed in a current or recent dialog, active flows, local context, global context, information picked up in previous dialogs, data about a user, and the like. In addition, inferences may be drawn based on data about one or more users (for example, when users do "this" they normally also want to do "that"). For example, if a user inquires about "next year's insurance premium", interaction engine 420 may understand context of "next year", but may need to seek clarification about whether the user is asking about home or motor insurance. In general, the goal of reasoning 422 is to reduce ambiguity about what a user meant in request 410, and to apply rules or other logical processing to take into account the extended context in which request 410 was made, in order to facilitate the final step of reacting 423. Once user intent is understood and relevant context has been taken into account, natural language interaction engine 420 may select and execute appropriate actions needed to react 423 to request 410. Suitable reactions may be to give an appropriate verbal, textual, visual, or haptic response, to ask for more information to disambiguate user intent (when for example disambiguation could not be carried out during reasoning step 422), to open a webpage, to play a video, to open another application, to automatically fill in a form, to invoke or update or interact with a third party service, to perform some form of multimodal output, or to execute a transaction for example by updating a database or by integrating with one or more backend or e-commerce systems. These three steps analyze 421, reason 422, and react 423) may all happen seamlessly in milliseconds with interaction engine 420 able to handle thousands of interactions simultaneously, or they may occur over an extended period of time, depending on context and the state of the device being used or its connectivity.

DETAILED DESCRIPTION OF EMBODIMENTS

Figure 5:
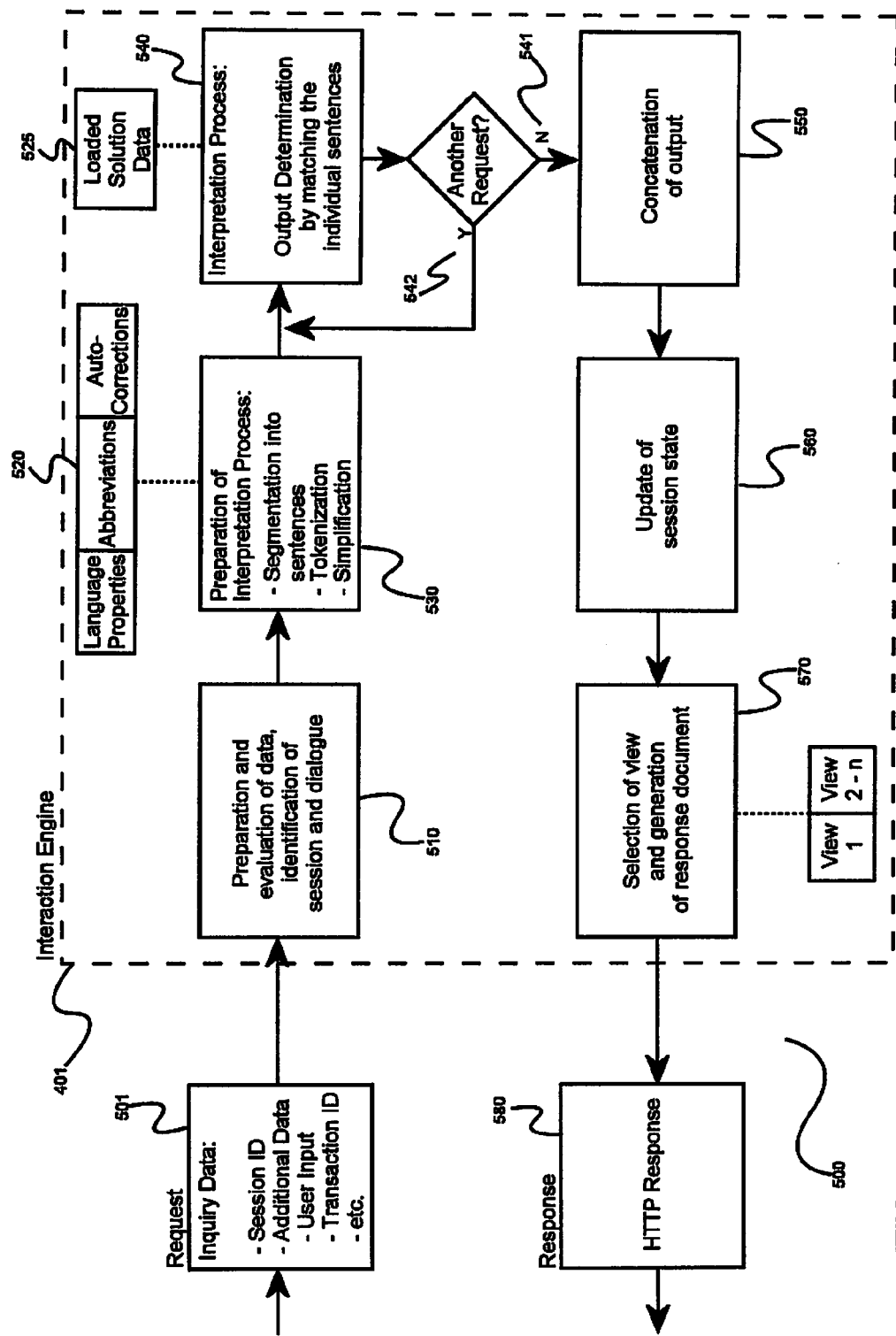
FIG. 5 is a high-level process diagram of a method for responding via a virtual assistant to user requests, according to a preferred embodiment of the invention.

FIG. 5 is a high-level process diagram of a method 500 for responding via a natural language interaction application (such as a virtual assistant) to user requests, according to a preferred embodiment of the invention. According to the embodiment, method 500 typically begins upon receipt of a request 501 from a user, the request 501 generally comprising a plurality of data elements such as a session identifier (typically but not necessarily a 32-bit or 64-bit unsigned integer) and additional request-specific data such as the actual user input provided, a transaction identifier, and any other relevant information. It should be appreciated by one having ordinary skill in the art that there are many types of request-specific data that might occur in different situations, any of which may be included in request 501 according to the invention. For example, in many cases device state data may be included in request 501, comprising data such as time of the request, physical location of a device associated with the request or of the user, a uniform resource locator (URL) corresponding to a web location from which the request was sent, and so forth. Moreover, it should be noted that, while method 500 may normally begin with the arrival of a user request 501, method 500 might also start in a number of other ways (not shown). For example, a timer or other computer-generated event may be intercepted by natural language interaction engine 420 that triggers a deferred request, represents a standard automated request, or in some other way acts in a fashion analogous to request 501, in that it signals a need for natural language interaction engine 420 to process the event and to formulate a response 580 which may be provided to a user. For instance, at a certain time a timer event might be triggered to alert a user that a scheduled calendar event is about to begin, and natural language interaction engine 420 may then formulate response 580 to notify the user in a natural way, such as by displaying or speaking a message such as, "Your meeting with Bob is scheduled to start in 10 minutes". Moreover, this simple example may even utilize advanced processing within engine 420; for example, engine 420 might take note of the facts that the scheduled meeting was supposed to occur in a specific conference room, and (based on device location data) that the user/recipient was not in a location from where it would be possible to attend the meeting in person. Engine 420 might, in such a case, instead formulate a more situationally relevant response 580 such as, "Your meeting with Bob is scheduled to be held in fifteen minutes in the Shasta Room, but it looks like you won't be able to make it. Shall I reschedule the meeting, or would you like me to contact Bob for you?" Thus whether in response to user requests 501 or some system-generated event or request, natural language interaction engine 420 may formulate an appropriate response 580 to present to its user; request 501 should be considered as exemplary of any appropriate triggering event that starts process 500.

Once a request 501 is received by interaction engine 420, in step 510 initial processing of request 501 takes place. Several possible initial processing substeps may be taken as needed, including for example (but not limited to) preparing data received in request 501 by transforming it into a form in which it can be used by further steps (for instance by transcribing spoken audio input into text form suitable for parsing), evaluating one or more data elements to determine whether there are any missing elements (and if so, attempting to retrieve those missing elements either from the author of request 501 or from a separate data source such as on-device data storage), checking to see whether the request 501 pertains to an existing interaction session (in which case its data is appended to that sessions' data store) or represents a new session (in which case new session identifier may be created, and a new session data store instantiated and populated with data from request 501), and so forth. In step 530, preparations are made to carry out an interpretation process, specifically by one or more of segmenting request 501 into sentences, tokenizing the resulting sentences (for example, by breaking them down into individual words, numerals, and other tokens), and normalization of the results and optionally formatting the processed request into a format suitable for use in interpretation process 540. Step 530 is carried out using one or more of interpretation aids 520 such as language properties (characteristics of the language in which request 501 was rendered, such as standard sentence orders, verb tenses, and the like), standard or custom abbreviations (which may in some embodiments include domain-specific abbreviation sets, such as those used in making travel arrangements), and standard or customized auto-correction settings (or both).

Once request 501 has been preprocessed in steps 510 and 530, in step 540 an interpretation process is carried out to determine whether any conditions or rules, or other artifacts in one or more loaded knowledge bases 525 are satisfied (and if more than one satisfied rule is found, choosing an appropriate rule). Interpretation is typically done one (processed) sentence at a time, so following step 530 a check is made to see if another request exists (that is, whether was there more than one logical request or sentence in request 501); if yes 542, then interpretation process 530 may be repeated with the further request; if no 541 then execution passes to step 550. In step 550, outputs generated by interpretation process 530 are concatenated if necessary (for instance, if there were two or more logical requests in request 501), and then in step 560 session state variables may be updated. For example, as a result of a request 501, one or more steps in a flow may have been accomplished, so state variables such as "current flow state", "next flow step", and "flow history" might be updated. As another example, frequently more than one flow may be instantiated at a time within a given user interaction session, for example when a user may switch between related topics naturally and each topic is the subject of one or more flows; in such situations, one flow may be activated by a request 501 and a previously active flow might be put on a flow stack until it is reactivated by a subsequent request 501 or by completion of the newly activated flow. In step 570, one or more preconfigured views 575 is selected for rendering output to the user who submitted request 501 (or another user, for example in the case where a first user's request is to notify a second user of something; in this case, such a request 501 could be considered as two requests, one requiring notification of the second user of the thing requested, and the other being notification of the first user that the desired notification of the second user was carried out and possibly whether it was responded to or acknowledged by the second user). Views 575 may be graphical user input elements, or may be some other output modality such as spoken text. Once an appropriate view has been selected, one or more response documents is prepared and sent in step 580 as a response; responses are commonly (but not necessarily) rendered via hypertext transfer protocol (HTTP) or a secure version thereof, although other output protocols are known in the art may be used according to the invention.

Figure 6:
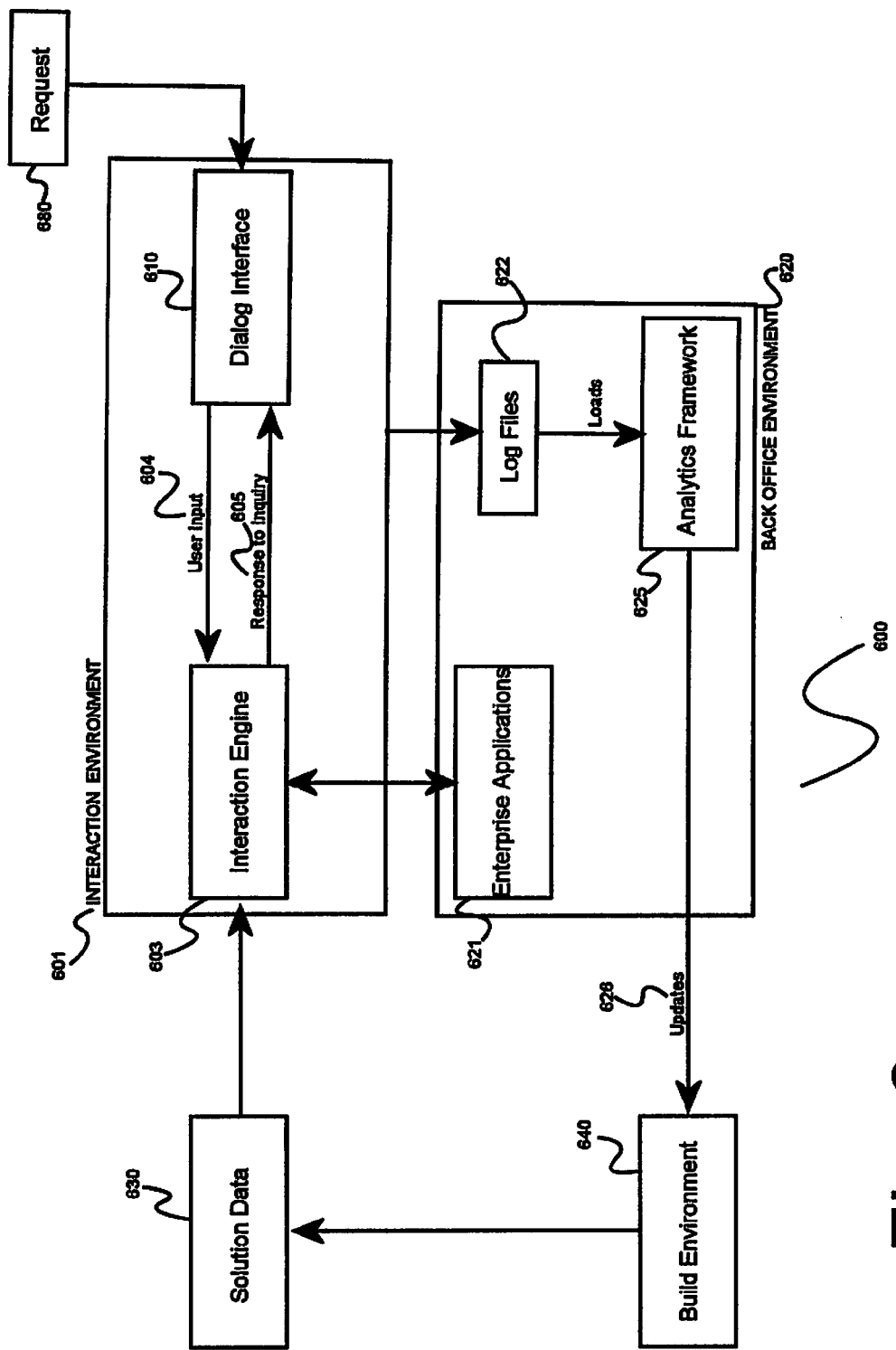
FIG. 6 is a high-level system architecture diagram of a preferred embodiment of the invention.

FIG. 6 is a block diagram illustrating a conceptual architecture of a system 400 for efficiently delivering natural language interaction applications such as virtual assistants, according to a preferred embodiment of the invention. The embodiment shown in FIG. 6 may be implemented using any of the hardware architectures described above, or using a different type of hardware architecture.

For example, according to various embodiments, at least some systems for efficiently delivering natural language interaction applications such as virtual assistants may be configured to use natural language interaction engine 420, a core component of a process 400 that manages conversations with users, creates responses from its own content base, and receives and sends data from and to external systems. Natural language interaction applications according to the invention may understand or use free-format sentences, even when grammatical or spelling errors may be present. Virtual assistants or other natural language interaction applications according to the invention may allow for change of topic or task, interruptions, initiation of subtasks, or asking of counter-questions, and then may return to a previous topic or resume a task within a conversation either on request by the user or initiated itself. Natural language interaction applications may be able to handle jargon, specialized corporate vocabulary, idioms, and slang. For example, a customer may ask their questions in a conversational style without having to go through a series of yes/no queries or standardized prompts and questions. A natural language interaction application might not provide the same response to a given request or question when provided twice, as it may for example select a context-dependent answer to a question (e.g., a different response dependent on the time of the day), and may handle deferred requests easily.

When a user submits a request 680, it is generally handled by a dialog interface 610 within interaction environment 601. Interaction engine 603 manages the execution and state of one or more flows, and manages transitions between flows as required by subsequent requests 680 (for example, when a user changes topics). Dialog interface 610 uses a process 500 such as that described at a high level with respect to FIG. 5 to process user input 604 and send it to a interaction engine 603, which carries out an interpretation process such as that briefly described above using language recognition rules from one or more solution data repositories 630 built up from one or more language objects, flows, language recognition rules, and the like. When a language recognition rule has been triggered, and interaction engine 603 has taken the appropriate actions and found one or more responses 605, these are sent back to dialog interface 610, which then updates session state and provides a response 605 to the user in an appropriate medium, channel, or mode (or multimodally), as described herein. Interaction engine 603 may commonly be integrated and interact with a back office environment 620, which may for example comprise one or more enterprise (or third party) applications 621, log files 622, and analytics frameworks 625. Enterprise applications 621 may, for example, be a customer relationship management (CRM) system, a corporate transaction database, a trouble ticket tracking system, or any other type of enterprise applications 621 known in the art. Connections between interaction engine 601 and enterprise applications 621 may be any of a number of interface means known in the art, including but not limited to web services invocations, proprietary application programming interfaces (APIs), Java remote procedure calls, and so forth. Log files 622 may be written directly to a file system, or may be processed by a log server (not shown) which collects information from interaction engine 601 and processes it (for instance by parsing raw data and compressing it into a more efficient format for storage), and may then either write log files directly to disk or add log entries in a relational database or other data storage system. As logs are loaded, either periodically, continuously, or on demand, they may be loaded into analytics framework 625, where either automated or manual analysis (or both) may be conducted. Analysis may be performed, for example, in order to identify common dialog models (that is, sequences of dialog steps or flows that occur often in interactions between humans and virtual assistants) or dialog models that tend to result in abandonment or in user's seeking help or expressing frustration with a virtual assistant; such analytical results may be helpful in improving one or more virtual assistants by identifying best and worst practices in virtual assistant dialog or flow designs, and by identifying problems with language or domain models contained in knowledge base 630. When such useful lessons are learned, they may be passed via periodic or occasional updates 626 to build environment 640, where they can be used by human natural language interface (NLI) developers to improve an existing natural language interaction application (such as a virtual assistant). In some embodiments, modifications to solution data 630 may be made automatically as a result of patterns or defects detected by analytics framework 625 (for example, if it was determined that a certain node in a flow was always abandoned because the applicable language model had an error).

In general, natural language interaction engine 601 (which for brevity may also be referred to simply as "interaction engine" 601) makes use of one or more solution data repositories 630. Solution data 630 will be described in detail below, but in general comprises one or more collections of rules and conditions relevant to a particular natural language interaction application or "solution". Solution data repositories 630 are generally prepared in a build environment 640, although in many embodiments prebuilt solution data repositories may be supplemented (using build environment 640) by addition of organization-specific or domain-specific data. For example, in preparing a "travel agent" virtual assistant using build environment 640, specific language objects (phrases, vocabularies, and so forth) may be added that are likely to be relevant in travel-related dialogs, and a domain model or ontology of one or more domains and/or subdomains related to travel and to likely adjacent subject matter domains (for example, credit card handling) may be created (or imported and edited). A knowledge base of solution data 630 is a collection of language recognition rules, conditions, flows, scripts, response rules, language objects, ontologies, or domain models.

A virtual assistant request 680 may be generated, as discussed in the previous paragraph, either by being spoken in various forms, being provided as text in various forms, being provided by haptics (clicking, pointing, gesturing, and the like), or by any combination of these. A dialog interface 610, which may be comprised as voice and, or text processing applications, turns a user input 604 into a request form interaction engine 603 understands. Language processor 603 may prepare, evaluate, interpret and identify a dialog session, use enterprise and third party applications 661 (from a back office environment 620) as deemed valuable to process; then go through a parsing and interpretation process, applying segmentation and tokenization to sentences and words, then may generate an appropriate response or perform an appropriate action 605, and send it back through a dialog interface 610 and on back to requestor 680.

As dialogs take place, logging activity 621 within a back office environment 620 captures data pertaining to one or more session events, which allows dialogs to be analyzed by an analysis framework 650 at a later time, which may provide insights into customer behavior and for possible quality and very specific structural metrics as desired.

Analysis framework 650 may publish metrics and specific dialog criteria as captured by logging and analysis, sending criteria on to a build environment 640 for possible updating and inclusion into learning for new requests. Build environment 640 may contain a large array of knowledge divided into items such as language and domain libraries, previously captured knowledge and, using coding and testing tools, create dialogs for a variety of request types. Additional knowledge tools 630, helpful to development process may contain rules for responding, various object types for a variety of requests, and information from similar request development activities, and may be available for language processor 603 as a request session develops.

Figure 7:
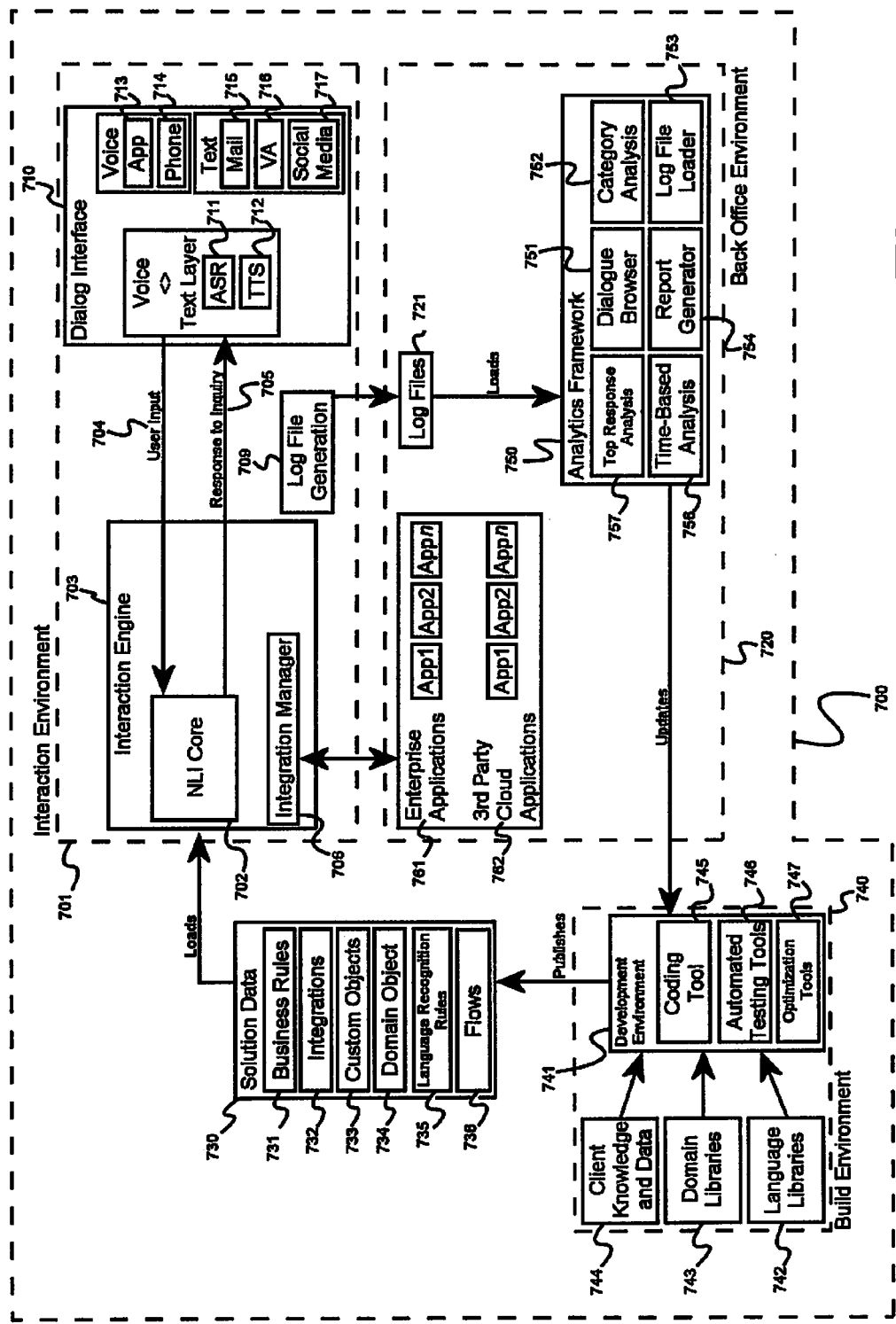
FIG. 7 is a detailed architecture diagram of a preferred embodiment of the invention.

FIG. 7 is a block diagram illustrating an exemplary arrangement of components of a system 700 for efficiently delivering natural language interaction applications according to an embodiment of the invention, showing more detail regarding the high-level conceptual architecture shown in FIG. 6. As indicated above, key elements of system 700 typically comprise a natural language interaction engine 701, one or more solution data repositories 730, a build environment 740, and a back office environment 720. Each of these may in turn be comprised of several components, in varying combinations, as will be described in detail herein.

Interaction environment 701 normally comprises a dialog interface 710 and an interaction processing core engine 703. Dialog interface 710 performs functions necessary for media-specific interactions with users. A principal role of dialog interface 710 is to receive input from a user in order that interaction engine core 703 can successfully determine a user's meaning (and the user's intent), and to provide feedback or responses back to the user. For example, when interactions are conducted using speech interfaces, interaction may be either via a phone 714 (for example when a virtual assistant is used in place of a conventional IVR application) or via a dedicated voice application 713 (for example when a user of a mobile application or a web site interacts with a virtual assistant using an application, and no phone is involved). In either case (or indeed in other cases, such as embodiments where other means of exchanging voice communications via audio signals—of which many are known in the art—are used, such as interaction with a building control virtual assistant using an intercom system), it is generally necessary to convert speech input into some form of text, and conversely to convert text output into some form of speech output (although, it should be noted, there are limited means known in the art for analyzing speech signals directly—known in the art as speech analytics technologies—and these could be used directly to infer user meaning and intent). Normally this is done by a voice-to-text conversion layer within dialog interface 710, comprising an automated speech recognition (ASR) engine 711 and a text-to-speech (TTS) engine 712. Many of each of these components are well known in the art, such as those available from Nuance™, Acapela™ Ispeech™, Google™ and other vendors; any suitable ASR and TTS engines may be used according to the invention. In some embodiments, ASR 711 and/or TTS 712 are deployed integrally to system 700 (as shown in FIG. 7), while in others they may be deployed as separate services delivered over a network such as the Internet or a telecommunications network; such external services architectures may employ ASR 711 or TTS 712 provided by one or more third party service providers. Input may also be received (and output sent) via text-based media channels such as 715, dedicated virtual assistant interfaces 716 (for instance, when a virtual assistant equipped with a graphical avatar is embedded in a web site and, when activated by a user, is interacted with directly), a social media interface 717 such as Facebook™, LinkedIn™ Twitter™, and the like, or any of a number of other text-based media channels known in the art but not shown in FIG. 7 (such as, for example, text-based interaction with a virtual assistant from within a document such as a word processing document, a spreadsheet document, or a presentation document; kiosks such as at airport check-in counters, and so forth).

Once input has been received, it is passed as input 704 to interaction engine core 703, where it is reacted to and one or more responses 705 may be generated. When responses 705 are generated and sent to dialog interface 701, they are converted (using TTS 712) to speech form or spoken output, if required, and delivered to a user via either or both of a voice application 713 or a phone 714, or if response 705 is already in textual form it is passed directly to a text-based output channel such as email 715, virtual assistant 716, social media 716, and the like. As a further example illustrating how natural language interpretation can be used to enrich multimodal user interactions, consider a combination mobile phone application that proceeds as follows. First, a user presses a button to initiate the application, which displays or plays a welcome prompt (or both) to the user. The user may say an utterance expressing her intent or goal (for example, "I would like to arrange travel to Berlin tomorrow morning.") The application may then display a selection of radio-button style choices on the screen of the mobile phone, for example comprising "Flights", "Hotel", "Car/Transport", and "Recommended". At substantially the same time, the application may speak a phrase such as, "Where would you like to start to make travel plans? Select a button or tell me what you want to do." The user and the application may, throughout the subsequent interaction, use a blend of spoken, text, and haptic interface conventions to exchange information and satisfy the user's original (and any subsequently arising) intention). Thus it can be seen that many examples of natural language interaction applications envisioned by the inventors may involve multimodal interactions comprising two or more interface modalities (such as speech, text, buttons, images, videos, vibrations, sounds, and so forth).

When input 704 is received by interaction engine core 703, it is generally first handled by an input interpretation module 707, which manages the process of handling inputs 705, making various calls to one or more services of natural language interpreter core (NLI core) 702 (which services and associated processes are described in more detail below), in order to determine one or more meanings of a user's input 704 and to infer therefrom the user's intent. That is, a goal of input interpretation module 707 is to "understand" what a user wants, in order that NLI core 702, in conjunction with input interpretation module 707, can formulate one or more appropriate responses to input 704. Once a response type, or the content of a response, is determined, output generation module 708 is tasked with creating an appropriate response 705, which can then be sent to dialog interface 710 for delivery (in an appropriate medium or via an appropriate channel) to the requesting user. In general, every time input interpretation module 707 receives and processes a user input 704, and every time output generation module 708 formulates a response 705 and sends it to dialog interface 710, log file generation module 709 generates one or more log files 721 in order to capture a history of interactions between users and natural language interaction applications. In addition, more or less detailed information pertaining to processes carried out by NLI core 702 is passed to log file generation module 709 as well, in order that not only what transpired is recorded (that is, the inputs 704 and outputs 705), but also how it was done and why (that is, a history of decisions made, rules and flows executed, variables set, and so forth in NLI core 702 is captured). NLI core 702 may, in order to process user inputs or to create responses, require access to one or more external data sources or external services; such access is provided by one or more connection APIs 706, which manage interactions between NLI core 702 (and possibly also input interpretation module 707 and output generation module 708) and external data sources and services. Such external entities may comprise a plurality of enterprise applications 761 such as customer relationship management (CRM) systems, transaction management systems, trouble ticket tracking systems, inventory management systems, and so forth (it will be appreciated by one having ordinary skill in the art that essentially any enterprise or third party applications may be interacted with using standards-based APIs or other integration technologies, and thus any such enterprise applications known in the art may be used by interaction engine 701 as needed to serve users). Such external entities may also comprise a plurality of third-party cloud-based applications 762, or any other third party services or applications accessible via public or private interfaces (whether standards-based or proprietary), subject only to findability and security constraints.

NLI core 702, when processing requests received (after preprocessing) from input interpretation module 707, uses one or more solution data repositories (or simply "solutions") 730 that it loads as required. Solutions 730 generally comprise various combinations of business rules 731, integrations 732 (that is, configuration data necessary to carry out communications via connect APIs 706 with enterprise applications 761, third party cloud applications 762, and the like), custom objects 733 (such as script objects used to encapsulate frequently used functionality), domain objects 734 (which are collections of ontologies or ontological data sets that represent knowledge about one or more subject domains such as travel, finance, heart health, furniture, and so forth), language recognition rules 735 built up from language objects (which may comprise a large number of formal models of various language elements for one or more languages; language objects will be discussed in detail below), and flows 736. These solution data 730 components in turn may be preloaded as standardized knowledge bases when a natural language interaction application is created, or they may be hand-crafted by one or more natural language interaction (NLI) developer within build environment 740 (or both; it is quite common to start with a prebuilt set of knowledge base 730 components, and then to add new components or extend the added components from within build environment 740) or part of it can be automatically generated according to the embodied invention.

Build environment 740 comprises several components, organized in a preferred embodiment into a single application 741 (sometimes referred to as a "studio"), from which an NLI developer may access client knowledge and data 744, domain libraries 743, and language libraries 742. Build environment 741 typically comprises a graphical coding tool 745 and one or more automated testing tools 746. Thus, in a typical scenario, a developer building a new natural language interaction application such as a virtual assistant would, within a coding tool 745 in build environment 741, load one or more prebuilt language libraries 742 and domain libraries 743, edit these based on available client knowledge and data 744, and then test the resulting knowledge base 730 using one or more automated (or manual) testing tools 746 in order to test the behavior of her new application prior to its use. Once satisfied with a new solution 730 (and with the associated application's behavior), the developer would publish knowledge base 730, which would then be available for NLI core 702 to load and use in handling user requests 704. A key benefit of the build environment 740 approach envisioned by the inventors is that it enables NLI developers who are not necessarily research scientists (such as computational linguists) to rapidly prototype, test, refine, and then tune natural language interaction applications for particular domains or business needs. This makes it possible to move natural language interaction application development from being an activity typical of linguistic experts with technical skills to one practiced commonly by user without technical or linguistic skills and users such as businesses (large and small) and other organizations desiring to use natural language interaction applications in production.

According to a preferred embodiment of the invention, the process just described is part of an overall closed-loop process. The loop is made "closed" by the availability of an analytics framework 750, which can be used to automatically or manually analyze natural language interaction application performance in order to eliminate poorly functioning dialog elements, improve customer satisfaction, and so forth. Analytics framework 750 generally takes as input a plurality of log files 721 generated by log file generation module 709, although in some embodiments analytics framework 750 may take input directly in real time from interaction engine 710, for example by receiving requests 704, responses 705, raw user inputs, and processed outputs to users as they occur directly from the corresponding components of interaction engine 710 (and of course diagnostic information about decision-making and operational processes occurring within interaction engine 710 could similarly be obtained as they occur). Thus the log file-driven architecture shown and discussed herein should be taken as exemplary and not limiting. In various embodiments, analytics framework may comprise one or more of a top response analysis module 757, a dialog browser 751, a category analysis module 752, a log file loader 753, a report generator 754, and a time-based analytics module 756. In any particular embodiment of the invention, some, most, or all of these components may be present within analytics framework 750; moreover, in some embodiments one or more of these components (or other analytical components known in the art such as business intelligence engines, datamarts, and the like), may be implemented as standalone components separate from analytics framework, including for example delivery as web-based or cloud-based services from a third party analytics platform provider. It should be apparent to one having ordinary skill in the art that any combination or architecture of these and other analytical components may be used according to the invention, and that the particular arrangement shown in FIG. 7 is intended to be exemplary and not limiting.

Top response analytics module 757 is a software module that computes a ranked list of responses 705 generated by interaction engine 710 to user requests 704; in many embodiments, a corresponding ranked list of requests 704 that led to a particular response 705 may be provided (often by provision of a "drill-down" capability, so that when viewing a ranked list of responses 705, a user may right-click or take some other action to see what requests 704 led to that response 705 most commonly). Responses 705 (and corresponding requests 704) may be ranked according to one of many numerical or qualitative parameters, such as most popular, most used, most often abandoned from, most often viewed, most often complained about, or any other similar ranking metric. Top response analytics module 757 may automatically generate and maintain ranked lists of responses 705, or may do so on request from an analyst or other authorized user (or both). In some embodiments, users may be allowed to specify one or more custom ranking criteria (as long as they are susceptible of measurement based on data received from interaction engine 710); such custom rankings may be conducted on an ad hoc basis, although useful rankings may be added to the last of available standard rankings, and could be added to any automated ranking processes as well, if desired.

Dialog browser 751 is a user interface element that allows an analyst or other authorized user to view (or hear) one or more interactions or dialogs between users and natural language interaction applications. Users may be allowed to request random interaction sessions, in which case one or more sessions would be displayed for viewing at a time; such a view would be useful for example to a marketing analyst who wants to "see" how users interact by randomly browsing among user experiences. Users may also select one or more sessions for viewing (or listening), based typically on any of a wide range of filters or selection criteria made available through a user interface of dialog browser 751. For example, a user could request to view all interactions with a specific user, or with a specific user/application pair, or relating to a particular subject such as a particular product or small talk, and so forth. Users may also request a specific interaction by providing a time, or a session identifier, or a customer name and a time, or any other filtering arrangement that can distinguish the desired session from all others.

Category analysis module 752 is typically a graphical user interface component that allows an analyst or other authorized user to view one or more, or all, sessions or interactions that pertain to a particular category (such as a category within a domain model, for instance by requesting to view a sampling of sessions involving furniture-related questions). Users of category analysis module 752 may be able, for example, to view all or a set of sessions (or to view aggregated numerical data pertaining to such sessions) that were about home equity loans. While viewing such a set of data or sessions, the user might be able to explore for example whether certain questions related to home equity loans are more commonly received from customers that are actually considering taking out such a loan; this might be determined, for example, by displaying columns of data about "probability of loan application being taken" and "probability of closing of loan applications taken", and allowing a user to rank sessions by one or another column in order to understand such patterns. It should be clear to one having ordinary skill in the art of data analytics that there are many ways of viewing and analyzing data of this type, any of which may be included in category analysis module 752 according to the invention.

Time-based analysis module 756 is typically a graphical user interface element that allows an analyst or other authorized user to configure, conduct, schedule, and view the results of various analyses of one or more time-based behaviors of natural language interaction applications and/or their users. For example, time-based analysis module 756 may in some embodiments be used to identify trends in user behavior, such as the emergence of new dominant questions or shifts in linguistic usage over time. Another example, likely to occur quite readily, would be the use of time-based analysis module 756 to study assimilation of new application capabilities upon their introduction in one or more natural language interaction applications. When new capabilities (for instance, new language models, improved business rules, richer interaction modality options, or expansion of domain coverage) are added to an application such as a virtual assistant, their use by those who interact with the modified natural language interaction application is likely to vary over time as more and more users become accustomed to the new capabilities; such user assimilation can be studied to learn how long to wait before expecting changes in user behavior (such knowledge would be quite useful in avoiding for example the premature termination of an experimental feature, which might occur if knowledge engineers misunderstood a normal "uptake curve" for lack of user interest). Similarly, in some embodiments time-based analysis of users' natural language inquiries may uncover emerging linguistic elements, such as the emergence of new "buzzwords", common off-topic questions such as "What do you think of the Avengers movie?", or topics of interest (any of which might suggest modifications to knowledge base to maintain a high degree of user acceptance and virtual assistant fluency).

Report generator 754 is typically a graphical user interface element that allows an analyst or other authorized user to design, configure, schedule, edit, manage distribution of, or view one or more periodic or ad hoc reports regarding operation of interaction engine 710 or virtual assistants hosted by it. Similarly to output from time-based analysis module 756, reports generally prove very useful in detecting trends or emerging problems with natural language interaction applications, language or domain models, or the infrastructure or applications of interaction engine 710. For example, a report might provide tabular and graphical data pertaining to the number of occurrences of various types of interactions using one or more applications, and data for each row or category of interaction for each time period might include items such as the number and/or percentage of sessions that terminated either prematurely or in an unexpected way, the number of sessions that resulted in or involved a product sales inquiry, the number of those that resulted in a sale, and so forth. It is common in the art for reports to be useful in understanding such issues as diurnal patterns of user behavior (for example, users might be more likely to conclude purchases during early evening hours, and might engage in a higher level of off-topic "small talk" in the hours after midnight). It should be clear to one having ordinary skill in the art that any of the many infrastructure, data presentation, drill-down and drill-up, filtering, and other options known in the well-developed art of enterprise application reporting may be used according to the invention. Of course, the range of inferences that might be made through use of analytics based on natural language interaction engine 420 data is quite broad. For example, in some implementations it may be desirable to identify particular channels (media types, such as email, phone, kiosk, instant messaging, and so forth), particular operating systems, particular browsers, and similar specifics regarding a plurality of users. As an exemplary use of such data, it may be that users of Macintosh™ computers from Apple™ might be found to demonstrate certain typical habits and preferences, knowledge of which might allow for effective tailoring of natural language interaction engine 420 to better serve those customers.

Log file loader 753 is typically a graphical user interface element that allows an analyst or other authorized user to manage the configuration and scheduling of log file loading (or to configure real time data acquisition, when that approach is taken to gathering data from interaction engine 710), and to carry out ad hoc log file activities such as log file pruning, exporting of log files to other systems, archiving or configuring archival of log files onto long term storage systems, and so forth.

In most embodiments, the various components of analytics framework 750 are tightly coupled, for instance by allowing an analyst or other user to move directly from one tool or view to another with a simple user interface action such as selecting a button, choosing a tab, or picking a different view from a context-sensitive menu. For example, a user viewing a list of sessions in a category analysis screen 752 might select one or more sessions from a list (for example, by shift-clicking them using a mouse, or using a check button interface element) and then select "browse dialogs" to view the selected sessions in dialog browser 751. It should be appreciated by one having ordinary skill in the art that many styles of linking of related user interface elements and analytic functionality exist in the art, any of which may be used according to the invention.

Figure 8:
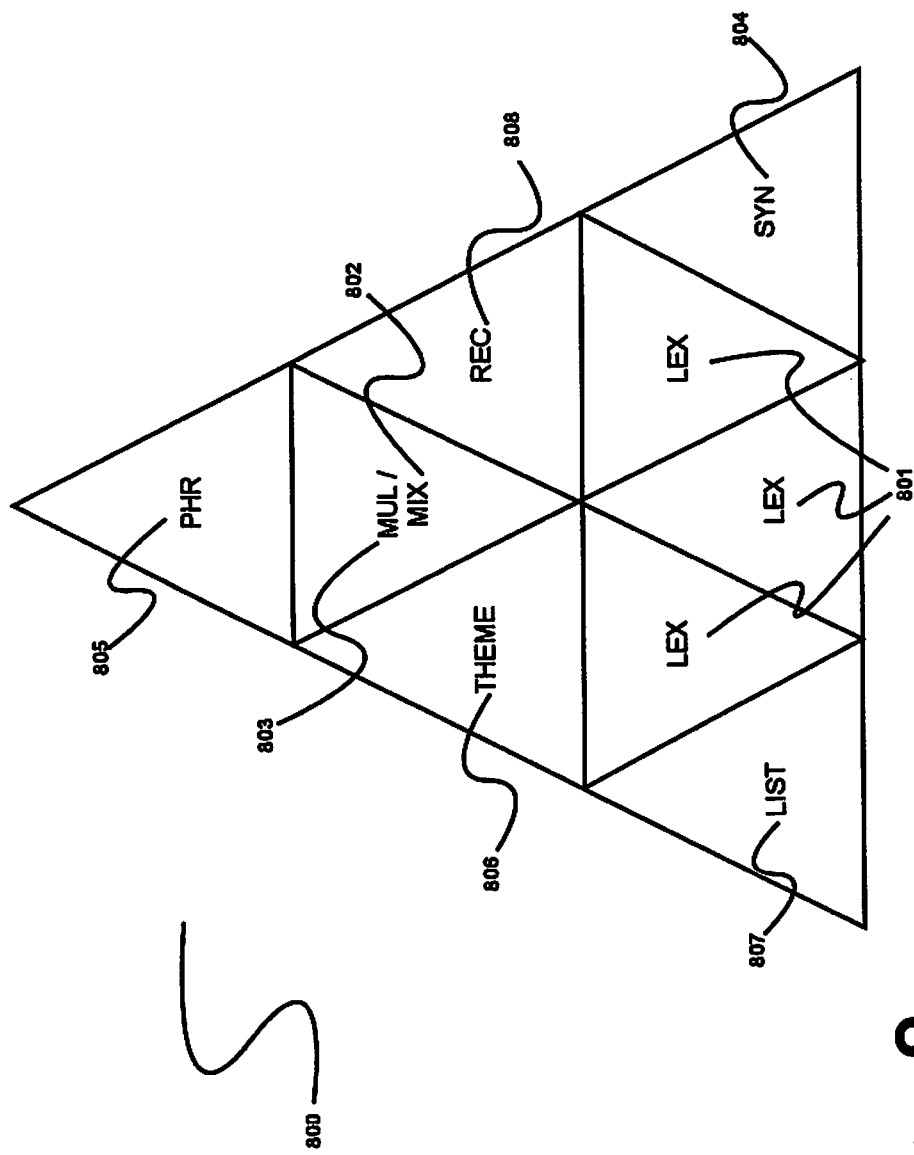
FIG. 8 is a block diagram illustrating language object types within a language object library pyramid within a virtual assistant application, according to an embodiment of the invention.

FIG. 8 is a block diagram illustrating language object types within a language object library pyramid 800 that may be used within a natural language interaction engine (and correspondingly within one or more natural language interpretation applications implemented within a natural language interaction engine), according to an embodiment of the invention. According to the embodiment, language object libraries 800 are structured hierarchically with lexical entries at bottom and complex linguistic structures at the highest level of hierarchy. An underlying principle behind this hierarchical arrangement is that higher levels reference elements from lower, linguistically less complex levels. Thus higher-level reference elements benefit from any improvements that may be made that occur on lower levels in context of maintenance. Rigorous re-use of lower-lying elements in hierarchy may increase an overall consistency of the language object base and produce a leaner, more coherent overall structure.

Language objects are linguistic rules that have meaning and structure and that are used to recognize words, phrases, or a combination of both. A language object may include one or more synonyms and phrasings that depict the same idea (e.g., different ways of answering affirmatively such as "yes", "yeah", "okay", "of course", "by all means", "sounds great", "give it a go", and so forth). A language object may contain the required grammatical alternatives for a word. For example, for "to be", a language object might contain, among others, tokens (words) such as "be", "am", "is", "are", "were", "was", and so forth. By convention, a special character such as "%" may be used as the first character in the name of a language object to signify that the name is that of a language object; in some embodiments, a lexical convention of this sort assists natural language interaction engine 701 in identifying the beginning of a sub-rule such as a language object.

The following sections describe different types of language objects that may be used to build a language object base as part of knowledge base 630. Language object types are listed ordered roughly by their increasing degree of linguistic complexity.

Lexicon Language Objects (LEX.*)

LEX 801 language objects are the smallest, most elementary building blocks of a language object library from which more complex language object structures are built. That is, LEX 801 language objects generally correspond to and can taken as basic dictionary entries. A LEX 801 language object may correspond to a lemma and capture a full set of inflectional forms or variants of a given word, irrespective of whether that set may have several different meanings. There typically will be only one LEX 801 language object created for a lemma and its set of inflectional forms, as is illustrated here by a language object representing the noun "bark":

BARK .LEX.NN=bark/barks/bark's/barks'

It will be appreciated by one having ordinary skill in the art that there are any number of other object labeling approaches that could be adopted; these exemplary embodiments are not to be taken as limiting. For purposes of consistency, the examples given below will follow one approach. It will also be appreciated by one having ordinary skill in the art that inflectional forms of LEX 801 language objects will not be necessary if techniques such as lemmatization or morphological analysis is used as part of the preprocessing of interaction engine.

LEX 801 language objects always belong to a specific part of speech. If more than one part of speech is derived from same stem, separate LEX 801 language objects are created for each one of these. For example:

LEX.BARK.NN=bark/barks/bark's/barks'
LEX.BARK.VB=bark/barks/barked/barking

Identical words may sometimes have a similar part of speech, but may inflect differently. In that case, they may correspond to two different lemmas and therefore possibly two different LEX 801 language objects may need to be created, one for each word. For example, the word land in Swedish may have two meanings (country and garden patch), which share several inflectional forms but not all of them. This may be modeled as:

LEX.LAND1.NN=land/lands/landet/landets/länder/länders/länderna/ländernas (country)
LEX.LAND2.NN:=land/lands/landet/landets/landen/landens (garden patch)

Multi-Word Units (MUL.*)

MUL 802 language objects may form the multi-word correspondence to LEX 801 language objects, as they capture dictionary-level entries of multi-word units that are meant for use as building blocks in higher-level language objects. MUL 802 language objects may be generally built from LEX 801 language objects. MUL 802 language objects may only contain inflectional variations of a multi-word unit captured by their kernel name (as opposed to higher level language objects which may also contain synonymic variations thereof). Exceptions to this general rule may be constituted by slight changes in word order and variations in function words. Phrasal verbs (verbs with a preposition) form typical MUL 802 language objects (for example, the phrasal verb "give up" may constitute a MUL 802 language object comprising two LEX 801 objects ("give" and "up"). MUL 802 language objects may also be used for other kinds of word groups that often appear consecutively, therefore it may be convenient to have language objects that may be referred to when building higher-level language objects.

Mixed Language Objects (MIX.*)

Mixed language objects 803, group LEX 801 language objects which represent lemmas deriving from a same lexical root, e.g., happy, happily and happiness. This type of language object may be referred to as a mixed language object since it may contain entries with various parts of speech (for example, a mixed language object 803 could comprise a language object further comprising the LEX objects LEX.HAPPY.ADJ, LEX.HAPPILY.ADV, and so forth.

Since linguistically, a set of lemmas deriving from a same root is fuzzy, a MIX 803 language object may be defined with various degrees of restrictiveness as deemed appropriate in its respective context of use. Due to a potentially diverse list of language objects referenced by a MIX 803 language object, names of MIX 803 language objects typically do not reference a specific part of speech. Grouping only an adjective and its corresponding adverb (rather than all words deriving from a same root) may be used in the same context. In this case, only a certain subset of all possible parts of speech may be included in the language object. This may be signaled in a language object name by adding a corresponding part of speech suffixes in alphabetical order, separated by underscores. Included are parts of speech suffixes in those cases to provide a clearer description of the language object's content.

Word-Level Synonym Language Objects (SYN.*)

Since natural language may have various ways of expressing a same or very similar concept, language object library needs structures to represent types of synonymy. Synonymy may occur at word-level (for example, different words denoting a same concept), or at phrase level (for example, different, linguistically more complex ways of expressing a same concept). Synonym language objects may similarly either be at word-level or at phrase level. SYN 804 language objects are conventionally synonym language objects at word-level.

All words grouped in a SYN 804 language object are interchangeable. Phrase-level language objects are marked as PHR 805 language objects (see paragraph below referring to PHR 805 language objects). SYN 804 language objects may group LEX 801 and MUL 803 (and occasionally also PHR 805) language objects to represent words or phrases sharing the same, or a very similar meaning.

There are, of course, other possible approaches to grouping. Words with similar meanings may be grouped in more than one way, with different objectives and with varying degrees of granularity. It will be appreciated by one having ordinary skill in the art that there are any number of other grouping approaches that could be adopted; these exemplary embodiments are not to be taken as limiting.

Words may generally have more than one meaning—their senses. Note that SYN 804 language objects may be defined with respect to a certain sense of a word. An adjective sharp may have at least two senses: an original one used with knives for instance, and a metaphorical one used for describing intelligent people. He is really sharp means the same as He is really intelligent, yet the knife is sharp cannot be replaced by the knife is intelligent. Therefore, these two senses may be represented by different SYN 804 language objects. One may be able to think of a context in which all words grouped in a SYN 804 language object are interchangeable. Since words may have several senses, basic SYN 804 language objects are sometimes context-dependent.

Proper synonyms may typically belong to a single part of speech. This may hold for basic SYN 804 language objects. Whenever entries in a SYN 804 language object are of the same part of speech, an appropriate part of speech suffix may be added to a language object name. If a language object contains entries with different parts of speech, no suffix will generally be added (again, naming described herein is merely exemplary of one embodiment, and not limiting).

SYN 804 language objects may be used to capture close synonymic relationships between words; this may be referred to as a language object having narrow semantic scope. One may wish to capture synonymic groupings that semantically are somewhat looser and hence have a wider coverage. To mark an extended coverage of these wider-scope synonym language objects we add the suffix .WIDE to the language object name.

Phrase-Level Language Objects (PHR.*)

PHR 805 language objects may represent all possible ways of expressing a phrase or partial sentence, for example: "What is the price of X?", "Agreement/Consent", or "How long will it take for X to happen?" A linguistic phrase may be arbitrarily complex and so may PHR 805 language objects. Some PHR 805 language objects may capture noun phrase units, while others may capture several sentence constituents. As such, PHR 805 language objects may typically reference LEX 801, MUL 803, SYN 804 and other PHR 805 language objects. For example, a PHR 805 language object may refer to other PHR 805 language objects, as when PHR 805 "what is your name" is composed from phrases 805 "tell me", "what is", as well as LEX 801 objects "your" and "name".

If a PHR 805 language object is comprised of content-light words such as I, is, what, extra attention may need to be paid to word order. It should be noted that other words may come between conditioned constituents when using a +-operator. Important PHR 805 language objects may be tested against real inputs. For example, a code may be restricted by for number, tense or any other morphosyntactic feature where appropriate. In a language object like PHR.CAN_I_BUY it does, for example, not make sense to allow for past tense forms of a verb.

List Language Objects (LIST.*)

LIST 807 language objects contain lists of concepts, such as colors, car brands, and countries. LIST 807 language objects may be composed of other LIST 807 language objects. List language objects 807 that list entries of the same part of speech (POS) may also indicate this part of speech in language object name.

Theme Language Objects (THEME.*)

Theme 806 language objects may group words on basis of theme. Words generally have different meaning, but are associated to a common theme. One may think of theme language objects as keyword language objects. An ideal THEME 806 language object may not be dependent on context, but signals a theme regardless of where it is triggered. For example, a THEME 806 language object could be "CAR", and could comprise various synonyms for "car", as well as other language objects such as "car parts" (a LIST 807 object), "car brands", and so forth.

Miscellaneous Language Objects (REC.*)

REC's 808 are larger language objects which may not fit under PHR 805 or any other category. They may be very wide, or rather specific, but may not have consistent structure. Both their scope and naming may be highly pragmatic.

Project-Specific Language Objects (PROJ.*)

Some high-level language objects may be very likely to occur in many different types of projects such as questions about a company, about opening hours or driving directions to stores or offices. These language objects may occur in many instances, so it may be economical to code a linguistic part of them only once and adapt a comparatively minor set of differences in content from instance to instance. This set of language objects may be referred to as PROJECT language objects ("PROJ"). To make PROJ language objects recognizable from project to project, they may be named the same across projects. It will be appreciated by one having ordinary skill in the art that condition codes may be adopted based on individual requirements of a project at hand.

Inflectionally Constrained Language Objects

A language object structure may provide us with capability to refine broader language objects by imposing specific constraints or filters upon them. One application of a constraining operation, for example, may be to obtain only past tense forms for a given verb from a language object representing all inflectional forms of that verb. To this effect, a constraint operator "?" may be used to selectively form conditional subsets of entities represented by a given language object. As an example, consider a need to obtain only past tense inflections of the verb 'to go'. While a new language object may be created to capture those specific entities, we may also use a constraint operator on a generic language object to filter for its past tense forms.

Figure 9:
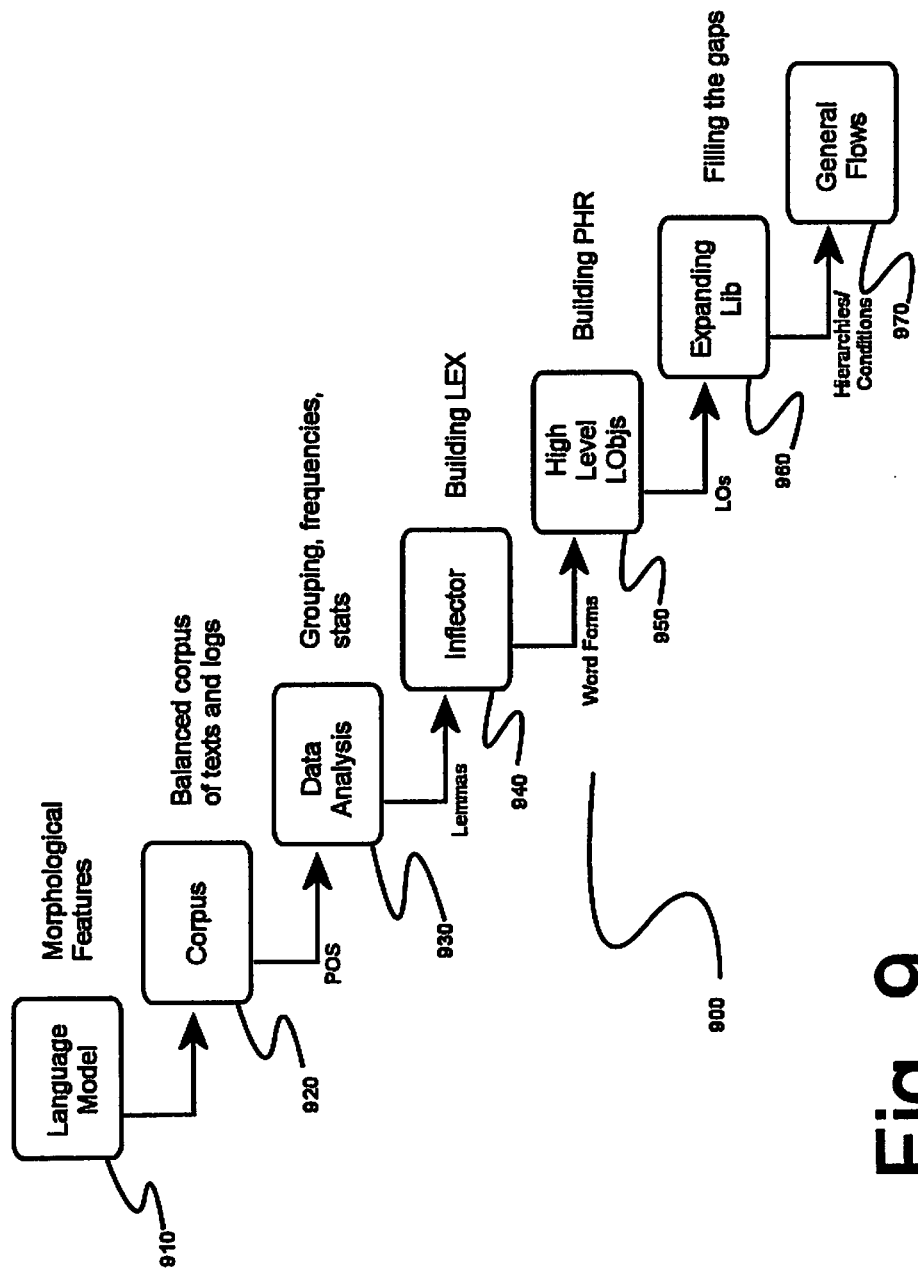
FIG. 9 is a block diagram illustrating a building process for a language library within a virtual assistant application, according to an embodiment of the invention.

FIG. 9 is a block diagram illustrating a building process 900 for a language library within a virtual assistant application, according to an embodiment of the invention. Generally, language models 910 are built by assembling a large set of small building blocks. With the exception of LEX 801 language objects, language library objects always refer to other language objects. Lower-level language objects are used when defining higher-level language objects. Optimization of lower level language objects may propagate into higher-level language objects, which reference them.

It should be understood by one having ordinary skill in the art that the various language object types illustrated in FIG. 8 are exemplary, and more or fewer types of language objects, including language objects of distinct types not shown in FIG. 8, may be used according to the invention. For example, if lemmatization is applied LEX language objects would not need inflectional forms. Moreover, it will also be understood that specific syntactical and naming conventions used herein are also exemplary, and other approaches known in the art may be used to label language objects without departing from the scope of the invention.

As shown in FIG. 9, in order to build a language library while creating a virtual assistant, one typically begins with morphological features within a language model 910. As words are added, a balanced corpus 920 (a sample of language usage such as, for example, from a particular population) of texts and logs to provide a history of actual usage. Data analysis 930 of word grouping, frequencies of word usage, statistics of when, how often, where and others, may yield a better, more accepted by a virtual assistant's target audience. An inflector 940 acts as an extender when building LEX 801 language objects to generate inflected forms to extend word and therefore sentence understanding in a variety of expressions of language usage. As we continue to build upon LEX 801 language objects, building an eventual PHR 805 (for a potential high level word structure) in another embodiment of the invention with usage of lower level language objects to expand the library. Creation of high-level word structuring toward a PHR 805 brings us to a goal of filling word gaps using word libraries and eventually to expanding libraries 960. As base words LEX 801 are turned into groupings and more than one PHR 1305, library elements are put together to form a general flow 970. This process 900 may be repeated any number of times as needed to create language recognition rules, which may then be used to create flows, which may in turn by assembled into one or more solution data repositories that may be used to implement, for example, a virtual assistant or any other natural language interpretation application.

Figure 10:
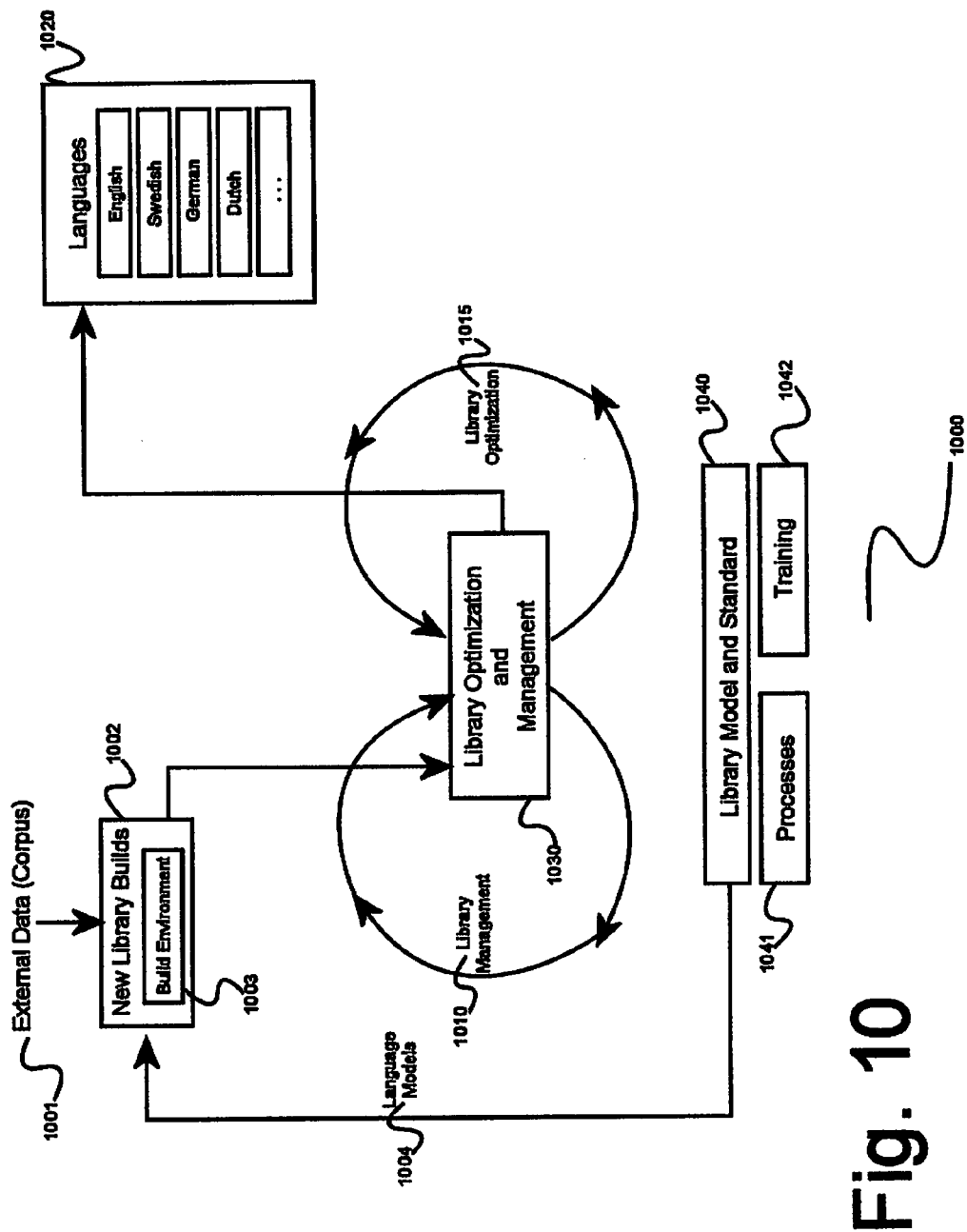
FIG. 10 is a block diagram of a system and method for library creation and optimization, according to an embodiment of the invention.

FIG. 10 is a block diagram of a system and method 1000 for library creation and optimization, according to an embodiment of the invention. According to the embodiment, library build and optimization 1000 consists of external data 1001 (corpus) being processed into usage for many languages 1020. It will be appreciated by one having ordinary skill in the art that there are any number of other written and spoken languages that could be adopted; these exemplary embodiments are not to be taken as limiting. In an embodiment, external data 1001 flows into new library builds 1002; new library builds 1002 may be created using a build toolbox 1003 of language elements. Library optimization and management 1030 represents series of processes, described in more detail with reference to FIGS. 11-28, that enable a natural language interface developer to extend and refine existing language libraries and/or to create new libraries. Importantly, library optimization 1015 may comprise a series of automated tools (described below) that identify problems or possibilities (such as redundant language objects, missing word forms, new vocabulary to form new language objects, and so forth), the tools then either guiding a user in correcting them, or automatically correcting any identified deficiencies. Library management 1010 provides tools and processes for maintaining a plurality of language libraries, for example by implementing version control, consistency checking, automated regression testing, and other management functions. Language libraries may be in English, or in any of a plurality of languages 1020, and may cover both spoken and written language. In many cases, one or more language library models or standards 1040 may be provided to assist NLI developers in creating natural language interaction applications. These models and standards 1040 may be used, in conjunction with various library development processes 1041 (described in detail below) and language model training 1042 (also described below) to build one or more language models 1004 that may then be edited, extended, refined, or otherwise modified using build toolbox 1003 to create new library builds 1002; such editing and refining will generally incorporate into language model 1004 various external data elements 1001, for example a domain-specific corpus of frequently asked questions (FAQs). Build toolbox 1002 may comprise one or more elements useful for creation and expansion of library elements, as discussed above within FIG. 8.

In general, natural language interaction applications may be rapidly developed using systems and methods of the invention, for example using the process described below with reference to FIG. 10A. As an overview, such rapid development generally starts with a set of possible user inputs to which a natural language interaction application in development should be able to respond (that is, a corpus of sample inputs—and possibly also corresponding outputs—typical of what is expected to be handled by the natural language interaction application being developed is used to initiate development). These inputs (and possibly outputs) are analyzed and, as a result, may be organized into a manageable structure (generally where closely semantically related inputs/outputs are grouped together). For each group of inputs so obtained, a variety of acceptable forms of response may be provided (for instance, by providing a frequently-asked-question list and corresponding answers). Finally, the inputs may be automatically or semiautomatically mapped to a limited set of predefined response, the set typically comprising a plurality of responses to expected inputs as well as responses for unforeseen inputs (such as safety net responses); this step involved automatic or semiautomatic coding of language recognition rules, language conditions, linguistic grammar rules or the like. Such automated or semiautomated coding of language recognition rules may typically use a natural language parser that may segment, simplify, perform part-of-speech (POS) tagging, as well as various types of semantic and syntactic analysis. Autocoding, based on natural language processing (NLP) analysis of inputs and responses, combines different patterns from one or more preexisting language libraries into various language recognition rules, which may then be used to automatically map each input into a corresponding appropriate response by creating flows. Patterns (language objects) and rules (language recognition rules) each conform to a specific syntax, various non-limiting examples of which are provided herein; they may alternatively comprise a plurality of lexicons, grammar rules, ontologies, regular expressions, and other representations of syntactic and semantic information known in the art. Language recognition rules may be formally compared, merged, split into independent parts, and manipulated in various ways with regard to their semantic value. Moreover, in most embodiments language recognition rules are evaluated in a defined order, so variant orderings of language recognition rules may affect behavior of natural language interactions, and accordingly various automated ranking processes may be used to ensure an optimal arrangement of language recognition rules (that is, one that leads to acceptable behavior of resulting natural language interaction applications). This brief high-level summary is intended to place the various detailed descriptions of exemplary embodiments that follow into context.

Figure 10A:
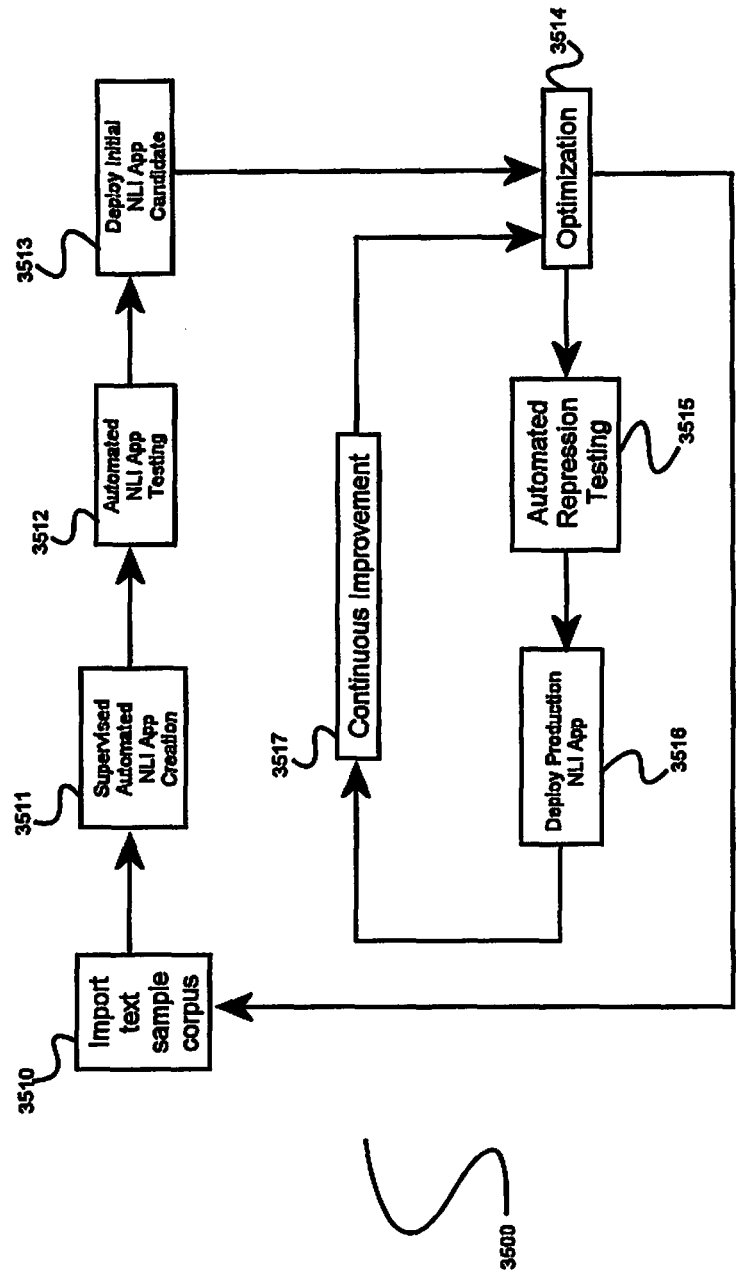
FIG. 10A is a high level process flow diagram illustrating a method for rapid development of natural language interaction applications, according to an embodiment of the invention.

FIG. 10A is a high level process flow diagram illustrating a method 3500 for rapid development of natural language interaction applications, according to an embodiment of the invention. According to the embodiment, in an initial step 3510 an initial corpus of text samples is imported automatically, into build environment 640. For example, entities from a corpus of unstructured or structured interactive texts comprising (for example) a large sample of logged conversations between customers and customer service agents (through live chat service or transcribed phone conversations), customer service emails or filled-in email forms, FAQs, search queries on a web page, interactions from social media networks or systems, or logged conversations between a natural language interaction application, such as a virtual assistant, and users, may automatically be collected and provided as input to method 3500. In step 3511 a natural language interaction application developer, a virtual assistant designer, or a similar user carries out a process of supervised, automated natural language interaction application creation (described below) to generate an initial, bootstrapped (that is, rapidly and largely automatically generated) natural language interaction application based on semantic content of the imported corpus of text samples. Also, it is a goal of the invention to make it possible to rapidly develop basic natural language interaction applications from a text corpus, so that the natural language interaction applications may be tested automatically and refined based on results of testing, with the overall goal of greatly reducing both the time and the skill required to create workable natural language interaction applications. Accordingly, once an initial candidate natural language interaction application is created in step 3511, it may be subjected in step 3512 to an automated natural language interaction application testing process (described below) to identify areas for improvement and gaps in coverage of the candidate natural language interaction application. In some embodiments, steps 3511 and 3512 are performed iteratively to produce successively more complete and fully functioning natural language interaction applications, although it is certainly possible to carry out only one pass through steps 3511 and 3512, if desired. Moreover, a designer carrying out step 3512 will typically make small changes as test results emerge, retesting as appropriate after each change or series of changes; it should be understood by one having ordinary skill in the art that many varieties of general development methodologies exist in the art (e.g., "waterfall", "agile", "spiral", and the like), any of which may be used to carry out steps 3511 and 3512. Once a designer is satisfied with a specific natural language interaction application, in step 3513 the tested natural language interaction application candidate may be deployed, either in a controlled environment or "in the wild" (that is, deployed so that untrained users have access to and may use the natural language interaction application). Once a natural language interaction application is deployed in step 3513, an ongoing process of optimization (described below) is carried out in step 3514. Optimization may be performed periodically (for instance, in batch mode, once per week), or continuously (for example, by examining results of natural language interactions as they occur). Typically, during optimization 3514 many changes are recommended to designers by one or more automated systems, and designers are also provided with tools to "explore" a solution (a deployed natural language interaction application) to more fully understand its performance and to identify opportunities for improvement. In some cases, after optimization in step 3514, output from optimization may be used as input to step 3510 in order to allow for iterative identification of new language recognition rules, language objects, and the like in conjunction with iterative optimizations; after some number of such iterations, execution may pass to step 3515 and formal testing commenced. As changes are made during optimization, periodic (or even continuous, automated) regression testing may be performed in step 3515 to ensure that changes made during optimization work, and that changes did not introduce new problems into a solution. After a suitable period—for instance, when the rate of error location and change implementation drops below some level, or after a predefined period of time—a production natural language interaction application may be rolled out in step 3516, and a process of continuous improvement may be carried out in step 3517 as desired. The overall high-level process illustrated as method 3500 illustrates an approach to rapid prototyping and testing of natural language interaction applications according to the invention that allows a designer to create useful natural language interaction applications rapidly, starting with a corpus of text samples reasonably relevant to the purpose of the natural language interaction application.

Figure 10B:
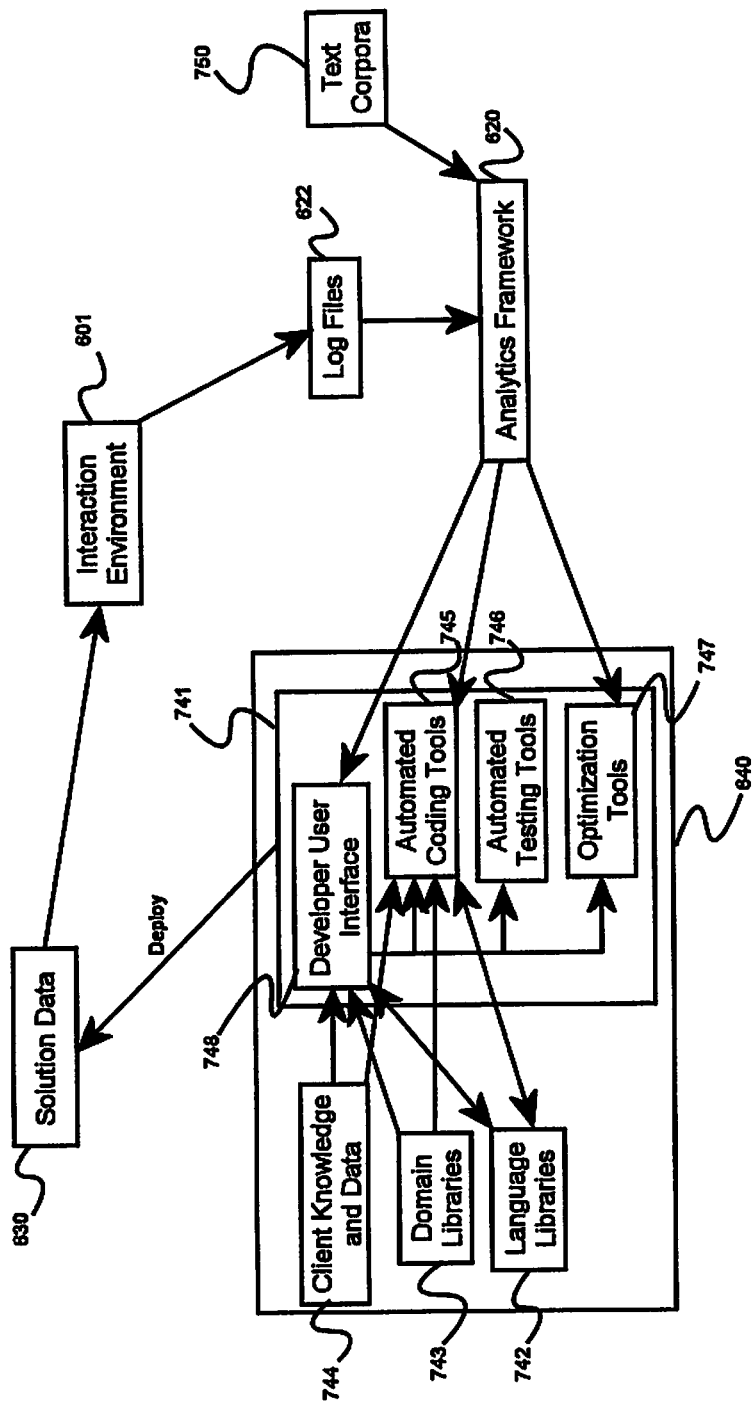
FIG. 10B is a high-level system architecture diagram of a preferred embodiment of the invention.

FIG. 10B is a high-level system architecture diagram of a preferred embodiment of the invention, also illustrated in FIG. 6. FIG. 10B shows an expanded view of the components of build environment 640 (as also shown in FIG. 7), and illustrates in more detail the relationships among the components of build environment 640 and between the components of build environment 640 and other elements of system 600. According to the embodiment, and keeping in mind the high-level method 3500 just described with reference to FIG. 10A, a developer, designer, or other user uses developer interface 748, which is a component of development environment 741, to carry out manual steps and supervise automated steps of method 3500. Developers may view data from client knowledge and data 744, domain libraries 743, and language libraries 742. Based on recommendations made by automated coding tools 745, automated testing tools 746, or optimization tools 747, a developer may also create new or modify existing language objects, storing the created or modified language objects in language libraries 742. Developers may also receive log data from log files 622 for example in order to view a set of actual interactions between a natural language interaction application (deployed in interaction environment 601) and a human user (or another natural language interaction application; nothing prevents virtual assistants or natural language interaction applications from interacting directly with each other, with or without the involvement of human users). Developers may retrieve and review analysis results obtained by analytics framework 620, and developers will typically use some or all of the other tools provided in development environment 741 (that is, automated coding tools 745, automated testing tools 746, and optimization tools 747). Of course, the discrete components shown in FIG. 10B as elements of development environment 741 may actually be implemented as a single executable computer program operating on for example a workstation-type computer, as a series of web services deployed on web servers and application servers and accessible via one or more standard Internet protocols known in the art, as a set of separate, dedicated server processes running on a virtual machine, a single real machine, or a cluster of real machines; moreover, these exemplary architectures should not be taken as limiting, since components of development environment 741 shown are shown separately in order to highlight their distinct logical functions, not to imply any particular implementation approach. When carrying out high-level method 3500, a developer or designer may deploy resulting solutions (packages of code and data that comprise one or more virtual assistants or other natural language interaction applications) into solution data repository 630, whence they may be loaded into and executed by interaction environment 601. In some embodiments, additional text corpora 750 may be provided directly to analytics framework 620, where they may be analyzed and passed to development environment 741 to assist in creation of additional language recognition rules or flows, or to enhance the effectiveness of existing language recognition rules or flows (and of course, as part of the development process, additional language objects or modified language objects may also be created based on analysis results from text corpora 750).

Figure 10C:
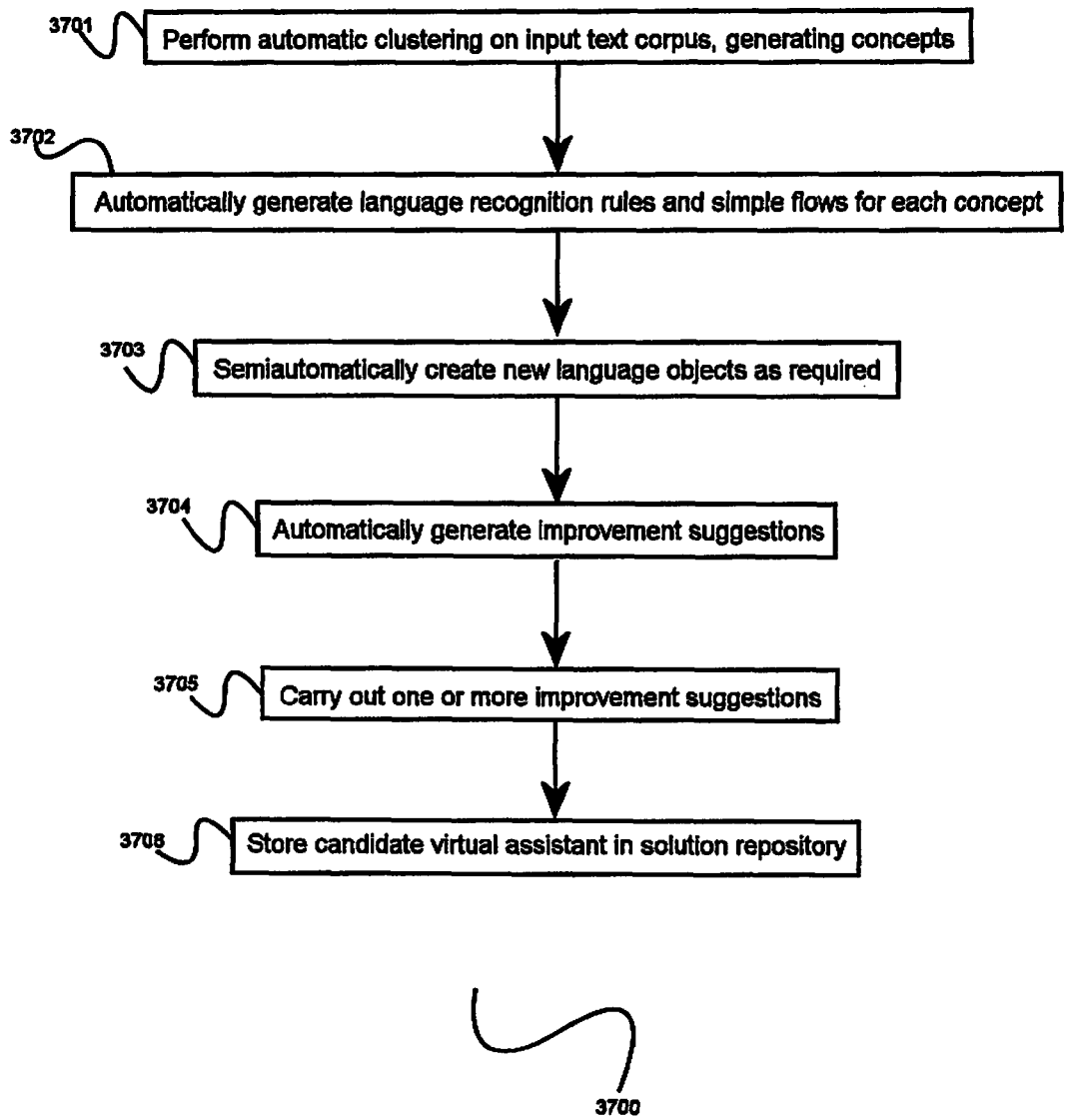
FIG. 10C is a process flow diagram illustrating a method for rapid development of natural language interaction applications, according to a preferred embodiment of the invention.

FIG. 10C is a process flow diagram illustrating a method 3700 for rapid development of natural language interaction applications, according to a preferred embodiment of the invention. It should be noted as an initial matter that various steps shown in FIG. 10C may be carried out as part of executing various steps of method 3500 illustrated in FIG. 10A, and may be carried out using any of the components of development environment 640 shown in FIG. 10B. For example, step 3701 might be carried out directly in developer user interface 748 as a means of carrying out step 3510, while step 3511 could be carried out using automated coding tools 745 to perform steps 3702-3706 inclusive; in other cases, steps 3704-3706 might instead (or in addition) be carried out as step 3512 using automated testing tools 746. In step 3701, automatic clustering may be performed on a plurality of input text samples (or a corpus of input text samples), in order to group related example inputs (EIs), and possibly output texts (OTs) based on their inferred semantic relationships. Clustering may be performed automatically using any supervised or unsupervised clustering techniques known in the art, such as hierarchical clustering, k-means clustering, latent semantic indexing, statistical language modeling, and the like. Text samples or fragments may be clustered into groups based on one or more semantic or other distance measures, or on some combination of measures. Natural language processing techniques such as normalization, spelling correction, stemming, lemmatization, and synonym detection may be used to improve clustering by "canonicalizing" tokens so that words may be considered similar despite specific textual differences between them (for instance, relating "banking" with "banks" and "bank"). In some embodiments, canonicalization may benefit from use of a language object library 742 by substituting word sequences for lower-level language objects by (for example) identifying word forms of the same lemma as a particular language object or identifying synonym language objects. However, the embodiment is not dependent on language object library 742 in any sense, and may typically and usefully be able to identify unknown concepts without any knowledge about a language and its words. Each cluster or group may be represented as a named "concept". Each specific concept may be comprised of a plurality of inputs of words that are associated with the specific concept. Concept naming may be achieved automatically based on representative words in the plurality of user inputs that were identified as forming a cluster, and the concept name may consist of a single word or a word sequence. According to the invention, any user input may be assigned to a plurality of concepts (i.e., clustering may be of the overlapping sort). Each concept may be assigned a size attribute computed for example based on the number of user inputs related to it. This size may be usefully interpreted as the frequency of that concept. This frequency measure may guide a developer user in the process of building a virtual assistant, enabling her to know what user input groups may be most representative of the types of input a virtual assistant will get when launched. The frequency measure may therefore provide clear guidance of how to prioritize implementation steps of a virtual assistant, according to the invention.

Clustered text fragments may be referred to as "concepts", and represent semantically related text fragments; it is an object of step 3701 to group text fragments within an input corpus into groupings that would be sensible to a human (and for this reason, clusters are available for viewing and editing by developers, designers, and other users; see discussion below pertaining to FIG. 29). Once a given input text corpus has been automatically clustered, typically many concepts (sets of semantically related inputs) will have been identified, and also a portion of the input text items may remain uncategorized (that is, not assigned to at least one concept). This is quite common in automated clustering algorithms, as outliers and inconclusive groupings may be ignored depending on how a particular clustering algorithm is configured and applied. In some cases, a designer or developer may elect to perform additional, manual clustering of inputs into existing or new concepts, effectively applying human judgment to identify relationships that may not have been detected by an automated clustering algorithm. In step 3702, each identified concept may be taken as input to an automated code generation method carried out, for example, by automated coding tools 745 with or without supervision by a designer or developer using development user interface 748. Automated code generation is described in more detail below with reference to FIG. 10F. Automated code generation (and supervised and manual code generation) may use concepts to create language recognition rules for EI clusters, and to organize them into flows. In some cases, some elements of new concepts comprise one or more words or textual elements that are not contained in any language objects of language libraries 742, or are present in only a set of language objects, none of which might for example exhibit an appropriate level of generality or specificity for use in conjunction with a particular concept (or set of inputs). Also, while reviewing language recognition rules and flows created in step 3702, a developer might determine that a particular word or concept requires a new language object, or requires an existing language object to be supplemented by a new language object of greater or lesser granularity or scope. Alternatively, the system itself may identify new words that are not part of a language object library but that recur in many example inputs in a cluster. Another option is that a concept identified (a group of EIs) may actually be a word or word sequence that does not have any corresponding language object. So the identification of a new LO (LEX LO) may be automatic, and actual creation of a new LO may be assisted by a user if needed (or it can be created automatically by automatically identifying part of speech and using an auto-inflector to generate appropriate word forms). Thus, in step 3703 new language objects may be created automatically or semiautomatically, for instance using a pop-up language object editor available from a context-sensitive menu when needed by a user. In step 3704 automated recommendations for improvements of language recognition rules, flows, and language objects created or edited in steps 3702 and 3703 may be carried out. For example, automated testing tools 746 might identify a conflict between a set of language recognition rules, for example a "tangle" (tangle detection and resolution is described in more detail below, with reference to FIGS. 26-28), and make appropriate recommendations to correct the detected problem. In step 3705, a designer, developer, or other user may carry out one or more of the recommendations provided in step 3704. Finally, after all or a substantial portion of the concepts generated in step 3701 have been used to generate language recognition rules, and after conflicts, tangles, missing language objects, and other issues have been identified and corrected, in step 3706 method 3700 outputs a candidate virtual assistant (or other natural language interaction application) that may be stored in solution repository 630 for further testing and possible deployment.

Figure 10D:
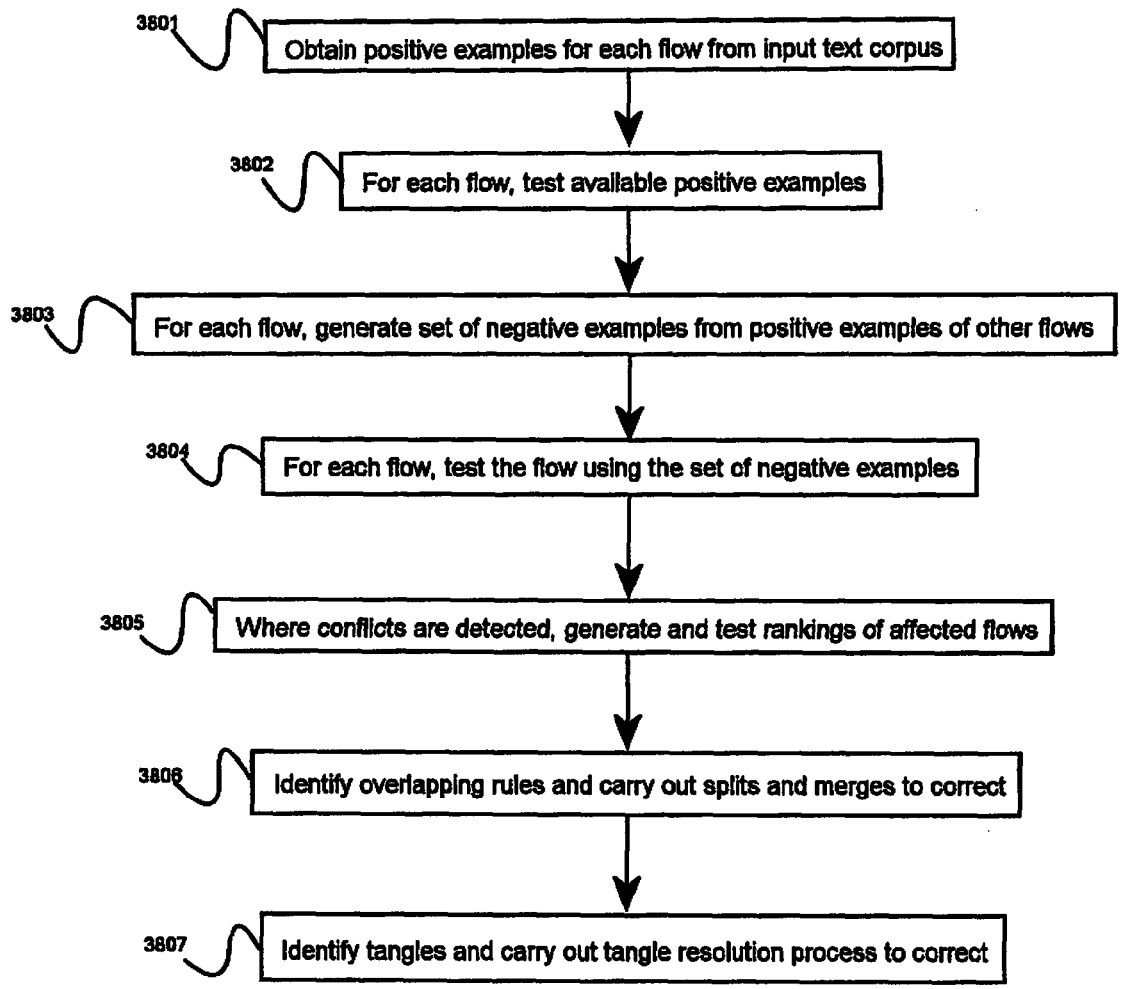
FIG. 10D is a process flow diagram illustrating a method for automated testing of natural language interaction applications, according to an embodiment of the invention.

FIG. 10D is a process flow diagram illustrating a method 3800 for automated testing of natural language interaction applications, according to an embodiment of the invention. Before discussing specific steps of method 3800, it will be useful to According to the embodiment, in step 3801 a set of positive examples for each flow to be tested is obtained from an input text corpus. Typically, positive examples (EIs) for each flow are taken from an input text corpus in step 3801, and in step 3802 these positive example inputs are tested against the flow (and should of course match, since they are positive EIs). Then, in step 3803, for each flow a set of negative examples is generated from positive examples assigned to other flows, and these negative EIs are tested against the flow in step 3804. In step 3805, where conflicts are detected (for example, where a negative EI triggers a flow), a set of rankings for the affected triggers is generated (automatic ranking is described in more detail below, with respect to FIG. 28A), and the resulting rankings are tested to ensure that only proper results are obtained. In step 3806, an automated test to identify overlapping language recognition rules is conducted, and splits and merges are conducted as required to correct unneeded overlaps (overlap detection and split and merge operations are described in more detail below, with reference to FIGS. 14-18). Finally, in step 3807 any tangles present in a solution are identified automatically and a tangle resolution process is carried out to correct the detected tangles (tangle identification and resolution are described in more detail below, with reference to FIGS. 25-28).

Figure 10E:
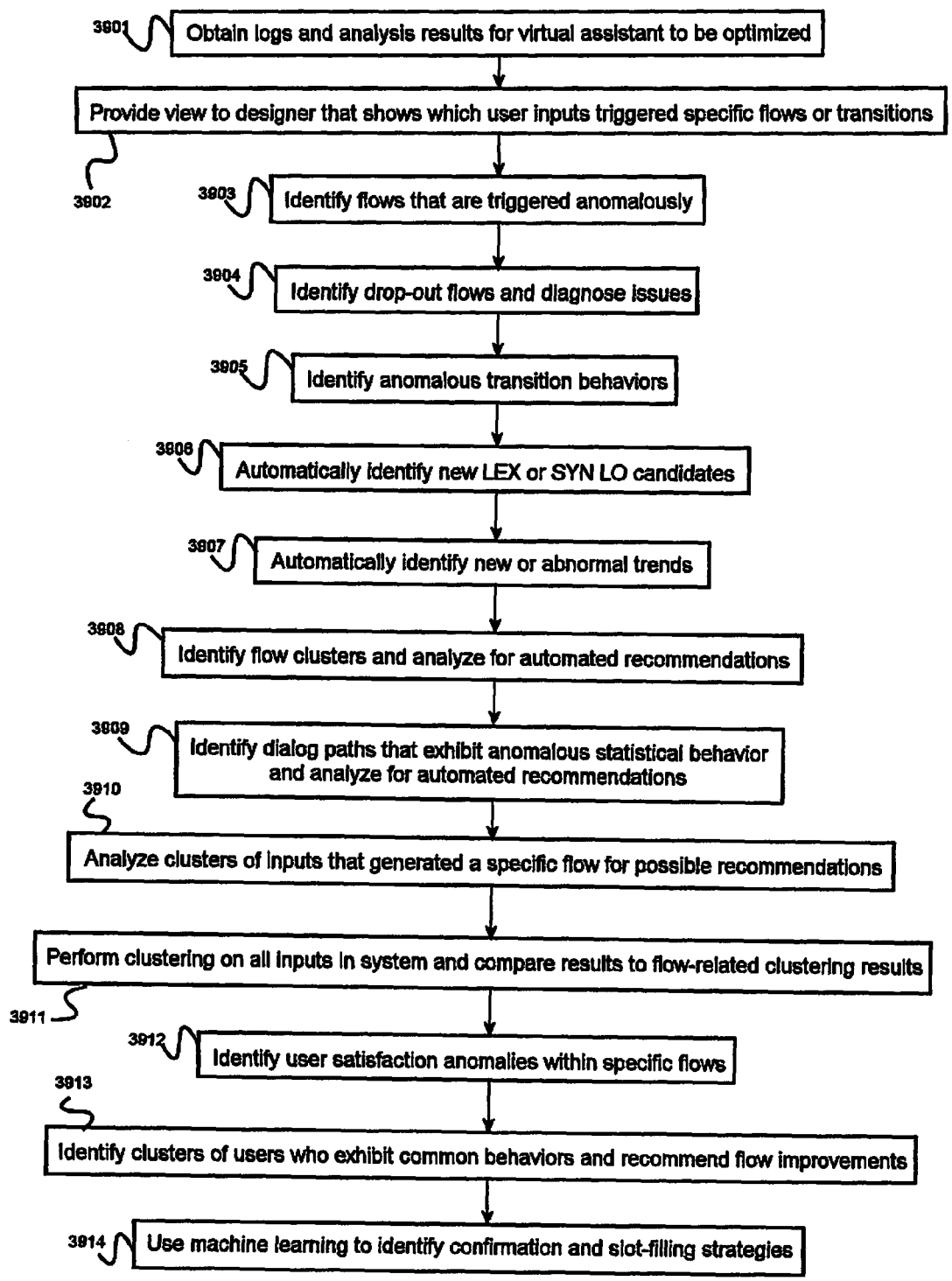
FIG. 10E is a process flow diagram illustrating a method for optimization of natural language interaction applications, according to an embodiment of the invention.

FIG. 10E is a process flow diagram illustrating a method 3900 for optimization of natural language interaction applications, according to an embodiment of the invention. According to the embodiment, in step 3901 one or more sets of logs and/or analysis results obtained from testing or operating a virtual assistant are obtained (from log files 622 and analytics framework 620) by optimization tools 747 (either automatically—such as by use of a periodic download process—or as directed by a developer using development user interface 748). Essentially all of the subsequent steps of method 3900 may be performed in any order, and many steps may be performed multiple times, either within a single automated, supervised, or manual optimization session or in a plurality of successive optimization sessions. In step 3902, a view is provided to a designer (as always, the terms "designer", "developer", "user", and others such as "knowledge engine", "computational linguist", and so forth, should be considered as examples of the variety of users of systems and methods according to the present invention; that is, users who seek to rapidly prototype, test, deploy, optimize, and distribute virtual assistants and other natural language interaction applications), which shows which specific real inputs triggered specific flows or transitions. In step 3903, flows that are triggered anomalously are identified (for example, that are triggered by a negative EI; flows that should not have been triggered because another, more appropriate flow should have been triggered; flows that were triggered much more or less frequently than previously or than designed; and so forth). Clearly such anomalous flows represent areas where it would be useful to focus a designer's attention, for example so the designer can deduce what has changed since the last (normal) operations, and possibly to identify a cause for each anomalous flow. In step 3904, one or more drop out flows (flows from which an end user dropped out of a flow—for instance, by going to another flow without completing the first flow or leaving a natural language interaction application altogether) may be identified. Drop out flows are important as indicators of areas within a solution where end users might become disoriented, lost, or dissatisfied. For example, if a particular flow tends to come up when a user is seeking help, and it has the effect of discouraging the end user from seeking help, then end users might abandon their interactions (stop seeking help); unless that was an intentional object of the virtual assistant's designer, this represents a clear customer utility problem (and likely a customer satisfaction problem as well). When unexpected drop out flows are identified, logs of what was actually being communicated to and from the various affected end user just before they dropped out can be viewed by a developer. In some embodiments, automated recommendations may be prepared and displayed, based on automated analyses of resulting for example from treating the plurality of failed end user interaction logs as a set of example inputs (or a concept) in its own right (albeit a concept with negative connotations). Examples of drop out flow issues that may be examined or detected automatically may comprise measuring one or more drop out ratios (percentages of occurrences of an end user triggering a flow when the end user then dropped out), detection of listeners, transitions, or paths through a flow that never occurred (i.e., were never triggered), transitions which succeeded frequently through triggering of a safety net answer, identifying flows where end users rarely reach an end node, and common flows to which end users transition when they drop out of flows unexpectedly. In step 3905, transactional path anomalies indicative of "strange" dialog behavior may be automatically identified. For example, a path may suddenly narrow down and then explode into many downstream paths, indicating a location where further refinement is likely required (since in such a situation, virtual assistant behavior may be highly unpredictable). In step 3906, when words present in end user interaction logs are unmatched by any language object (particularly those unmatched words that occur frequently), optimization tools 747 may automatically identify candidates for new LEX or SYN language objects; on receiving such identifications (which can be viewed as recommendations), a developer is typically provided with an option to open a dialog box or other user interface element that enables them to specify details of the new language object (see for example the discussion pertaining to FIG. 12, below). In step 3907, new or abnormal trends in usage data retrieved from log files 622 or analytics framework 620 may be automatically detected, and optionally graphical or tabular indicia of such trends may be provided to a designer to allow the to view the detected trends and to take action if appropriate. For example, the word "Windows 8" might suddenly begin occurring frequently within a virtual assistant's end user interactions, whereas it might have been entirely absent before some point in time (or at least rarely present); such a situation might indicate a change in a virtual assistant's external "semantic environment" (for example, in this case the change might have occurred because of the launch of a successful third party product). In step 3908, various flow clusters may be identified. Flow clusters are groups of flows that are frequently found to occur together in end user dialogs. For example, in some cases it may be found that a certain key flow is almost always followed by the same flow, which might have been considered unrelated when the virtual assistant was first created. Or, two specific flows may almost always occur together in end user dialogs (neither one appearing by itself much). Such flow clusters (and these are only examples) may often be very useful for optimization of a virtual assistant. For example, if users normally jump from one task to another, a virtual assistant may be optimized by taking advantage of the user-perceived relationship between the two tasks by proactively proposing the second task when a user completes the first task. A similar approach is taken in step 3909, where dialog paths are analyzed statistically to identify frequent and rare dialog paths, for example to identify infrequently occurring, unanticipated paths that may actually signal an important latent domain or semantic relationship between two concepts. Paths may be followed, within optimization tools 747, either on the level of dialogs, flows (i.e., how flows are normally traversed, and what abnormal traversals actually occur), or language objects (i.e., identifying parts of a language object never triggered or always triggered, each of which might indicate a need for revision of the language object), or even linguistic paths (based on what was said). Typical questions that are addressed in step 3909 may comprise, but are not limited to: (a) what is the typical path end users take through a specific flow?; (b) what are typical dialog paths?; (c) if a user often jumps from one node in flow X to another node in flow Y, check what the user actually meant, and then adjust flows as needed; (d) in which flows does the user enter a loop most often?; and (e) which are the most common drop-out flows? In step 3910, inputs that have triggered a specific flow may be clustered (for instance, as described above with reference to step 3908) and analyzed as a group to identify possible recommendations to designers. For example such clustering may identify possible new paths to implement, or may identify wrongly triggered inputs. In step 3911, all inputs in a solution may be clustered and compared to input groups obtained by performing clustering on inputs from a specific area of a solution (for instance, all flows pertaining to purchasing products could be treated as a region, and clustered, and the resulting groups of clustered inputs could be compared to groups obtained by performing clustering on all inputs within the solution, or compared to a grouping that was previously made when building a natural language interaction application. An example of a question that a developer might address in this fashion is whether there are any inputs that triggered a flow but do not appear in the same overall cluster group as the rest of the inputs that triggered the flow? (such a situation might indicate an incorrect language recognition rule that allowed the outlier input to trigger the flow). In step 3912, various end user satisfaction anomalies may be identified within specific flow. "Satisfaction anomalies" may of course be positive (high customer satisfaction regarding a flow or dialog path that was expected to have little importance to a customer) or negative (customers may be frustrated while trying to address a specific issue, even though the rest of the virtual assistant was found to be quite satisfactory). Satisfaction issues may be detected by techniques such as the following (additional techniques may be developed by developers while manually examining virtual assistants and then added as automated techniques within optimization tools 747): (a) identifying flows or transitions that lead to expressions of non-understanding from users, to positive or negative sentiment detection or to expressions of complaint, or to invocation of error-recovery flows; (b) user satisfaction may be directly gauged by detecting satisfaction expressions such as "thank you", "that's perfect", "OK, great", and the like; and (c) determining how relatively often a specific flow appears in a session where a certain variable (such as mv_discontent_expressed) gets a certain value indicative (in this case) of customer expression of dissatisfaction with a virtual assistant or a specific dialog or result. In step 3913, various distinct types of users may automatically be identified within optimization tools 747 (or within analytics framework 620), and a virtual assistant being optimized might be adapted to perform differently when dealing with users from different types. For example, if a group of users is noticeably less verbose in their interactions with a virtual assistant, the assistant might adopt a more proactive, directed dialog style to facilitate user success. Finally, in step 3914 machine learning techniques (of which many are known in the art), may be used to learn various confirmation or slot-filling strategies by analyzing large numbers of actual interactions (dialogs) and determining which techniques achieve the highest overall fitness (of course, fitness may be determined using various approaches, such as minimization of drop out rates, minimization of dissatisfaction rates, maximization of satisfaction rates, maximization of revenue generated, and so forth).

Figure 10F:
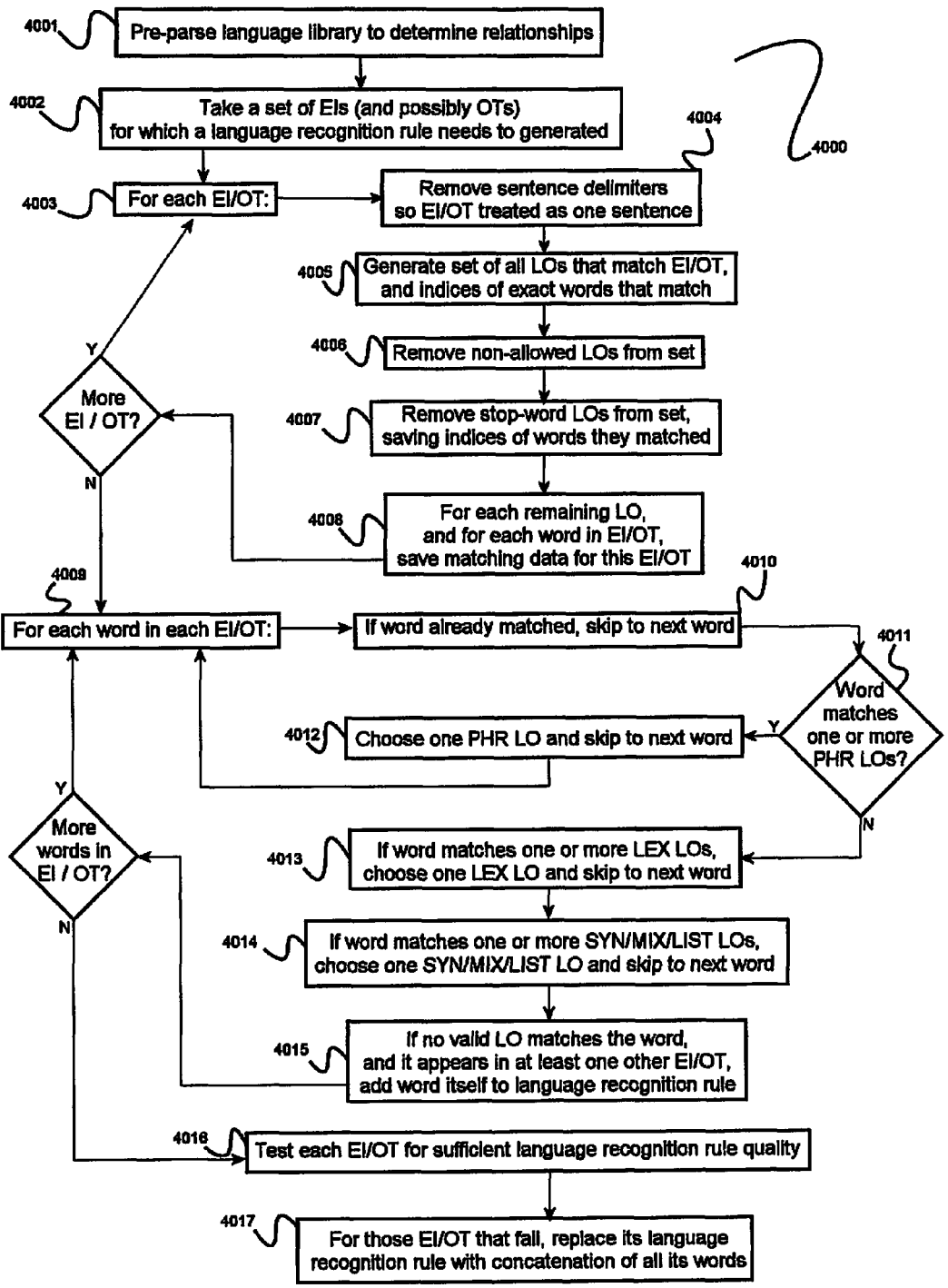
FIG. 10F is a process flow diagram illustrating a method for automated generation of language recognition rules, according to an embodiment of the invention.

FIG. 10F is a process flow diagram illustrating a method 4000 for automated generation of language recognition rules, according to an embodiment of the invention. According to the embodiment, in step 4001 one or more language libraries or resources may be pre-parsed (or pre-processed) in order to determine relationships between language objects or grammar rules (particularly by identifying for each language object which other language objects it refers to or uses directly—in its condition—or indirectly—in its constituent language object's conditions). This generates essentially a web or graph of language object relationships that may be used in subsequent steps. In step 4002, all example inputs (EIs), and optionally output texts (OTs) that were grouped together (typically via clustering as described above) and for which an automatically generated language recognition rule is sought are gathered or obtained. Then, in step 4003, a loop is commenced that is executed once for each EI/OT in the set generated in step 4002 (that is, steps 4004-4008 are performed for each EI/OT, and then execution continues with step 4009). In step 4004, any sentence delimiters within the EI/OT being handled are removed, so the text (in what follows, the EI/OT being handled will be referred to as "the text") may be treated as a single sentence. In step 4005, a set of all language objects or lexical grammar rules whose conditions can be satisfied by the text, and of the indices of each exact word in the text that each language object covers, is generated. From this set, non-allowed language objects are removed in step 4006. "Non-allowed" language objects may be higher level language objects such as THEME or LIST language objects, which may be excluded from the analyses referred to here in order that analysis and rule generation will be focused on lower-order language objects (e.g., LEX, SYN, MIX, PHR, and the like). In some cases, a special list of allowed higher order language objects may be provided or configured, so that higher order language objects present in the list will not be ignored (treated as "not allowed"). In step 4007, stop word language objects (e.g., LEX-FW objects) are typically removed from the set as well, although some stop words may be specifically excluded from this step. For example, in some embodiments special configuration code may be provided that specifically lists, for example, question-related stop words, and adds them to an "allowed language object" list so they will not be excluded in step 4007. For example, the code:

```
if (language.equalsIgnoreCase("en"))
    {
        allowedLexFws.addAll(Arrays.asList("how", "whadda", "what",
"whatd", "whatll", "whatre", "whats", "what've", "when",
"whend", "when'll", "whens", "where", "wherell", "wherere",
"which", "who", "whod", "whoever", "wholl", "whom",
```

-continued

```
"whos", "whose", "whove", "why", "whys"));
    }
    else if (language.equalsIgnoreCase("se"))
    {
        allowedLexFws.addAll(Arrays.asList("nar", "vad", "vem", ...));
    }
``` accomplishes this task. In step 4008, for each remaining language object, and for each word in the EI, the fact that it matched the particular text being processed is added to a list of relationships; at this point, this list will comprise: (a) for each EI/OT, a list of language objects that matched it, and what specific range within the text was matched; (b) for each index (word) in the text, a list of what language objects matched it specifically; and (c) for each language object and word, a list of texts (EIs and OTs) that it matched. After all EIs and OTs have been processed in the loop from 4003-4008, then in step 4009, for each word in EI/OT, in step 4010 a check is made if that word already matches one of the language objects chosen for the text being considered, and if so, that word is skipped and execution continues back to step 4009. If not, then in step 4011 a check is made if the word matches one or more PHR language objects. If it does, then in step 4012 one is chosen that: (a) uses the most words in the EI/OT; (b) matches the highest number of other EIs; and (c) is lowest in the language object hierarchy that was defined in step 4001 (that is, it doesn't refer to any of the other matching language objects, and it refers to the smallest number of language objects). Once a single PHR language object is selected, execution returns to step 4009 to consider the next word. If the check in step 4011 fails, then in step 4013 a check is made to determine if the word matches more than one LEX language object. If it does, then one LEX language object is selected that has the most probably lemma/tag combination (using a tagger module for that EI and word), and matches the highest number of other EIs/OTs. If more than one LEX is still eligible, then a disjunction of eligible language objects, or a MIX object based on the eligible objects, may be selected, and then all higher level language objects (SYNs and possibly LISTs) that match the current word and have the removed LEXs among the language objects they refer to, but not the selected LEX(s). If a LEX language object is successfully selected using the above techniques, then execution passes to the next word; otherwise, if more than one SYN/MIX/LIST matches the word (after the LEX-based cleanup in the previous step): (a) those that only match the current EI (and no other) are removed; (b) if none are left, skip to step 4015; (c) if more than one is left, choose the one that matches highest number of other EIs/OTs and is lowest in the language object hierarchy (doesn't refer to any of the other matching language objects, and refers to the smallest number of language objects); and (d) replace the LEX-based language recognition rule for the current word (possibly) chosen previously with this higher level language object. In step 4015, if no valid language objects match the word, the word was not matched by a stop-word language object, and it appears in at least one other EI/OT, then the word itself is added to the relevant language recognition rule, and execution resume in step 4009 with the next word (unless all words have been processed). Once all words from all EIs have been processed, in step 4016, each EI/OT is checked for sufficient language recognition rule quality. A language recognition has sufficient quality if: (a) it uses all words in the input text (EI/OT); or (b) it uses all words in the input except any stop words, and contains at least one word or language object; or (c) it contains at least three objects of any type; or (d) it contains at least two objects, one of which is a PHR language object. Then, in step 4017, for those EI/OT that fail, its language recognition rule is replaced by a concatenation of all its words. Once step 4016 and (as needed) step 4017 have been completed for each EI and OT, a complete set of language recognition rules for the concept being auto-coded is available for use in a virtual assistant or other natural language interaction application.

Figure 11:
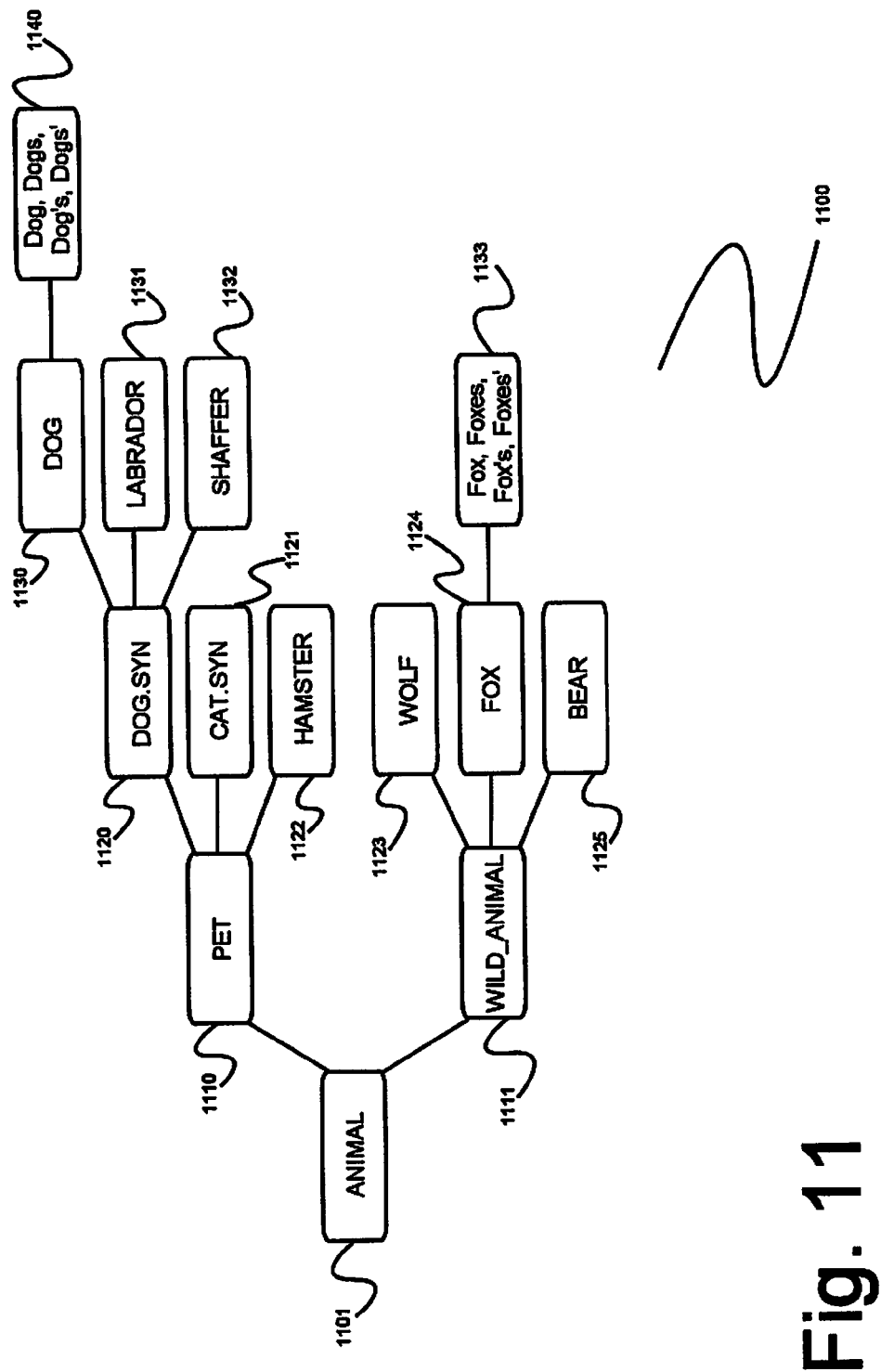
FIG. 11 is an illustration of a language object hierarchy, according to an embodiment of the invention.

In general, when building natural language interaction applications according to the invention, it is very important to have high-quality, well-structured language object libraries or lexical grammar rules, as these libraries are the raw material from which language recognition rules and ultimately natural language interaction applications are built. Language object libraries are used variously, according to the invention, to: define conditions (language recognition rules) used for matching user requests 501 with prepared responses 580; filtering relevant or less-relevant portions of user requests 501 from irrelevant or less-relevant portions, respectively; defining or organizing terminology and vocabulary in each solution's domain; recognizing concepts shared by example inputs and output texts, as well as by different example inputs; and identifying relationships between concepts automatically (although it should be appreciated by one having ordinary skill in the art that this list is merely exemplary and not exhaustive or limiting). It is evident that several of the exemplary uses listed above depend not only on the content of specific language objects, but also crucially on one or more relationships between language objects. In particular, it is generally useful to arrange language objects hierarchically (for example, according to an ontology), in the sense that objects higher in a hierarchy are broader in their linguistic scope, and those lower are conversely more linguistically narrow. For example, FIG. 11 is an illustration of an exemplary language object hierarchy 1100, according to an embodiment of the invention. The hierarchy 1100 shown in FIG. 11 would typically be a subset of a larger language object library. It comprises a parent node 1101 that is associated with a language object labeled "ANIMAL", and represents the very broad linguistic concept of "animal", for example any species belong to Kingdom animalia. Parent object "ANIMAL" has two children: "PET" 1110 and "WILD_ANIMAL" 1111, which each correspond to high-level linguistic concepts associated with certain types of animals. Clearly there are many other children that could belong to language object "ANIMAL", for example "CHORDATES", "INVERTEBRATES", and so forth; in general a particular choice of objects to include in a particular language object hierarchy will be very dependent on a particular ontological domain to which a natural language interaction application is applied. Concepts such as "INVERTEBRATES" and "CHORDATES" are not likely to be useful for dealing with everyday life (for example, distinguishing between a need for a pet store referral and a need for animal control services, each of which might be indicated by the presence of language objects "PET" and "WILD_ANIMAL", respectively); any particular parent language object such as "ANIMAL" may have widely varying children in various language object libraries, depending on particular domains of interest (although in general library models and standards 1740 might provide basic "starter kit" language object libraries with standardized hierarchies which can then be edited and extended to suit particular domains and natural language interaction applications—for example, standardized ontologies such as OpenCyc, WordNet, and the like).

In the example hierarchy given, each child of the base parent (that is, "PET" 1110 and "WILD_ANIMAL" 1111) acts as parent to its own, potentially complex, family of descendants. For example, "PET" 1110 has children "DOG.SYN" 1120 (an object of type SYN 804 that comprises various forms of the word "dog" and its synonyms), "CAT.SYN" 1121, and "HAMSTER" 1122. "DOG.SYN" 1120 in turn has children "DOG" 1130 (in this case, a basic LEX 801 object of "dog" and its inflections, which is narrower than "DOG.SYN" 1120, for example because "pooch" would not be included in "DOG" 1130 but would be in "DOG.SYN" 1120), "LABRADOR" 1131, and "SHAFFER" 1132; "DOG" 1130 consists of the terminal nodes "Dog, Dogs, Dog's, Dogs'" 1140, which is a very specific set of inflective variants of "DOG" 1130. Similarly, "WILD_ANIMAL" 1111 has children "WOLF" 1123, "FOX" 1124, and "BEAR" 1125; "FOX" 1124 includes the word forms "Fox, Foxes, Fox's, Foxes'" 1133. It should be noted that, while the illustrated hierarchy is fairly simple and in some sense "linear" (each child is related to any ancestors in only one way), language object hierarchies are not so limited. For example, "ANIMAL" 1101 could also have a child object "CANINE" (not shown), which could then have among its children both "DOG.SYN" 1120 from the "PET" 1110 family and the pair "WOLF" 1123 and "FOX" 1124 from the "WILD_ANIMAL" 1111 family, and many other similar relationships might exist, creating a language object relationships diagram that, while it has hierarchy implicit within it (some things are "higher" or "broader" in scope than others), may be modeled or viewed as a graph or a network rather than a tree. It will be appreciated by one having ordinary skill in the art that any arbitrary, linguistically sensible relationships between concepts or language objects may be used according to the invention.

According to the embodiment, each language object may be associated with a language condition which, when satisfied, indicates that a subject text "matches" or "includes" the associated language object. For example, a language object "SIGN_UP" might be associated with the conditional rule "SIGN>>up", where "SIGN" is a LEX language object, ">>" is an operator meaning "immediately followed by", and "up" means the literal word "up"; such a language object would be triggered for example by an input such as "I want to sign up for a cable TV subscription", which might also trigger language objects such as "WANT", "CABLE_TV", and "NEW_SUBSCRIPTION". Other operators that may be used in language conditions or language recognition rules may include (but are not limited to): "+" means "followed by (but not necessarily immediately)", "/" means logical OR, "&" means logical AND, "!" means logical NOT, "*" means a wildcard operator, and so forth. Other choices of symbols for logical primitives may be chosen, of course; one having ordinary skill in the art will recognize that operators such as those described are typical logic operators and are not dependent on any particular symbols used. Moreover, in various embodiments one or more variants of basic logical operators may be used; for example, since operands may themselves be language objects comprising further executable code or logic, in some embodiments both "slow" and a "fast" "immediately followed by" operators may be provided (indicated for example by corresponding symbols such as ">>" and ">", respectively). "Slow" means that only the left-hand language object operand is evaluated first; the right-hand language operand is only evaluated if the left-hand operand's logical condition is satisfied (use of "slow" operators may actually improve performance, since unnecessary operations would be avoided). Furthermore, language recognition rules according to the invention may be pattern-based or grammar-based, as will be appreciated by one having ordinary skill in the art.

With these operators in mind, various rules may be used to assist in automatic creation of language or concept hierarchies. For example, a prioritization rule may provide that (A/B)>(A)>(A&B)>(A+B)>A>>B), which means a language object with the leftmost logical expression as a condition (i.e., A OR B) would be an ancestor of each the other language objects; (A) would be an ancestor of (A&B), (A+B), and (A>>B); (A&B) would be an ancestor of (A+B) and (A>>B); and (A+B) would be an ancestor of (A>>B). Another prioritization rule may be that, if a first language object A is preceded by an operator "!" (i.e., "NOT") or an operator "~" (i.e., "MAYBE") in a condition code for a second language operator B, then the relationship between A and B is undefined. Similarly, where a relationship exists between A and B that comprises a mixture of the OR operator and one or more of the AND, "Followed By", or "Immediately Followed By" operators, then the relationship between A and B would be undefined. Another common prioritization rule is that, if A>B and B>C, then necessarily A>C. It will be appreciated by one having ordinary skill in the art that these prioritization rules are exemplary in nature, and other rules could be used according to the invention as well.

Figure 12:
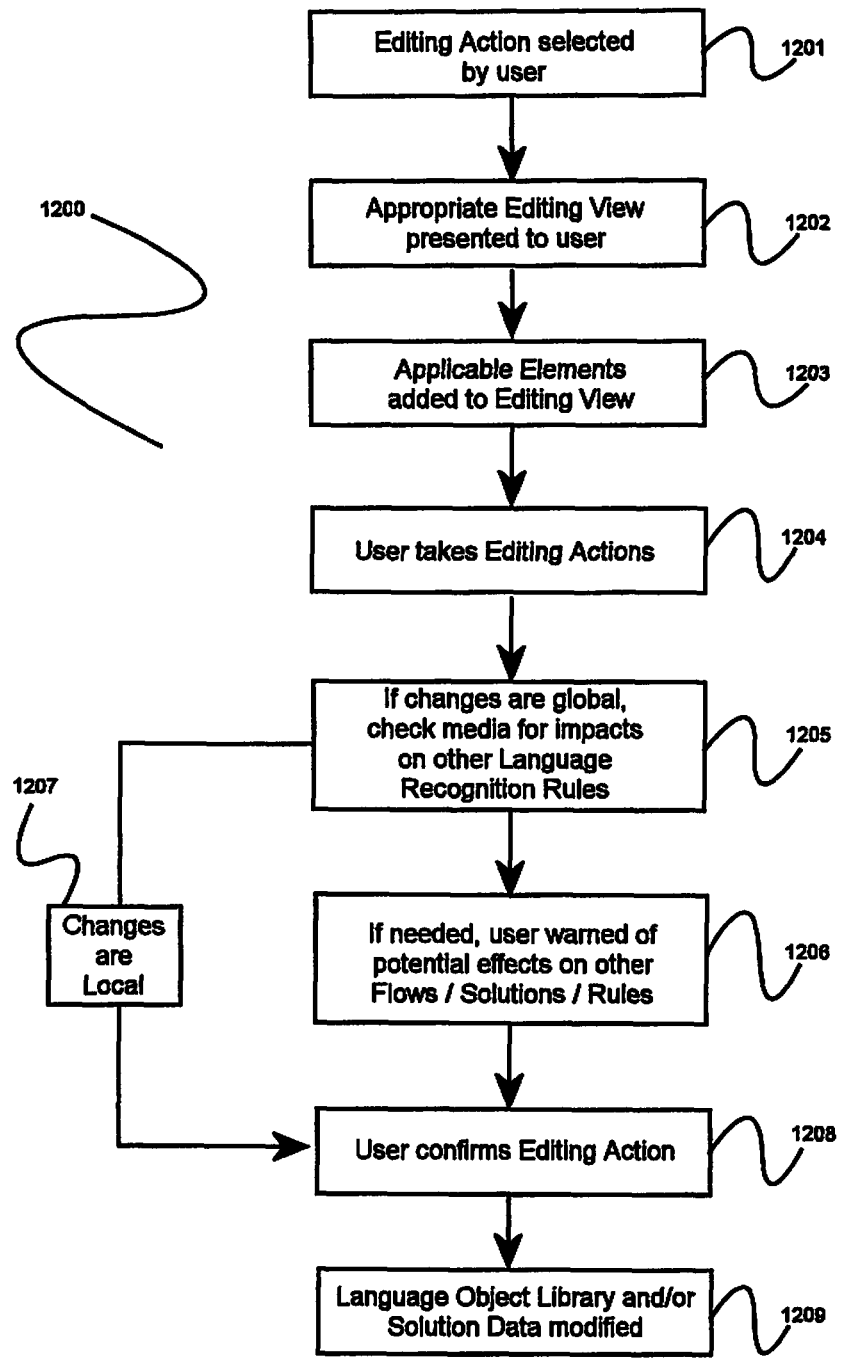
FIG. 12 is a process flow diagram illustrating a method for graphically editing language objects, according to an embodiment of the invention.

FIG. 12 is a process flow diagram illustrating a method 1200 for graphically editing language objects, according to an embodiment of the invention. According to the embodiment, in step 1201 an editing action is selected by a user (various editing actions may be presented as options to a user, according to the invention, including but not limited to "create new language object", "edit language object", "delete language object", "change scope of a language object"—by adding or removing pieces of any associated language condition—, and so forth). Based on a selection made in step 1201, in step 1202 an appropriate editing view is presented to the user, and in step 1203 one or more applicable elements may be added to the editing view presented in step 1202. For example, if a user elects to create a new language object after selecting one or more concepts or language objects, a "Create New Language Object" window may be presented, and icons representing the previously selected concepts or language objects may be placed in an editing pane within the window. These steps allow the user to carry out various editing operations in step 1204, for example by specifying various relationships between the selected elements (for instance, by building a condition statement using the selected elements and various logical operators that may be dragged into the editing pane, the relative positioning of the various elements and operators being used to generate a formal logical language condition accordingly). The user may specify whether the changes being made are global in nature, or are to be applied only locally. Then, once a user has completed such editing actions, in step 1205, if the changes are global in nature, the system automatically checks for possible impacts on other language recognition rules (or conditions), language objects, or flows within the same natural language interaction application (or even another, if a change is being made for example to a language library). If needed (that is, if other objects would be affected by a proposed change made by a user), then in step 1206 the user may be warned of the existence of various effects on other flows, solutions (applications), or rules, in order to minimize the possibility of a user's inadvertently causing "collateral damage" while editing, and execution then continues to step 1208. If a user's changes are purely local (step 1207), then execution passes from step 1205 directly to step 1208. In step 1208, the user is prompted to confirm the editing actions carried out in step 1204; if a user confirms her editing actions, then changes are made accordingly in each affected flow, solution, or rule in step 1209.

Users of build environment 640 will commonly have widely varying degrees of technical and linguistic skill. For example, according to some embodiments business users may be provided with access to build environment 640 to enable them to edit existing natural language interaction applications (or even to build new ones) without having to directly write complex code; in other cases advanced natural language developers may choose to modify or test a globally-used language library containing many language objects and language recognition rules, and would typically elect to use more advanced tools that depend on a user's having greater familiarity with technical details of systems and methods of the invention. Therefore, in most embodiments various means of interacting with natural language interaction applications, ranging from highly abstract graphical representations to advanced code editing tools, will be made available to various users as needed. For example, in various embodiments language objects may be presented to users as: (a) auto-formatted text with code highlighting; (b) auto-formatted text with linguistic commentary added; (c) syntax trees or graphs; (d) schemas, with LOs and words used as building blocks. In many such visualizations, users will be provided with a capability to select an element (such as an LO or a word) and to "drill into" or to expand it to see any embedded content, or to toggle between different views easily.

According to the invention, a language object's scope reflects the type of user input that might match the language object (LO). For example, the following list shows a variety of potential descriptions of LOs, in which the portion in parentheses would typically be added by a user to enhance legibility of natural language interaction application code, and the remainder would be added automatically:

BANK1.NOUN.LEX→All inflections of the noun bank (financial institution)
BANK2.NOUN.LEX→All inflections of the noun bank (river bank etc.)
BANK1.NOUN.SYN→synonyms of the noun bank (e.g., bank, safe, savings bank, etc.)
BANK1.NOUN.LIST→list of actual instances of banks (financial institutions)
OPEN_BANK_ACCOUNT.PHT→Phrases with meaning "open a bank account", or similar
BANK1.THEME→Words that identify the theme "bank" (financial institution)
BANK2.NOUN.SYN→Synonyms of the noun bank (such as "river bank")
. . .

In general, addition of language objects may be desirable when a user desires to link two concepts, to add an unrecognized concept, or to edit an existing recognition. For example, to link two concepts, perhaps one from a question and one from an associated answer, in order to add them to an existing recognition, a "Add a new language object" window or dialog box may be opened, with the concepts to be linked present as graphical objects within the new window or dialog box. If either of the concepts already exists within a language library or a solution, the user may be presented with a drop-down box or similar graphical interface element to allow the user to select an appropriate scope for the concept (e.g., LEX, SYN, PHR, THEME, etc.). In general, if any of the concepts do not already have any associated language objects, a user may be prompted to create one, and optionally then be prompted to use an inflector and/or a part-of-speech tagger, if available. In some cases a user may want to add an unrecognized concept from a question to a recognition (even if it was not repeated in an associated answer); in this case, only one element (the unrecognized) word would be presented in the ensuing "add a new language object" window or dialog box, but everything else would proceed as just described. In some cases, a user may desire to edit an existing recognition, for instance by adding a concept from a question or answer by adding a concept to the recognition. If the concept to be added was not previously represented by a language object, an inflector may be invoked; otherwise (for instance, to add a new SYN LO), the user is presented as before with an "Add new language object" dialog.

A business user might want to remove an element from a language object condition, either to make it more narrow (e.g., removing CAT from ANIMAL=CAT/DOG/BIRD) or wider (e.g., removing WILD from WILD_ANIMALS=FOX/WOLF/(WILD>>CAT)). In either case, the user will generally be able to make a choice as to whether the change will be local (i.e. applied only to the current place (recognition or condition of another LO) where the LO is used), or global (where the LO itself is changed). Clearly, a global change may influence all the other places where the same LO is used. In this case, the user should be warned of consequences and see the list of triggering changes (which new inputs/variants receive other answers than before) if that macro gets changed. Another way to reduce scope of a LO could be to remove a subtraction of it "on the outside" (ANIMAL-CAT) instead of changing the same LO "on the inside". Similarly, a business user might elect to remove elements from a language object condition or language recognition rule. Generally, the business user may drag a selected word/phrase from a sentence to a "puzzle piece" within a graphical visualization of an LO, which adds it automatically, and the user may then select an appropriate concept level (i.e., only the dragged word, or all its inflections, or its inflections and synonyms, and so forth) or create a LEX LO for it with the help of an inflector. Similarly, a business user may click on any puzzle piece (operator or LO) to see a list of alternatives it may be replaced with (more or less strict LO's or operators). The change can be saved locally or globally, as described above, and (triggering) effects of the change may of course preferably be shown to the user.

Figure 13:
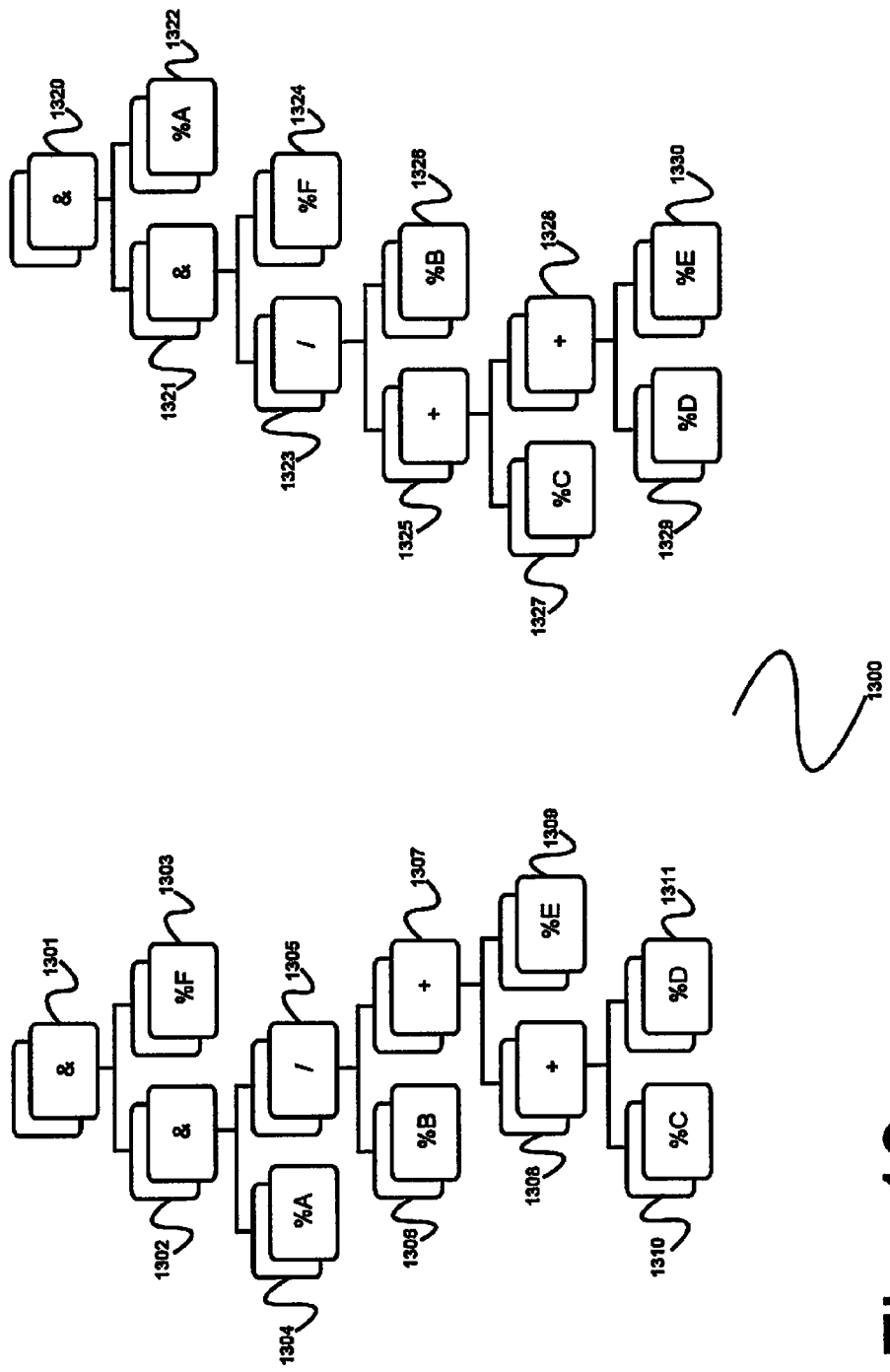
FIG. 13 is a diagram graphically illustrating a pair of logically equivalent complex language recognition rules, according to an embodiment of the invention.

FIG. 13 is a diagram graphically illustrating a pair 1300 of logically equivalent complex language recognition rules, according to an embodiment of the invention. The leftmost diagram of pair 1300 corresponds to the expression: %A & (%B/(%C+%D+%E)) & %F; the rightmost diagram corresponds to the expression: ((%C+(%D+%E))/%B) & %F & %A. This correspondence can be easily seen by aligning their elements with the corresponding reference numbers from FIG. 13: %A 1304 & 1302 (%B 1306/1305 (%C 1310+1308 %D 1311+1307 % E 1309)) & 1301 %F 1303 and ((%C 1327+1325 (%D 1329+1326 %E 1330))/1323 %B 1326) & 1321 %F 1324 & 1320 %A 1322. While the correspondence between the textual expressions and the diagrams can be seen readily, it is not clear at first glance whether there is any formal logical equivalence between the leftmost diagram (first expression) and the rightmost diagram (second expression). This is a common issue occurring when automatically generating or comparing complex language recognition rules. In order to enable automated equivalence testing and compression/expansion of complex language recognition rules, a formal representation of hierarchical relationships is desirable. For example one could, from the same user input, generate many possible matching language recognition rules using automatic means described above, which might appear different to a user despite having identical scope and meaning. Accordingly, a set of rules is disclosed herein that may be used, in various embodiments of the invention, to accomplish these tasks.

We introduce the notion of node contexts, as an alternative way for exploring semantics of a language condition syntax tree and for determining semantic similarity and relations between two syntax trees. A node context is the complete set of paths between a specific node and all leaves in the tree containing the node. The set may be divided into three subsets—the above-context, the below-context, and the side-context. Each context path may be considered as an array of context segments, and each context segment consists of a plurality of elements taken from the following set of three elements: (1) Vertical direction—up ↑ or down ↓; (2) Horizontal direction—left ←, right → or n/a ↔; and (3) Node content—an operator or a language object, word or script condition. Horizontal direction is generally only relevant for order-aware operators (i.e. the followed by and directly followed by). After writing out a path as described above, the path needs is generally compressed through the following steps, in the given order, starting from the beginning until no more compression can be performed:

1) If a sequence of three elements is repeated two or more times without anything else in-between, the repeats are removed.
2) If a path contains an upward and downward sequence of segments with same order-aware operator, but mixed horizontal directions, e.g.
   leaf ↑←+↑←+↑→+ or
   leaf ↑←+↑→+↓→+↓←
   then that sequence is simplified by using the highest (i.e. the last) upward segment and the highest (i.e. the first) downward segment. Applied to the examples above, respectively:
   leaf ↑→+
   leaf ↑→+↓→
3) If a path contains a downward sequence with same order-aware operator in all segments, if its first segment has the n/a horizontal direction, and if the other segments contain different horizontal directions e.g.:
   ↓↔+↓←+↓→
   ↓↔+↓→+↓←+↓→
   then all segments but the first one in that sequence should be replaced by in total one segment with the n/a horizontal direction, i.e.:
   ↓↔+↓↔
4) If a path contains an upward sequence with same order-aware operator in all segments, if it's last segment has the n/a horizontal direction, and if the other segments contain different horizontal directions e.g.:
   ↑←+↑→+↑↔
   ↑→+↑←+↑→+↑↔
   ↑↔+↑↔
   then all segments but the last one in that sequence should be replaced by in total one segment with the n/a horizontal direction, i.e.:
   ↑↔+↑↔

Figure 14:
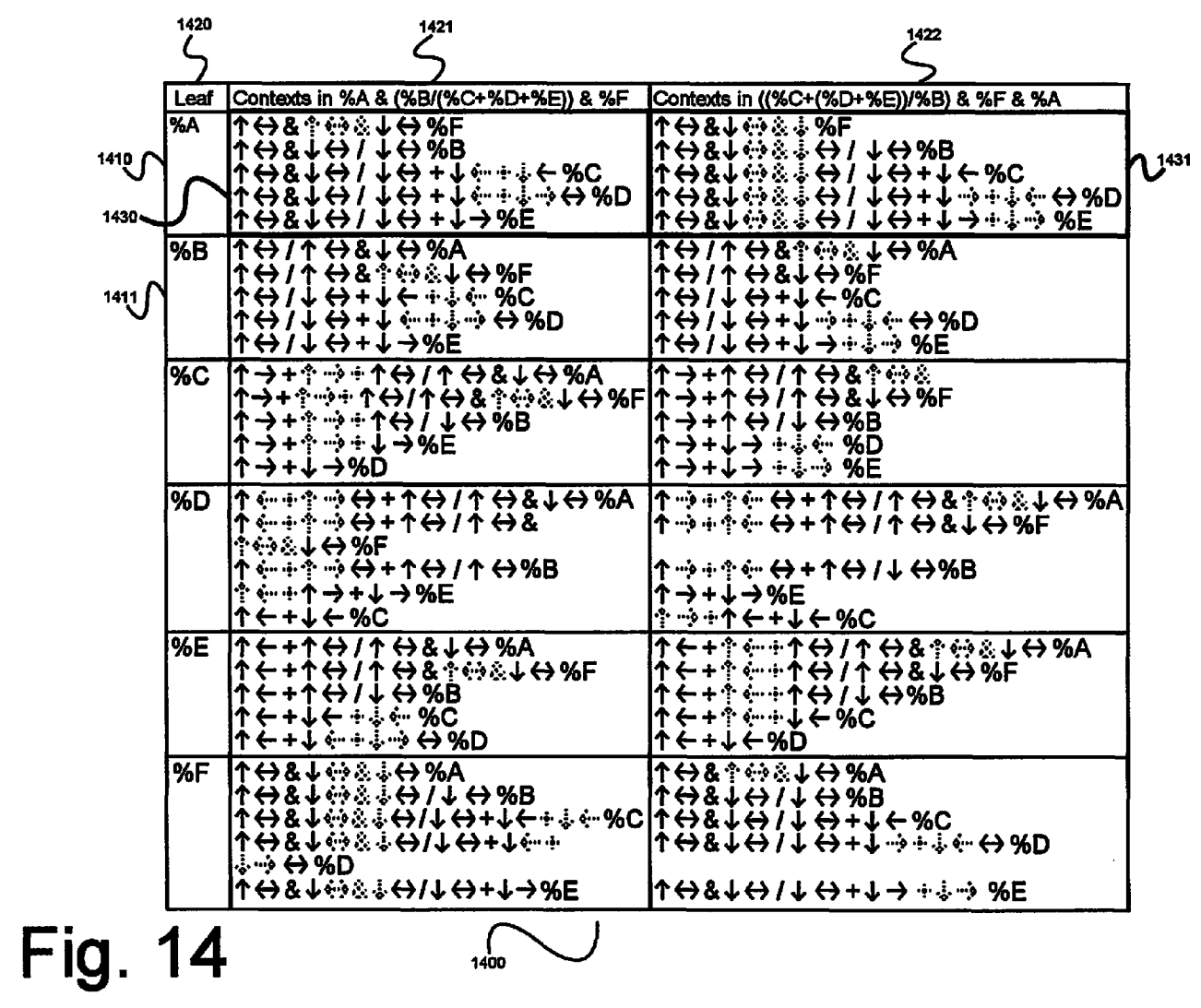

FIG. 14 is a diagram illustrating an exemplary equivalence 1400 between the two complex language recognition rules shown in FIG. 13, according to an embodiment of the invention. The diagrams in FIG. 14 are generated using the rules just described, starting with the logical expressions given above (and repeated at the heads of column 1421 and column 1422). The entries in column 1420 correspond to the various LOs %A-%F present in the expressions, and each row 1410, 1411, . . . represents one of the LOs. For example, cell 1430 corresponds to LO %A's node context in the expression at the head of column 1421 (which corresponds to the expression represented by the leftmost diagram in FIG. 13). Similarly, cell 1431 corresponds to LO %A's node context in the expression at the head of column 1422 (which corresponds to the expression represented by the rightmost diagram in FIG. 13). It should be clear that both conditions shown in FIG. 14 have the same leaf nodes, and that all leaf nodes have the same node contexts, meaning that the two conditions are logically equivalent even if their binary syntax trees are not. In general, all paths that start with an up-segment (i.e. their first part is ↑) form an above-context of a node, and all paths that start with a down-segment form a below-context of that node. Paths that start with ↑, but contain/↓ are considered to form a side-context of a node.

Figure 15:
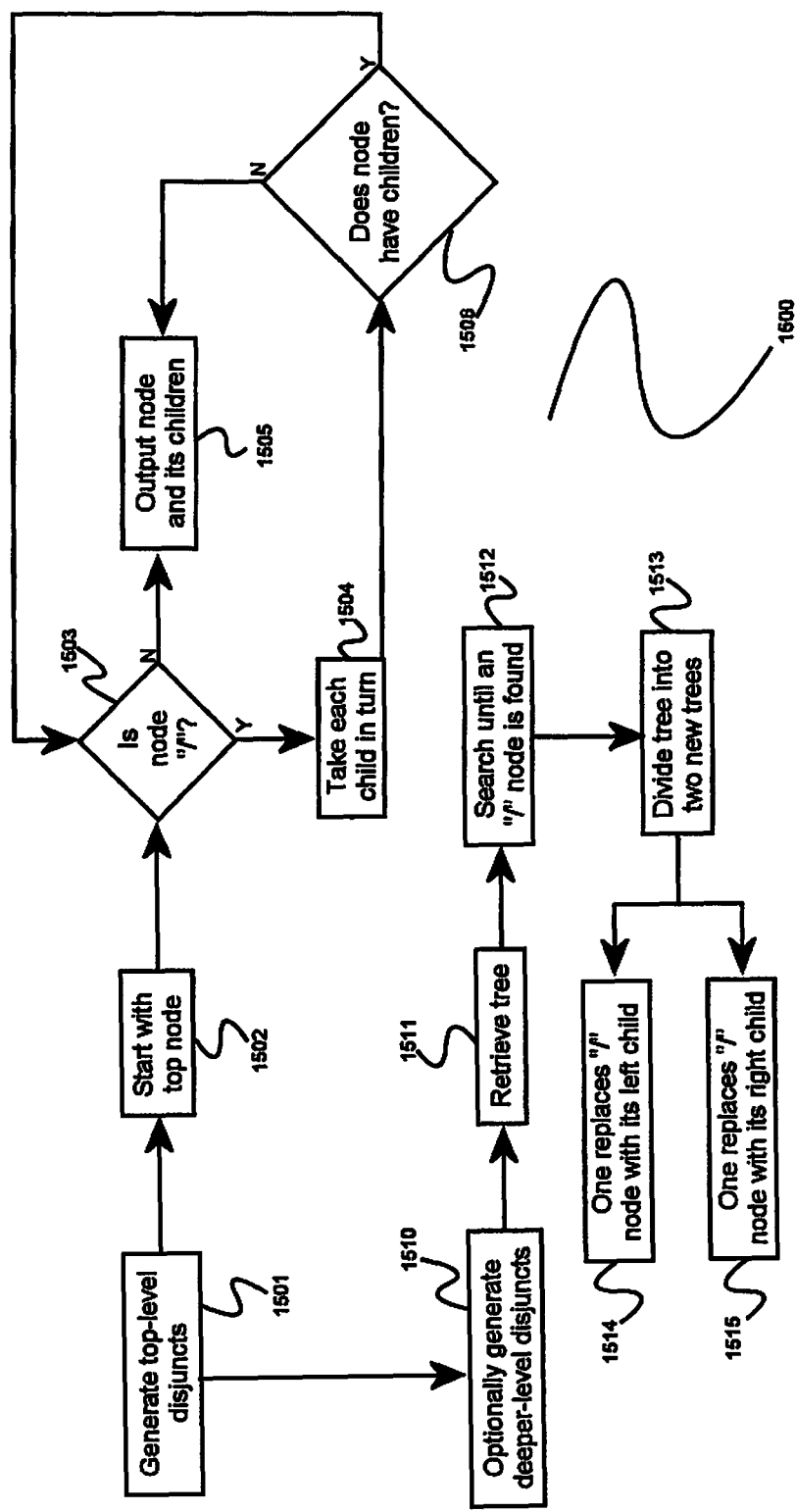
FIG. 15 is a process flow diagram illustrating a method for splitting complex language recognition rules, according to an embodiment of the invention.

FIG. 15 is a process flow diagram illustrating a method 1500 for splitting complex language recognition rules, according to an embodiment of the invention. According to the embodiment, in step 1501 the top-level disjuncts of a tree are generated; this is carried out by the sub-process starting with step 1502. After top-level disjuncts have been generated, optionally deeper-level disjuncts may be generated in step 1510 (using the process described starting with step 1502). Considering first the generation of top-level disjuncts (step 1501), in step 1502 the process starts with the top node of a tree (sometimes also referred to as the root node). Then, in step 1503, a check is made to see whether the content of the node is "/" (the "OR" operator). If it is, then in step 1504 each child of the node tested in step 1503 (initially the top node, but later possibly other nodes) is retrieved in turn. In step 1506, a check is made whether the newly retrieved node has children or not. If the node is childless, then in step 1505 the node is output; if the node has children then in step 1503 it is checked to see whether its content is equal to "/", and execution continues and passed to step 1503. When the test of step 1503 fails (that is, a node tested does not have "/" as its content), then execution passes to step 1505 and the node (which failed the test in step 1503) and all of its children are output from the process. To generate deeper-level disjuncts in step 1510, the process starts in step 1511 with retrieval of a tree to be operated on (generally, as shown in FIG. 15, deeper-level disjuncts are not generated until after top-level disjuncts have been generated, so no trees retrieved in step 1511 will have an "/" in its top node). Then, in step 1512, the retrieved tree is searched until an OR node is found (that is, a node with its content being "/"). Then, in step 1513, the tree is divided into two new trees, each of which may itself be examined for deeper-level disjuncts in the same fashion. In step 1514, one of the two new trees replaces the newly found "/" node with its left child, while in step 1515 the other replaces the "/" node with its right child.

Figure 16:
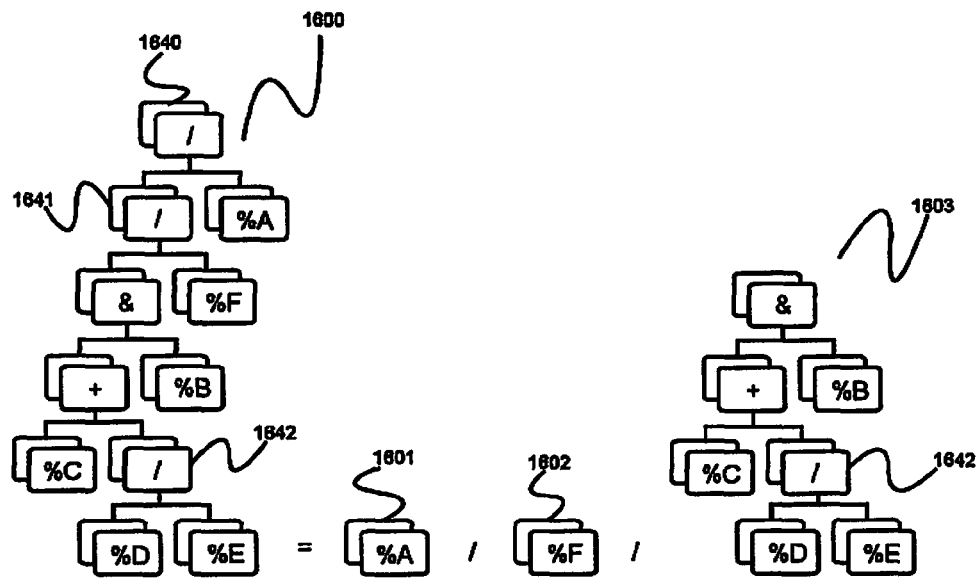
FIG. 16 is an illustration of an exemplary splitting of a complex language recognition rule into smaller disjuncts, according to an embodiment of the invention.
Figure 16:
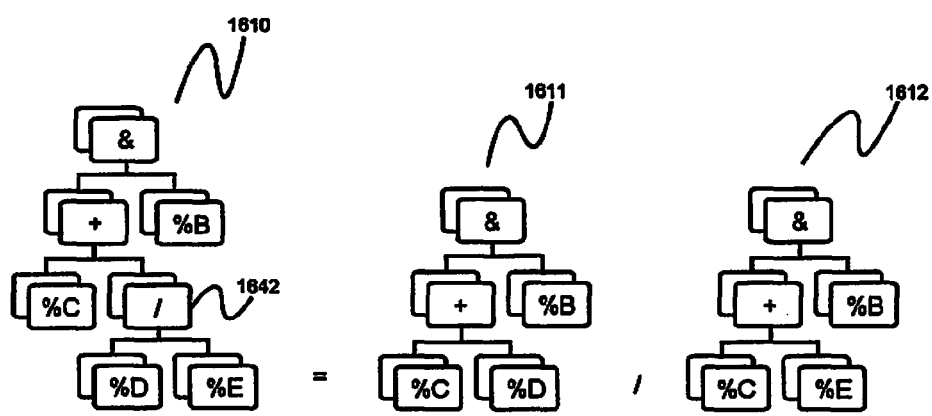

FIG. 16 is an illustration of an exemplary splitting of a complex language recognition rule into smaller disjuncts using the process 1500 described in FIG. 15. Initial tree 1600 is first split into its top-level disjuncts in step 1501. Starting with the top node 1640 in step 1502, it can be seen that the node is indeed an OR node ("/"), so in step 1503 it satisfies the test and in step 1504 each child is taken in turn. The first child is %A, which in step 1506 is found to have no children, so it is output as is in step 1505 as tree 1601 (with only one node). The second child is "/" node 1641, which is determined in step 1506 to have children, so it passes to step 1503, where of course it passes the test (since it is "/"), and each of its children is taken in turn. The first of its children is %F, which is retrieved in step 1504, tested in step 1506 and found childless, and output in step 1505 as tree 1602 (with only one node). The second child is "&", which is retrieved in step 1504, tested in step 1506 and found to have children, and passed to step 1503, where it fails the test (it is not equal to "/"), and thus the node and all of its children are output as tree 1603. This tree 1610 is then taken into step 1510 to determine its deeper-level disjuncts. In step 1512, tree 1610 is searched until a node equaling "/" is found; that node is clearly node 1642, it being the only node in tree 1610 that is an OR node. In step 1513 tree 1610 is divided into two new trees; the first 1611 being created in step 1514 and comprising tree 1610 with node 1642 replaced by its left child, and the second 1612 being created in step 1515 and comprising tree 1610 with node 1642 replaced by its right child.

Figure 17:
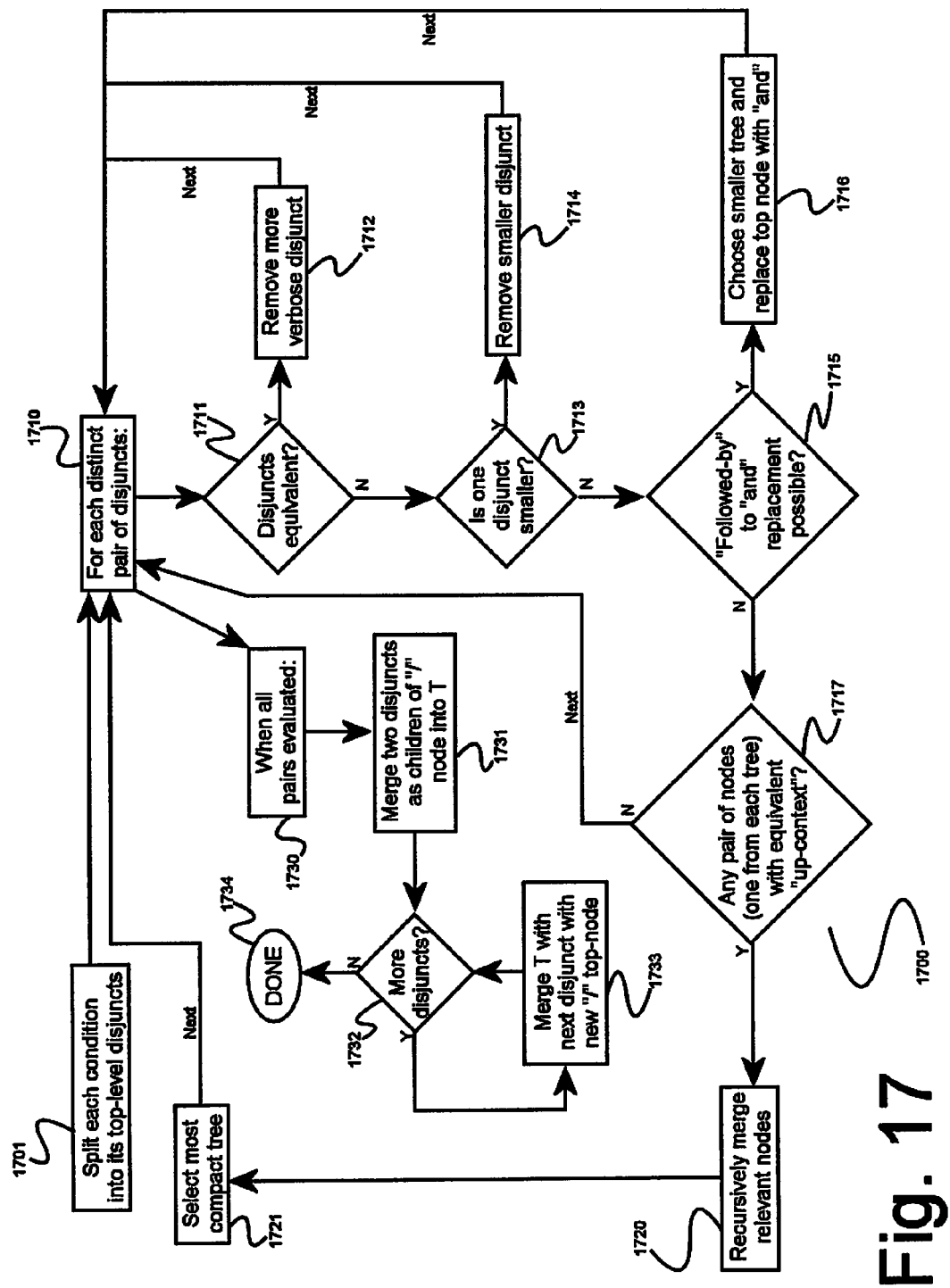
FIG. 17 is a process flow diagram illustrating a method for merging language recognition rules, according to an embodiment of the invention.

While in some situations dividing a tree may be useful, in others it may be useful to merge several trees into one logically equivalent tree. Accordingly, FIG. 17 is a process flow diagram illustrating a method 1700 for merging language recognition rules, according to an embodiment of the invention. According to the embodiment, in step 1701 each tree (i.e., language condition or language recognition rule) to be merged is split into its top-level disjuncts using method 1500. Then, in step 1710, each distinct pair of disjuncts is considered in turn (i.e., if two trees which each could be decomposed into three top-level disjuncts were to be merged, there would be six top-level disjuncts which would then be handled in fifteen separate iterations of step 1710, since there are fifteen distinct pairs of disjuncts). For each pair, in step 1711 the two disjuncts are checked for equivalence (meaning they are converted into a form such as that shown in FIG. 14 and then compared to each other). If the two disjuncts are equivalent, then in step 1712 the more verbose of the two is removed from the pool of top-level disjuncts (the "more verbose" disjunct is that which has more nodes in it), and execution returns to step 1710 to consider the next pair. If the two disjuncts are not equivalent, then in step 1713 a check is made to see whether one of the disjuncts is smaller in scope than the other; if so, in step 1714 the smaller scope disjunct is removed from the pool and execution returns to step 1710 for consideration of the next pair of disjuncts. If neither of the pair is smaller in scope than the other, then in step 1715 a check is made to see whether replacement of a "followed by" operator (">", "+", or ">>") by an AND operator ("&") is possible. Specifically, if both trees have a "followed by" operator in their top nodes, and the left child of a first condition's top node is equivalent (in the sense of FIG. 14) to the right child of a second condition's top node (or vice versa), then the two conditions are replaced by a new condition that equals the smaller of the two original conditions, where the top node's content (a "followed by" operator) is replaced by an AND operator. For example, by this rule (%A+%B)/(%B+%A)=%A & %B. This substitution is carried out in step 1716, and execution returns to step 1710 for consideration of the next pair. If the test of step 1715 is not met, then in step 1717 a test is made to determine whether the pair of nodes (one from each tree) has equivalent above-contexts; if so, then the two conditions are recursively merged in step 1720 and, in step 1721, the more compact tree is selected and the other discarded, and execution returns to step 1710 for consideration of the next pair.

Once all pairs have been evaluated (i.e., once execution arrives at step 1730), then in step 1731 one pair of disjuncts is merged by creating a temporary tree T with "/" as its top node and each of the two disjuncts as children of the top node. Then, in step 1732 a test is made to see if there remain more disjuncts remaining in the pool; if so, then in step 1733 T is merged with a next disjunct, with a new "/" top node added, the previous version of T as one child thereof and the next disjunct as the other child. If there are no more disjuncts in step 1732, then in step 1734 the process is complete and a merged tree (T) is available for use.

Figure 18:
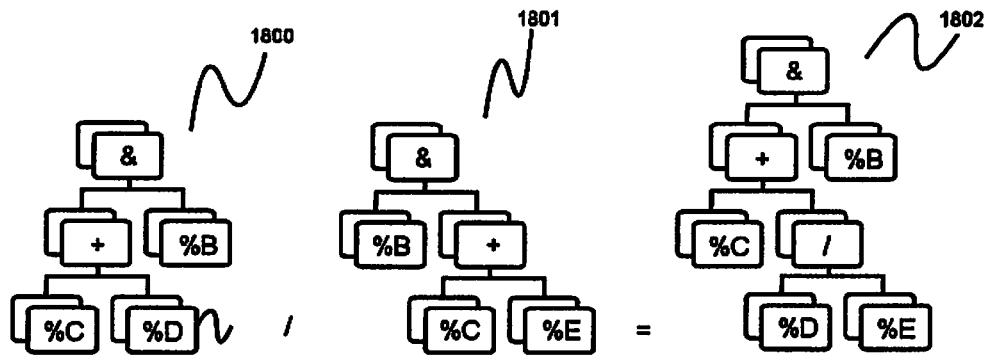
FIG. 18 is an illustration of an exemplary merging of a plurality of language recognition rules into a complex language recognition rule, according to an embodiment of the invention.
Figure 18:
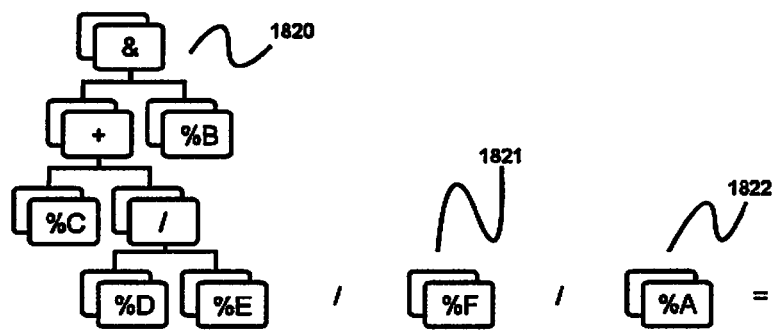
Figure 18:
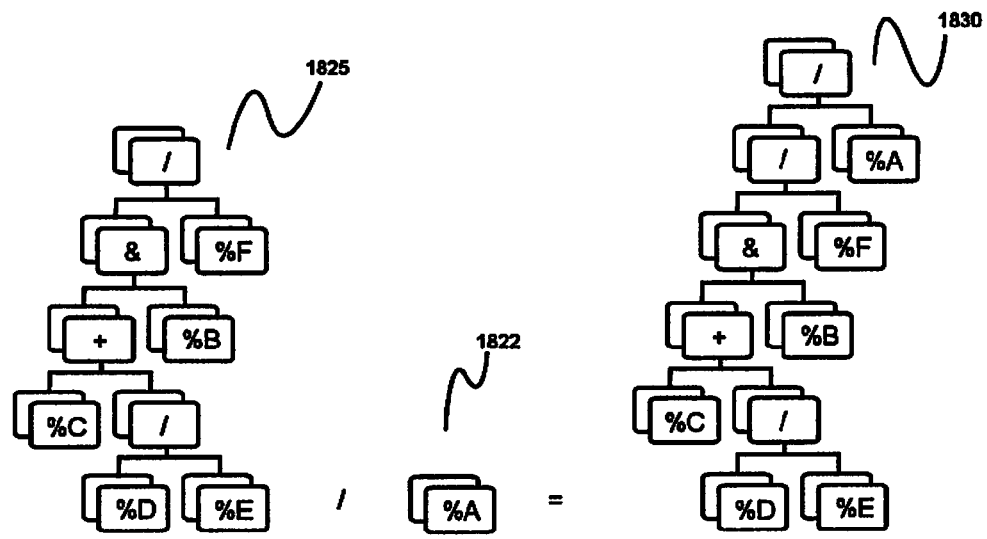

FIG. 18 is an illustration of an exemplary merging of a plurality of language recognition rules into a complex language recognition rule, according to an embodiment of the invention in accordance method 1700. An initial pair of disjuncts 1800, 1801 is merged using the above-context equivalence rule to give 1802; this new tree 1820 is then merged with %F 1821 and %A 1822 as follows: first a new subtree 1825 is created with "/" as its top node and tree 1820 and node %F 1821 as the children of the top node, then %A 1822 is merged with T in the same way to give tree 1830.

Figure 19:
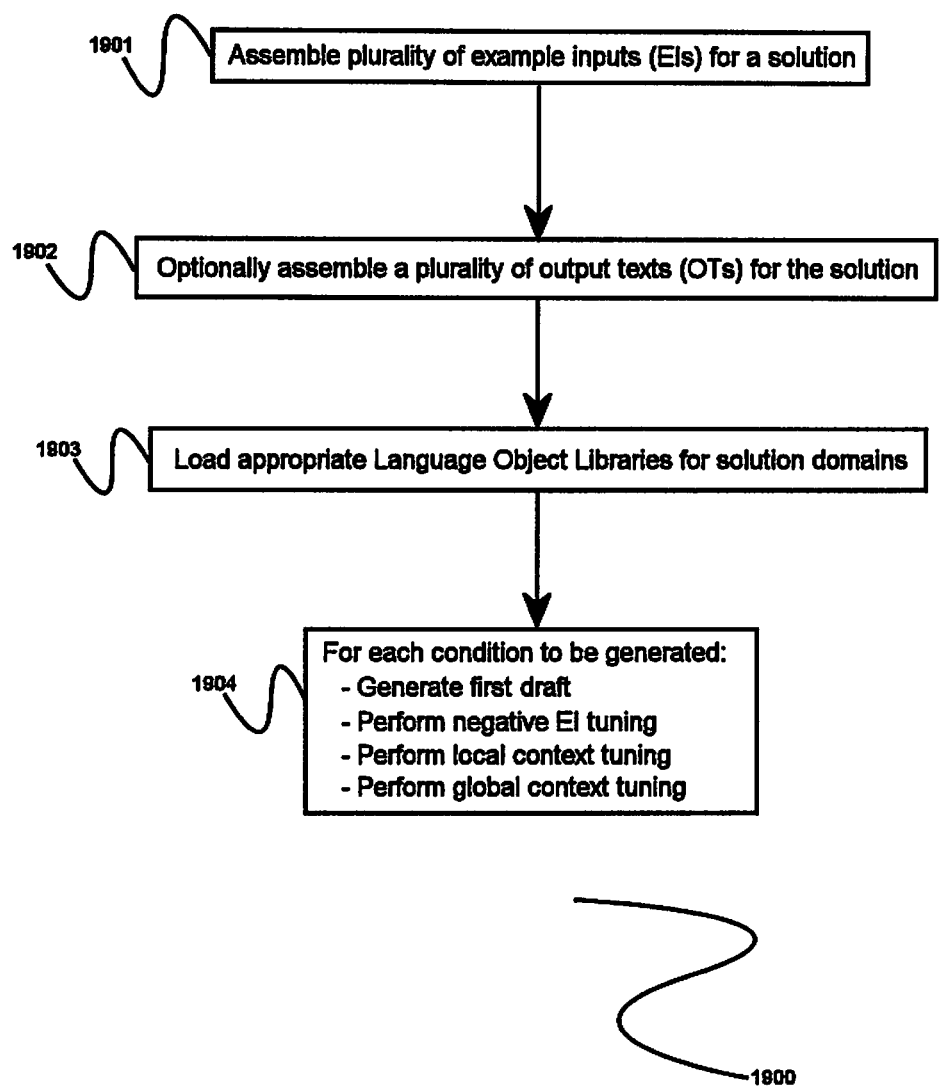
FIG. 19 is a process flow diagram illustrating a method for auto-generation of language recognition rules, according to an embodiment of the invention.

FIG. 19 is a process flow diagram illustrating a method 1900 for auto-generation of language recognition rules, according to an embodiment of the invention. According to the embodiment, in a first step 1901 a plurality of example inputs (EIs) are assembled for a solution. Then, in optional step 1902, a plurality of output texts (OTs) may also be assembled for the solution. In step 1903, appropriate language object libraries are loaded for the solution; generally language object libraries are selected based on their relevance or potential relevance to one or more domains handled by the proposed new solution. Finally, at a high level, in step 1904 a series of steps are performed iteratively to automatically generate a new solution. Specifically, a first draft is generated (that is, a first candidate solution), then negative EI tuning is performed, local context tuning is performed, and global context running is performed; any of these steps may be performed iteratively.

Some general rules may be applied during this process of automatic solution code generation. For example, texts from output nodes in the same flow as a current condition, located above or below it in the flow, are considered relevant. If there are more than some specified number of these texts, then only the "nearest" subset of them may be considered ("nearness" being for example a measure of the number of input consuming transitions between a specific input and the desired output). Also, texts from output nodes from other flows and from nodes in other branches of a current flow than the current condition's node are generally considered irrelevant.

Figure 20:
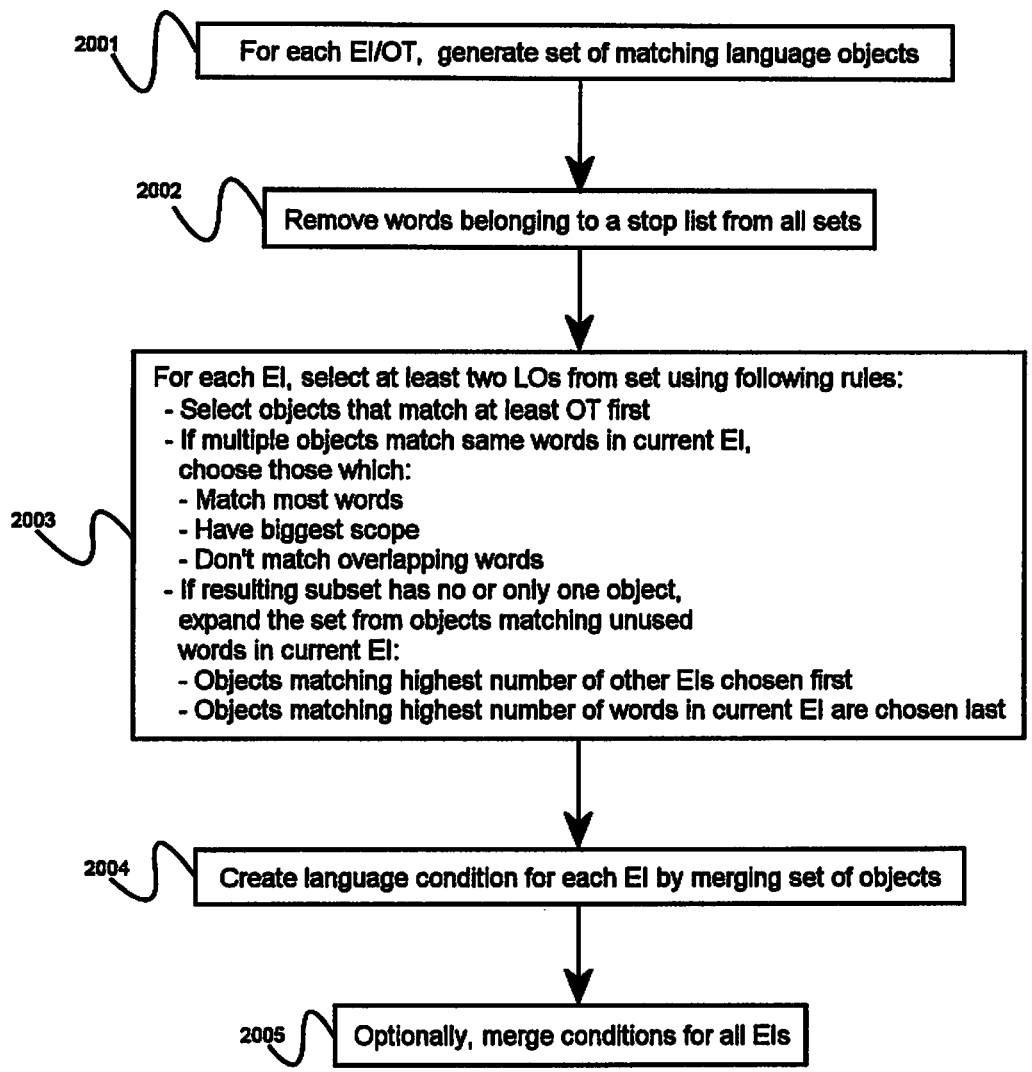
FIG. 20 is a process flow diagram illustrating a method for generating a first recognition rule draft, according to an embodiment of the invention.

FIG. 20 is a process flow diagram illustrating a method 2000 for generating a first recognition rule draft, according to an embodiment of the invention. According to the embodiment, in step 2001 a set of matching language objects (LOs) is generated for each example input (EI) or output text (OT) present in a set of example inputs (EIs) and a (possibly empty) set of output texts (OTs) related to a single language condition or language recognition rule. In step 2001, in addition to finding a set of matching LOs, method 2000 also finds for each LO a set of index lists of words in the input that it matches. For example, if an EI, "I would like to travel and I am going to do that" is provided, and a language object library associated with the corresponding solution has a language object % PHR.MIGHT_DO_IN_FUTURE that has a condition, "% PHR.WOULD_LIKE_TO/% PHR.BE_GOING_TO/% PHR.MIGHT", then a matching set for that EI would comprise at least the following objects with sets of index lists: (1) % PHR.MIGHT_DO_IN_FUTURE: ([1,2,3], [7,8,9])—corresponding to [would, like, to] and [am, going, to]; (2) % PHR.WOULD_LIKE_TO: ([1,2,3]); and (3) PHR.GOING_TO: ([7,8,9]). In general, if there are words in the EI that match no existing language objects, they are added to the set as bare word forms, for example (using the example EI just discussed), "I: ([0],[6])".

Next, in step 2002, any words in the text string being processed that belong to one or more stop lists (typically comprising language objects classified for example as functional words—LEX_FW—such as "the", "a", "his", and the like) are removed from all sets. Then, in step 2003, from each EI's set of matching language objects and words, at least two objects are chosen, following these criteria:
  a. The objects that match at least one of the OTs are chosen first;
  b. If multiple chosen objects match same words in the current EI, then only the subset of them that:
    i. match most words
    ii. has biggest scope (is biggest according to condition comparison)
    iii. doesn't match overlapping words
    is kept;
  c. If the resulting subset contains less than two objects, then, out of the objects matching unused words in the current EI, more objects are selected in the following order, each time followed by the step b.:
    i. The objects that match the highest number of other EIs are chosen next; and
  d. The objects that match the highest number of words in the current EI are chosen last.

Once step 2003 is complete, in step 2004 a language recognition rule or grammar rule is created for each example input by merging any language objects found in step 2003, in the order in which they appear in the example input, with a FOLLOWED_BY operator placed between each language object. Finally, in step 2005 rules for all example inputs of the same input group may optionally be merged following the process described above with reference to FIG. 17. This optional step may be omitted when language condition improvement is contemplated, for example by tuning language conditions using negative example inputs (see FIG. 21), or using a condition's local (flow) or global context (both of which are described below, with reference to FIGS. 22 and 23, respectively).

Figure 21:
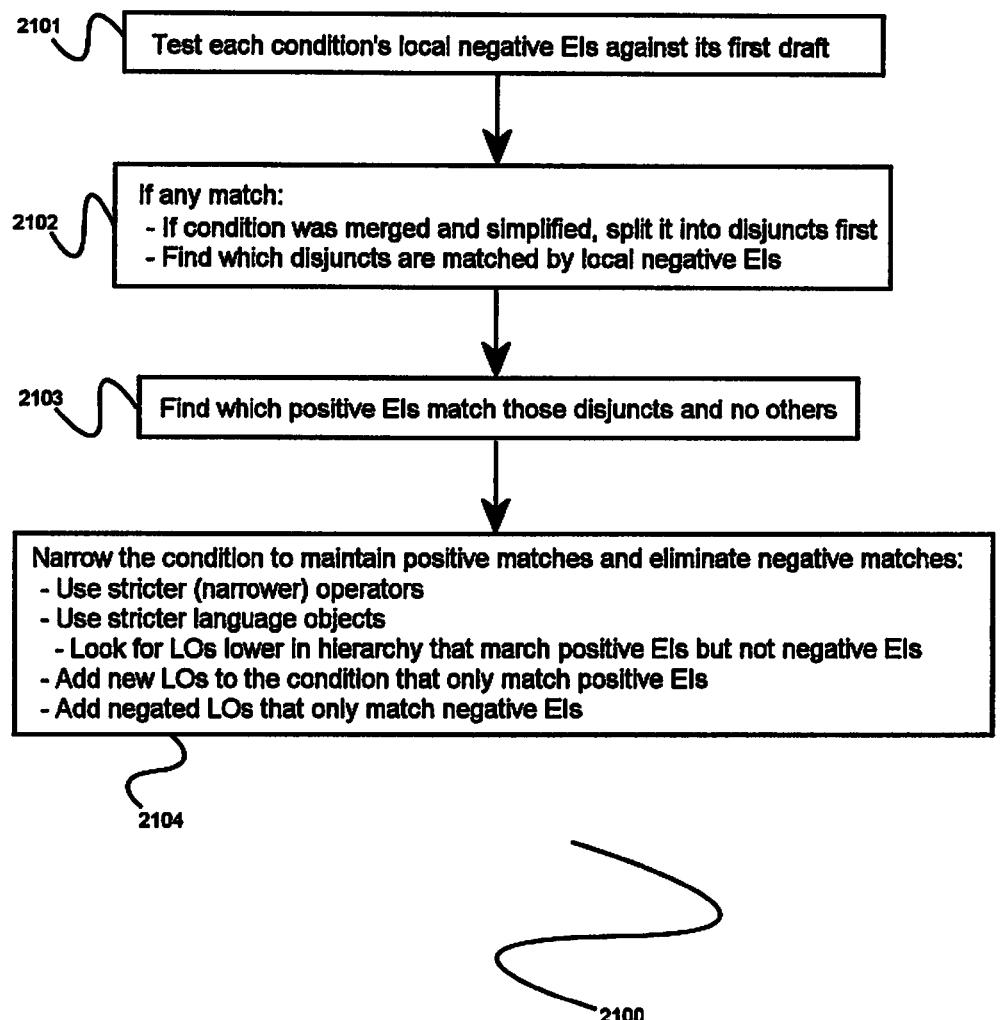
FIG. 21 is a process flow diagram illustrating a method for using negative example inputs to refine a language recognition rule, according to an embodiment of the invention.

FIG. 21 is a process flow diagram illustrating a method 2100 for using negative example inputs to refine a language recognition rule, according to an embodiment of the invention. According to the embodiment, in step 2101 each condition's local negative EIs are tested against the condition's first draft to detect any matches against negative EIs. If any matches are detected, in step 2102 a set of disjuncts corresponding to matches negative EIs is determined. To do this, if the condition has been merged and simplified, it is split it disjuncts first. Then, a determination is made as to which of the resulting disjuncts are matched by local negative EIs. In step 2103 a determination is made as to which positive EIs match the disjuncts identified in step 2102 and no others. Finally, in step 2104 an attempt is made to make the condition stricter so that it doesn't match any corresponding negative EIs but does still match the positive EIs, using the following steps:
  a. Use stricter operators (directly followed by instead of followed by etc.).
  b. Use stricter LOs (check which words each LO matches in the negative and in the positive inputs, and test if there are any smaller/lower-in-hierarchy LOs that match the same words, but only the positive EIs).
  c. Add new LOs to the condition that only match the positive EIs.
  d. Add negated LOs that only match the negative EIs.

Figure 22:
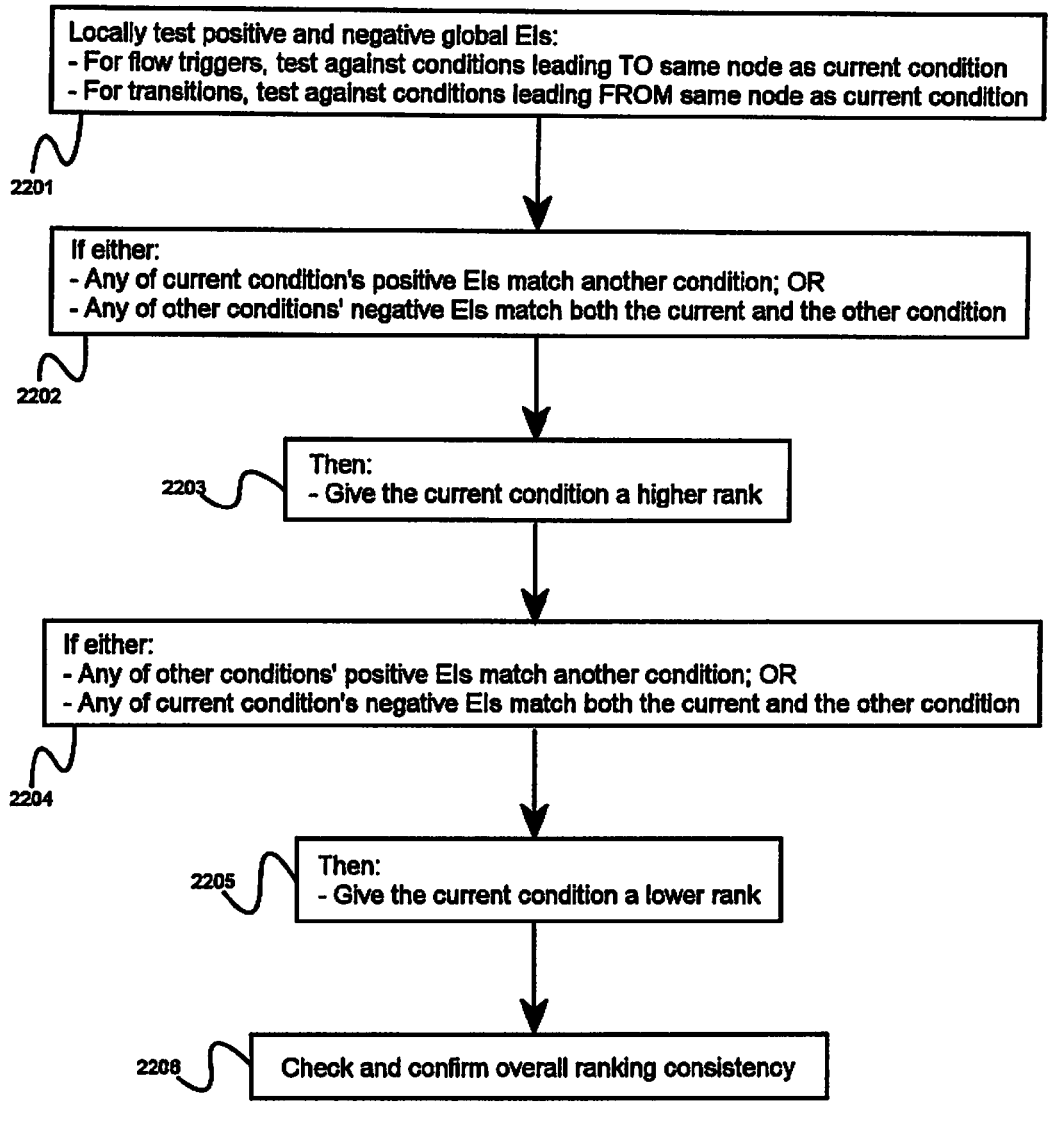
FIG. 22 is a process flow diagram illustrating a method for using local context to refine a language recognition rule, according to an embodiment of the invention.

FIG. 22 is a process flow diagram illustrating a method 2200 for using local context to refine a language recognition rule by automatic reranking, according to an embodiment of the invention. According to the embodiment, in step 2201 positive and negative global EIs are locally tested on (matched against) all conditions to (if flow triggers) or from (if transitions) the same node as the current condition. In step 2202, if either (a) any of the current condition's positive EIs matches another condition (as well), or (b) any of another condition's negative EIs match both the current and the other condition, then in step 2203 give the current condition higher rank. In step 2204, if either (a) any of another condition's positive EIs matches the current condition (as well), or (b) any of the current condition's negative EIs match both the current and another condition, then in step 2205 give the current rule lower rank. Finally, in step 2206, check and confirm overall ranking consistency.

Figure 23:
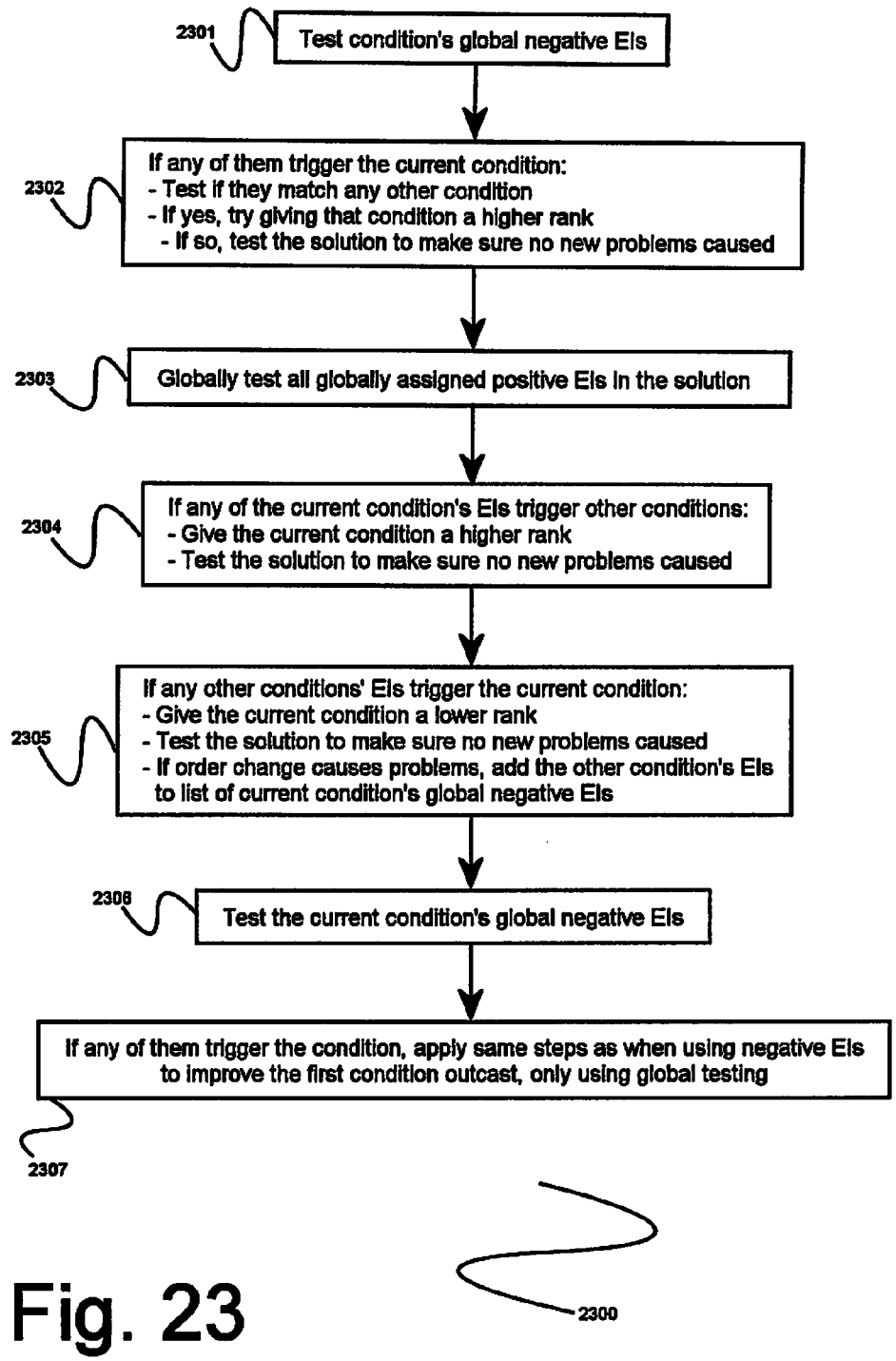
FIG. 23 is a process flow diagram illustrating a method for using global context to refine a language recognition rule, according to an embodiment of the invention.

FIG. 23 is a process flow diagram illustrating a method 2300 for using global context to refine a language recognition rule by automatic reranking, according to an embodiment of the invention. According to the embodiment, in step 2301 test the condition's global negative EIs. In step 2302, if any of them trigger the current condition: (a) test if they match any other condition, and (b) if yes, try giving that condition higher rank, and then test the resulting solution to make sure no new problems (i.e. wrong triggers caused by the ordering change) were caused. In step 2303, globally test (i.e., trigger) all globally assigned positive EIs in the solution. If any of the current condition's EIs trigger other conditions, then in step 2304 (a) give the current condition higher rank, and (b) test the resulting solution to make sure no new problems (i.e. wrong triggers caused by the ordering change) were caused. If any of the other conditions' EIs trigger the current condition, then in step 2305, give the current condition lower rank, and test the solution to make sure no new problems (i.e. wrong triggers caused by the ordering change) were caused. If an ordering change causes other problems, add the other condition's EIs (in the background, temporarily) to the list of the current condition's global negative EIs. Then, in step 2306, repeat the test of the condition's global negative EIs. If any of them trigger the condition, in step 2307 apply the same steps as when using negative EIs to improve the first condition draft, only with global instead of local testing.

Figure 24:
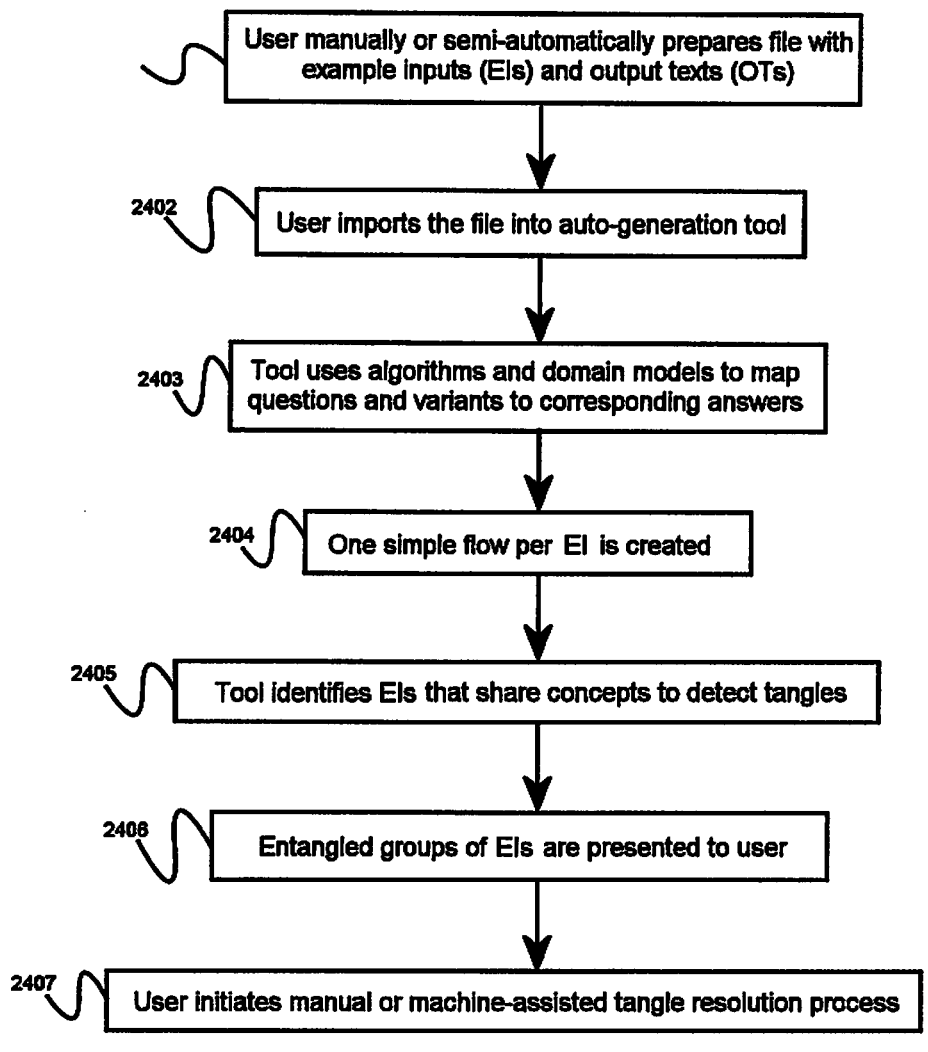
FIG. 24 is a process flow diagram illustrating a method for creating concept nets from bulk loaded text data, according to an embodiment of the invention.

FIG. 24 is a process flow diagram illustrating a method 2400 for automatically finding rule ambiguity by creating concept nets from structured input data, according to an embodiment of the invention. According to the embodiment, in step 2401 a user prepares one or more files comprising sets of examples inputs (EIs) and corresponding output texts (OTs) (or obtains such EIs and OTs from an automated clustering process). In step 2402 the user imports the one or more files into an automatic code generation tool (or files may be automatically imported by the system). In step 2405 the automatic code generation tool uses algorithms and domain models to map questions and variants (EIs) to corresponding responses. Accordingly, in step 2404, one simple flow per EI/OT pair is created. While automated code generation tools will significantly improve the productivity of natural language interaction application development, there will always be some issues that may be irresoluble automatically. For example, a user could submit a question with text, "I want to buy a ticket" and another with text, "I want to buy a ticket online", where the second one is a more specific request of the first one and might require another language recognition rule and another rank. On the other hand, a hypothetical keyword question "book" (with answer, "We do not sell or rent books on our flights, so you have to bring your own if you like reading") doesn't have any relation to the question, "I want to book a flight", and the two would optimally be coded independently, avoiding any overlapping. The difference between these two (and many other similar cases) could be very difficult to identify automatically, which is why users will sometimes need to point automated code generation tools in the right direction. Accordingly, in step 2405 the tool may identify EIs (and possibly OTs as well) that share certain concepts, and check if they work as supposed, or if indeed there is any incorrect triggering (e.g., a question receives a wrong answer). If the latter is the case, then the tool will have identified what may be referred to as a "tangle". When entangled groups of EIs are presented in step 2406, a user and an automated code generation tool may guide each other through an iterative process of condition structuring and disambiguation in step 2407.

Figure 25:
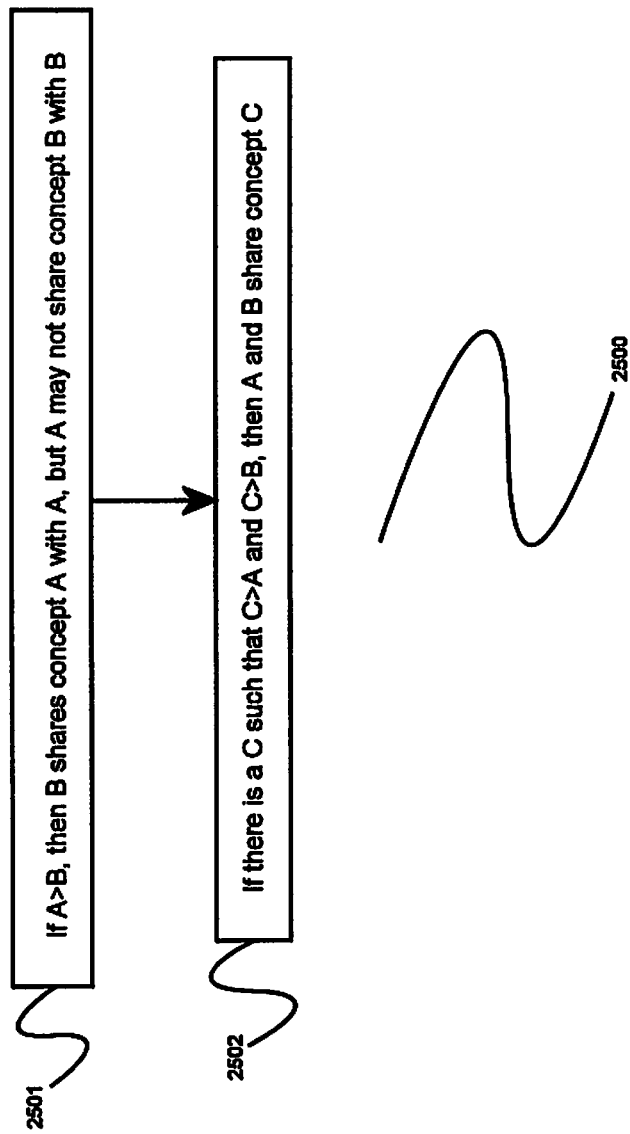
FIG. 25 is a process flow diagram illustrating a method for determining whether two concepts are related, according to an embodiment of the invention.

FIG. 25 is a process flow diagram illustrating a method 2500 for determining whether two concepts (A and B) are related, according to an embodiment of the invention. According to the embodiment, in step 2501 a comparison is made to determine if A>B; if so, then B shares concept A with A, but A may or may not share concept B with B. Similarly, in step 2502 a check is made to determine if there is a condition C such that C>A and C>B; if so, then A and B each share concept C. It will be appreciated that other similar means of automatically identifying relationships between two or more concepts may be used according to the invention, taking advantage of logical formalisms known to those having ordinary skill in the art.

Figure 26:
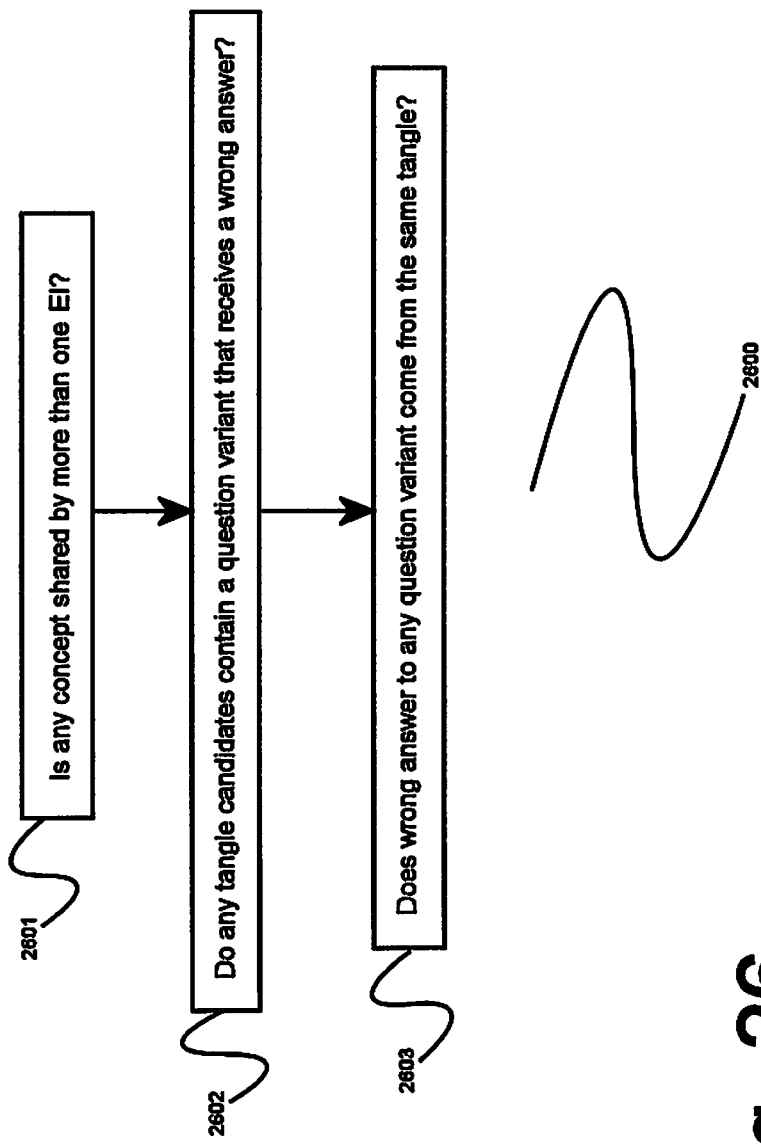
FIG. 26 is a process flow diagram illustrating a method for recognizing tangle conditions in a set of language recognition rules, according to an embodiment of the invention.

FIG. 26 is a process flow diagram illustrating a method 2600 for recognizing tangle conditions in a set of language recognition rules, according to an embodiment of the invention. According to the embodiment, and by way of non-limiting example, assume we have a knowledge base as follows:

| Input | Response | Condition |
|-------|----------|-----------|
| EI1 | R1 | A + B |
| EI2 | R2 | A + C |
| EI3 | R3 | B | that gives the following test results:

| Input | gets | Response |
|-------|------|----------|
| EI1 | | R3 |
| EI2 | | R2 |
| EI3 | | R3 |

Clearly there is a problem, since input EI1 does not trigger the condition that would give the response R1 as expected, thus requiring an automated means of detecting the problem and identifying an underlying cause so that the cause may be automatically corrected or at least brought to the attention of a user if automatic correction is impossible. Accordingly, in step 2601 a check is made whether any concept is shared by more than one input/response pair in a relevant knowledge base. In the example under discussion, the answer to this is YES, since concepts A and B are shared by two input/response pairs each, creating two tangle candidates:

| Shared concept | Pairs that share it | Their conditions |
|----------------|---------------------|------------------|
| A | Pair 1 | A + B |
| | Pair 2 | A + C |
| B | Pair 1 | A + B |
| | Pair 3 | B |

Next, in step 2602, a check is made to determine if any tangle candidates contain a question variant that receives an incorrect answer. Again, the answer here is YES, since both tangle candidates contain EI1, which receives R3 (an incorrect response). Then, in step 2603, a check is made whether a wrong response to any input variant comes from the same tangle? Here the answer is NO for the tangle candidate sharing the concept A, since it comprises Pair 1 and Pair 2, neither of which correctly generates R3. On the other hand, the answer is YES for the tangle candidate sharing the concept B, since Pair 3 does correctly generate R3. These results localize the problem to the following tangle:

| Input | Response | Condition |
|-------|----------|-----------|
| EI1   | R1       | A + B     |
| EI3   | R3       | B         |

Figure 27:
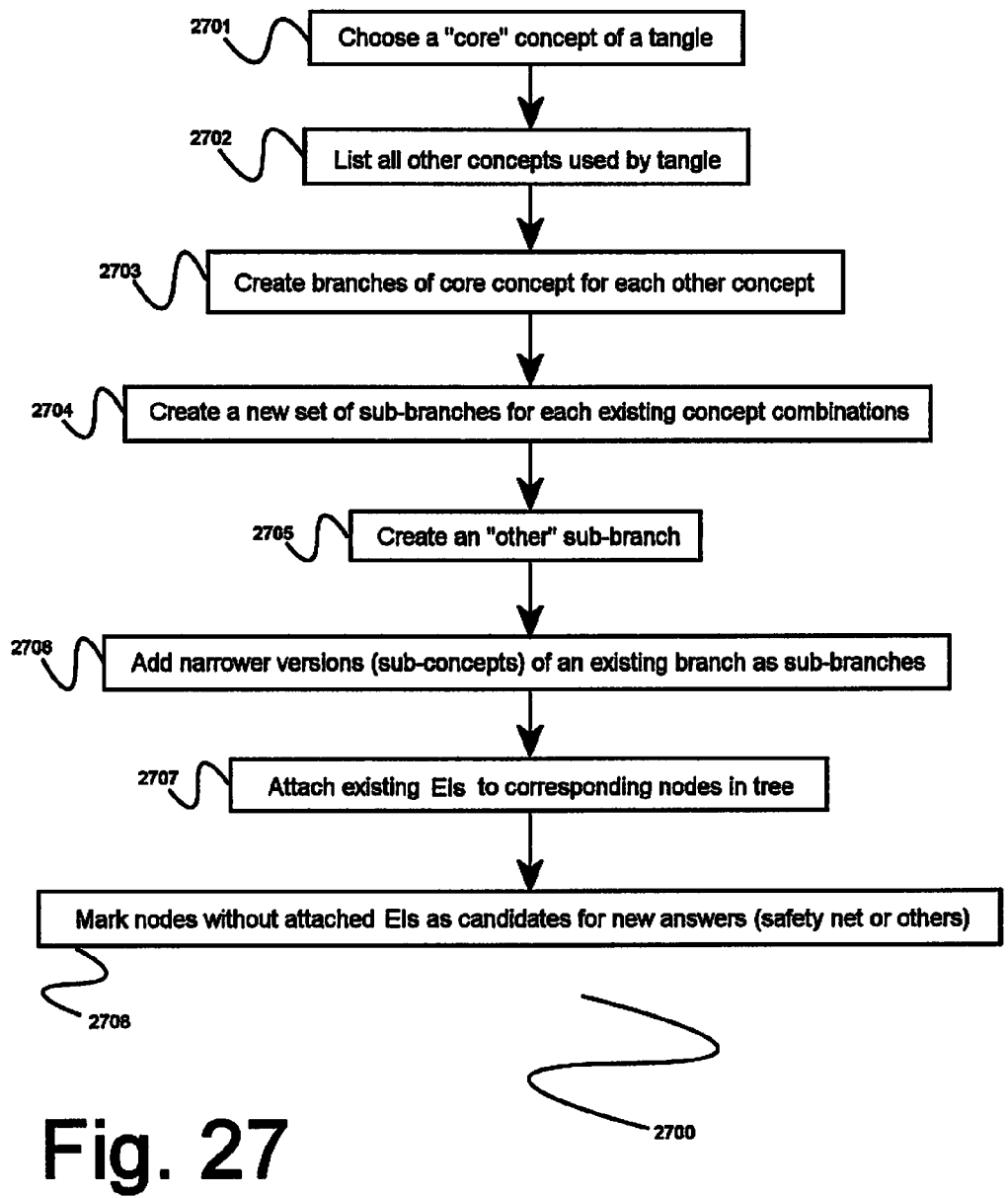
FIG. 27 is a process flow diagram illustrating a method for expanding a tangle in a set of language recognition rules, according to an embodiment of the invention.

Once a tangle that causes a problem has been identified, the general approach is for an automated coding tool according to the invention to expand the tangle candidate so that a user can obtain a good overview of the problem, and can perform a series of actions to convert the expanded tangle to a well-formed complex flow (i.e., one without a tangle). Accordingly, FIG. 27 is a process flow diagram illustrating a method 2700 for expanding a tangle in a set of language recognition rules, according to an embodiment of the invention. According to the embodiment, in step 2701 a specific tangle is chosen, (i.e. a concept (or concepts) is (are) shared by all EIs in the tangle). Then, in step 2702, all other concepts used by the tangle's EI recognitions are listed. In step 2703, branches of the core concept are created for all other concepts. In step 2704, a new set of sub-branches for all existing (among the input/response pairs) concept combinations is created, as well as an additional "other" sub-branch (in step 2705). In step 2706, more narrow versions (sub-concepts) of an existing branch are added as sub-branches of each other, rather than as separate, parallel branches. In step 2707, existing EIs may be attached to corresponding nodes in the tree, and in step 2708 any nodes without a corresponding EI are marked (for example, using a question mark) as candidates for new (safety net or other) responses that might improve input coverage of the system (so they can be reviewed as such by a user).

Figure 28:
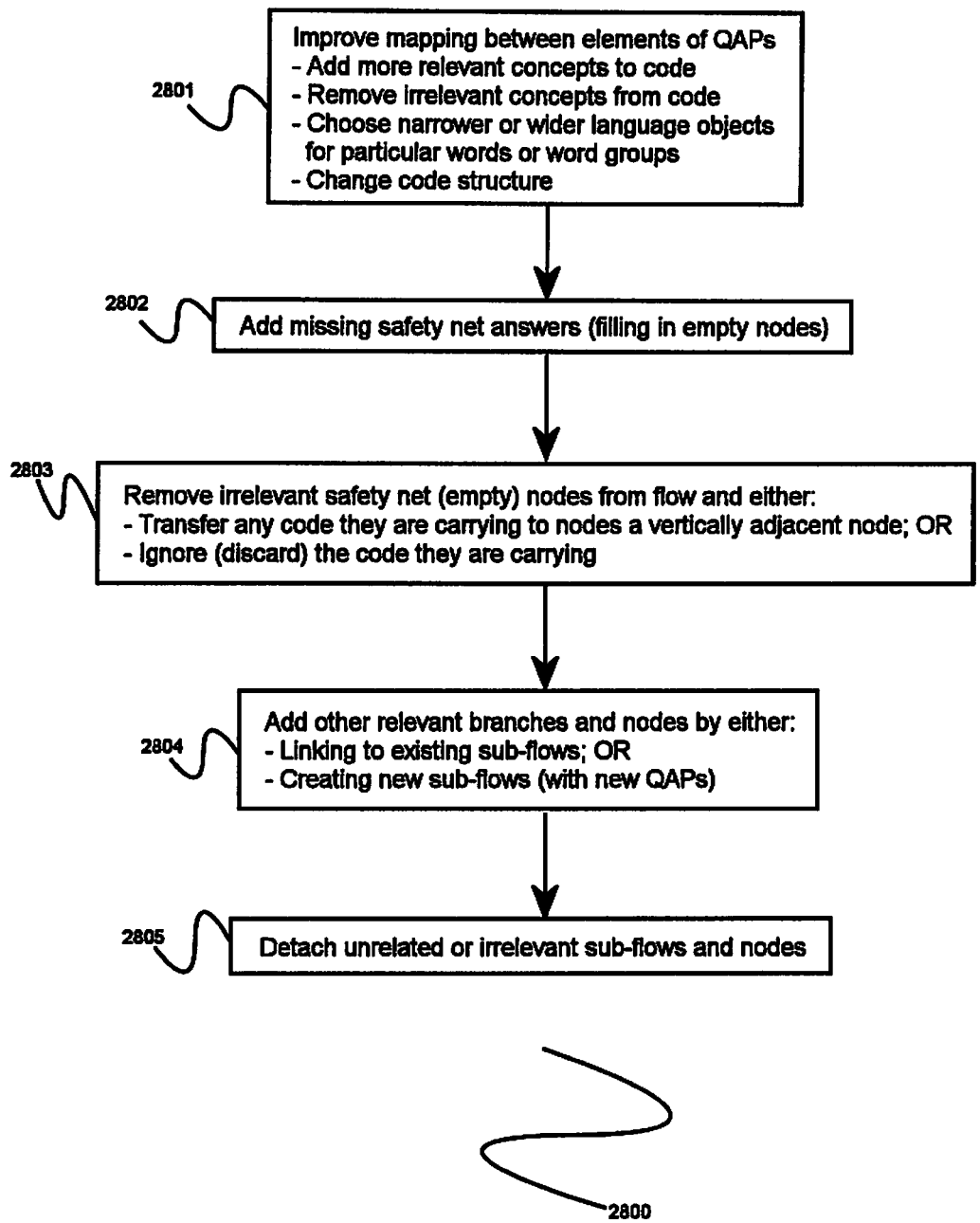
FIG. 28 is a process flow diagram illustrating a method for converting an expanded tangle into a well-formed complex language recognition rule, according to an embodiment of the invention.

FIG. 28 is a process flow diagram illustrating a method 2800 for converting an expanded tangle into a well-formed complex language recognition rule, according to an embodiment of the invention. According to the embodiment, identified tangles are presented to a user, and the user may then carry out method 2800 to untangle them and to convert them into well-formed flows. Specifically, in step 2801 the user improves a mapping (i.e., the code) between individual questions and answers by one or more of: (a) adding more relevant concepts to the code; simultaneous creation of related language objects (macros) is supported; (b) removing irrelevant concepts from the code; (c) choosing more precise or wider language objects related to a certain word (for example, by choosing one of language objects available in a drop-down list); and (d) changing code structure (for example, by rearranging "puzzle pieces" or graphical tokens, changing links between flows and/or operators between them, and so forth). In step 2802, the user may add missing safety net answers (for example, by filling in empty nodes in a proposed complex flow). In step 2803, the user may remove irrelevant safety net (empty) nodes from the complex flow and either transfer the code (condition) they carry carrying to nodes below or above the empty node in the flow hierarchy, or ignore or discard the code they carry. In step 2804, the user may add other relevant branches and nodes by either linking to existing subflows or creating new subflows (with new questions and answers). Finally, in step 2805 the user may detach unrelated or irrelevant subflows (by defining them as separate, independent flows) or nodes (by transferring their branches/subflows to the node above, or making them independent flow, if the removed node was the top one). Of course, each of the actions that may be taken as part of method 2800 may impact the structure and/or the content of a plurality of tangles and other nodes or flows.

Figure 28A:
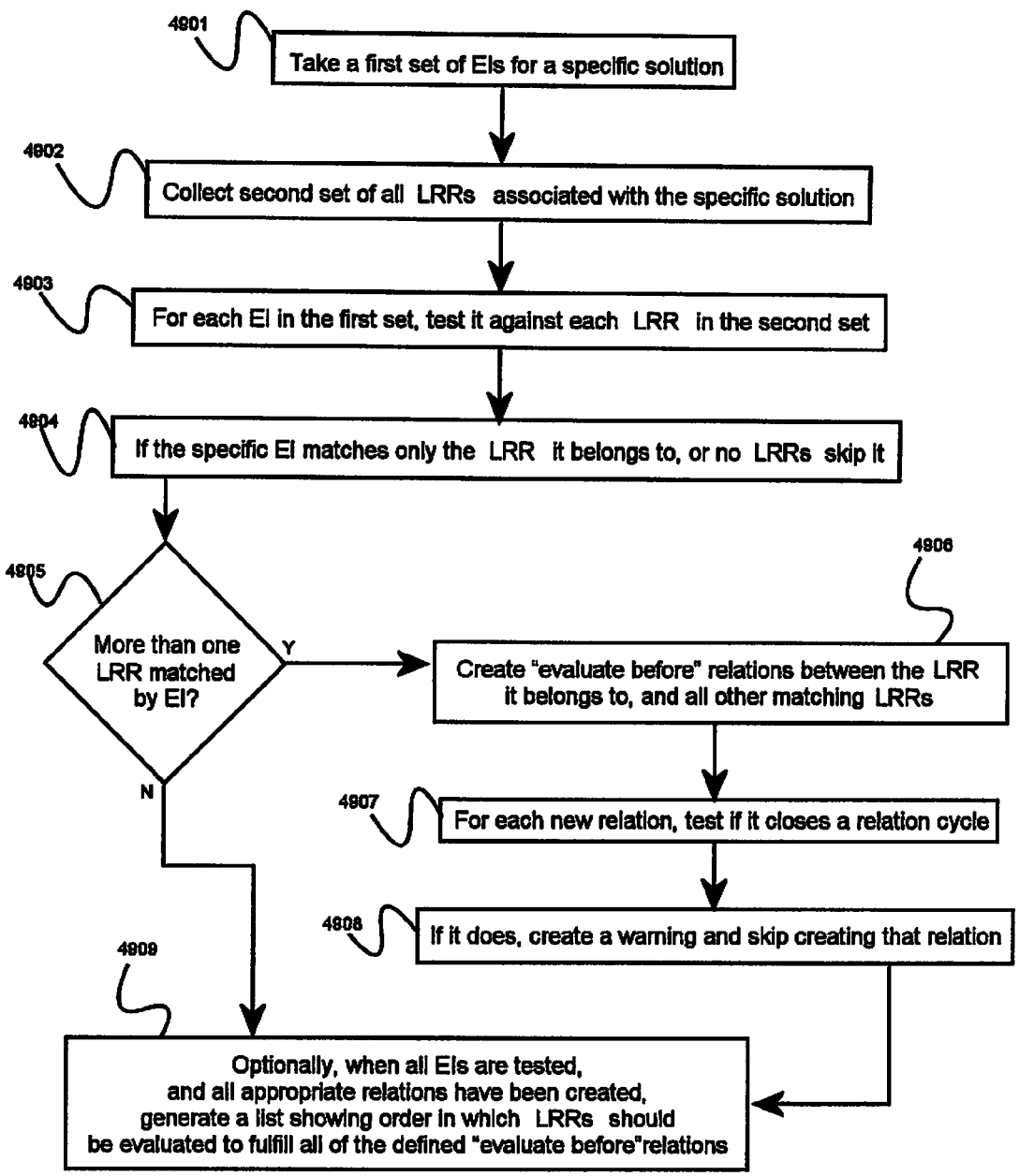
FIG. 28A is a process flow diagram illustrating a method for automated ranking of triggers in natural language interaction applications, according to an embodiment of the invention.

FIG. 28A is a process flow diagram illustrating a method 4900 for automated ranking of language recognition rules or triggers (or both) in natural language interaction applications, according to an embodiment of the invention. According to the embodiment, in step 4901 a first set of EIs for a specific solution is obtained. Then, in step 4902, a second set, of all language recognition rules (LRRs) associated with the specific solution, is obtained. Then, in step 4903, each EI in the first set is tested against each LRR in the second set (to see if it causes the LRR to fire). In step 4904, if the specific EI tested only matches the LRR it belongs to (see ¶[079]), it is skipped and execution returns to step 4903. Otherwise, in step 4905, a check is made whether more than one LRR is matched by the EI being tested. If yes, then in step 4905 an "evaluate before" relation is created between the LRR it belongs to, and all other matching LRRs (so that the correct LRR, to which it belongs, is matched by the EI in actual operation). In step 4907, each relation is tested to see whether it closes a relation cycle—that is, (A evaluate before B evaluate before . . . evaluate before A)—and, if so, in step 4908 a warning is created and creation of the offending (cycle closing) relation is skipped, and execution resumes with step 4909. If the test of step 4905 fails, then execution also passes to step 4909. In step 4909, optionally, when all EIs are tested, and all relations created, a list that shows in which order the LRRs should be evaluated to fulfill all of the defined "evaluate before" relations may be generated. In some embodiments, automated ranking may be performed on a set of unranked language recognition rules (LRRs), and a (possibly empty) set of already ranked LRRs (whose rank cannot be changed). Scopes of two LRRs are in this case compared by testing which LRR's EIs belonging to each LRR match, but could be replaced with another method of scope comparison, without influencing the rest of the embodiment of this invention. Each EI belonging to an unranked LRR may be tested against all other LRRs (or "each unranked LRR's scope is compared all other LRRs' scopes"). If the specific EI only matches the LRR it belongs to (if the specific LRRs scope doesn't overlap with any other LRRs' scope), it is skipped. Otherwise, an "evaluate before" relation is created before the LRR the specific EI belongs to (before the specific LRR) and all other LRRs it matches (and all other LRRs with overlapping scope).

Figure 29:
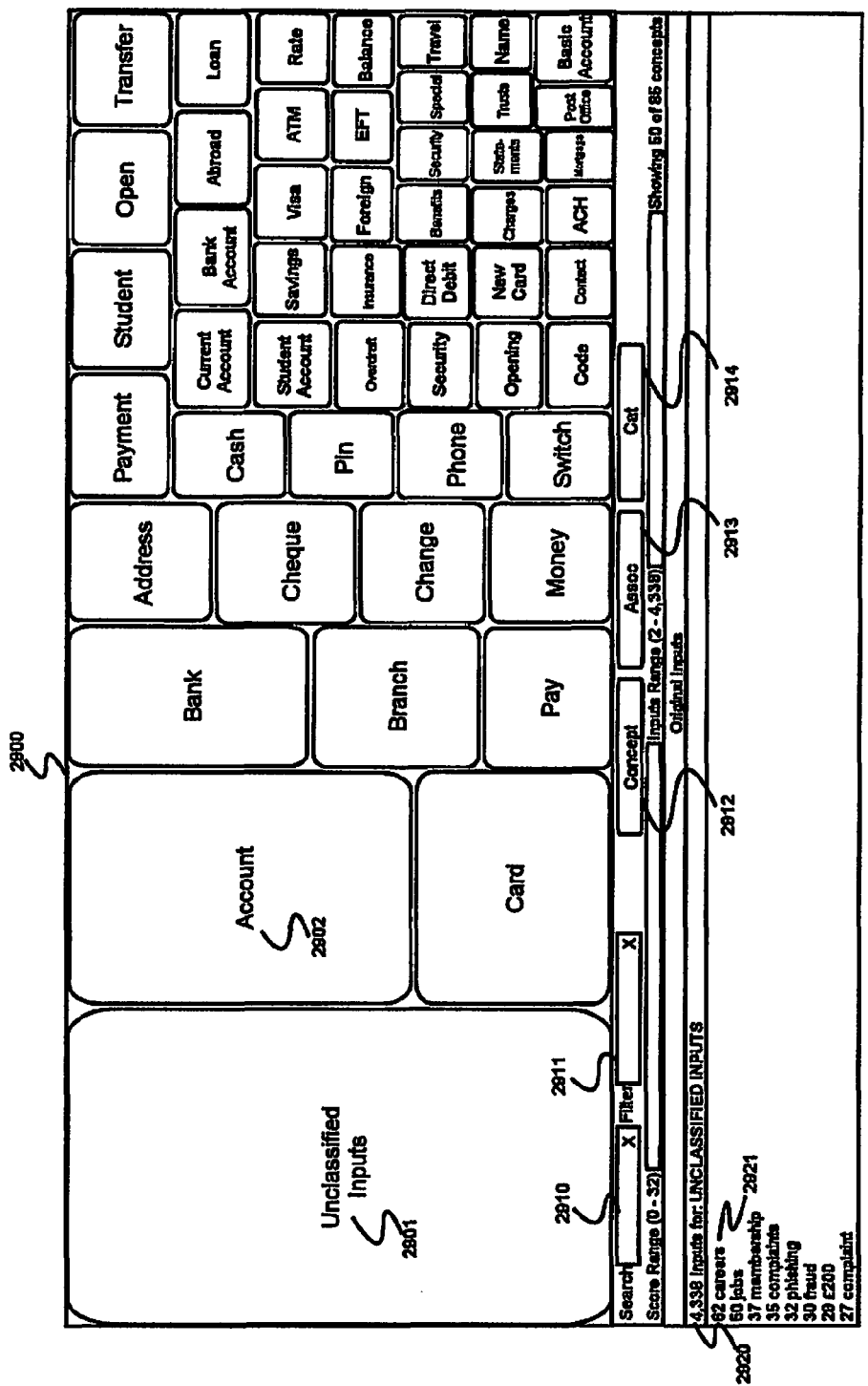
FIG. 29 is a diagram of an exemplary screen for visualizing distribution of concepts present in a natural language corpus, according to an embodiment of the invention.

FIG. 29 is a diagram of an exemplary user interface screen 2900 for visualizing distribution of concepts present in a natural language corpus, according to an embodiment of the invention. According to the embodiment, entities from a corpus of unstructured interactive texts—for example a large sample of logged conversations between customers and customer service agents (through live chat service or transcribed phone conversations), customer service emails or filled email forms, FAQs, search queries on a web page or the logged conversations between a natural language interaction application, such as a virtual assistant, and users—are automatically clustered and grouped into a plurality of concepts. These entities, hereby called user inputs, may be user/customer inputs in conversations with human agents or virtual assistants, FAQs, search queries, emails or subsets of emails (e.g. sentences or paragraphs) or other textual entities. These entities may be automatically clustered using any unsupervised clustering techniques known in the art, such as hierarchical clustering, k-means clustering, latent semantic indexing, statistical language modeling, and the like, into groups based on some similarity measure. Natural language processing techniques such as normalization, spelling correction, stemming or lemmatization and synonym detection can be used to improve the clustering by canonicalizing tokens so that words are considered similar despite typed differences. In some embodiments, canonicalization may benefit from use of a language object library by substituting word sequences for lower-level language objects by (for example) identifying word forms of a specific single lemma as the same language object or by identifying synonym (SYN) language objects. However, the embodiment is not dependent on using a language object library in any sense, and is able to identify unknown concepts without any knowledge about a language and its words (by identifying commonly occurring clusters of words or word groups). Each cluster or group is represented as a concept. Each specific concept may be comprised of a plurality of textual inputs that are associated with the specific concept (either manually or via automated clustering). Concept names may be determined automatically based on common or representative words that are present in the plurality of user inputs making up a cluster; the concept name may consist of a single word or a word sequence. According to the invention, any user input may be assigned to a plurality of concepts, if clustering means capable of handling overlapping clusters are used. Each concept has a calculated size based on a number of user inputs related to it. This size may be interpreted as a frequency of that concept. This frequency measure may guide users in the process of building a natural language interaction application such as a virtual assistant, indicating for example various user input groups that may be most representative of inputs the virtual assistant will get when launched. The frequency measure may therefore be used as clear guidance of how to prioritize implementation effort when building a virtual assistant (or other natural language interaction application). According to the embodiment, a plurality of identified concepts may be graphically displayed in various manners, represented by assigned concept names (which may be changed by users as desired). In this way, results of concept clustering may more easily be interpreted by a designer, developer, or other user. In some embodiments, coloring of visualized concepts may be used to show, for example, hierarchical relations between concepts (e.g. that "bank account" and "account" are related).

Accordingly, a plurality of identified concepts 2902, such as "account", "card", "branch", and so forth, may be displayed in for example a tree map visualization as rectangles in an upper part of screen 2900 along with a similar rectangle 2901 labeled "unclassified inputs" and representing user inputs that were not considered similar enough to any other inputs in order to fall into a cluster group (and which may require manual assignment). In some embodiments, the size of each rectangle corresponds to a relative number of inputs that matched the applicable concept so that larger rectangles represent more prominent or frequently occurring concepts.

Figure 30:
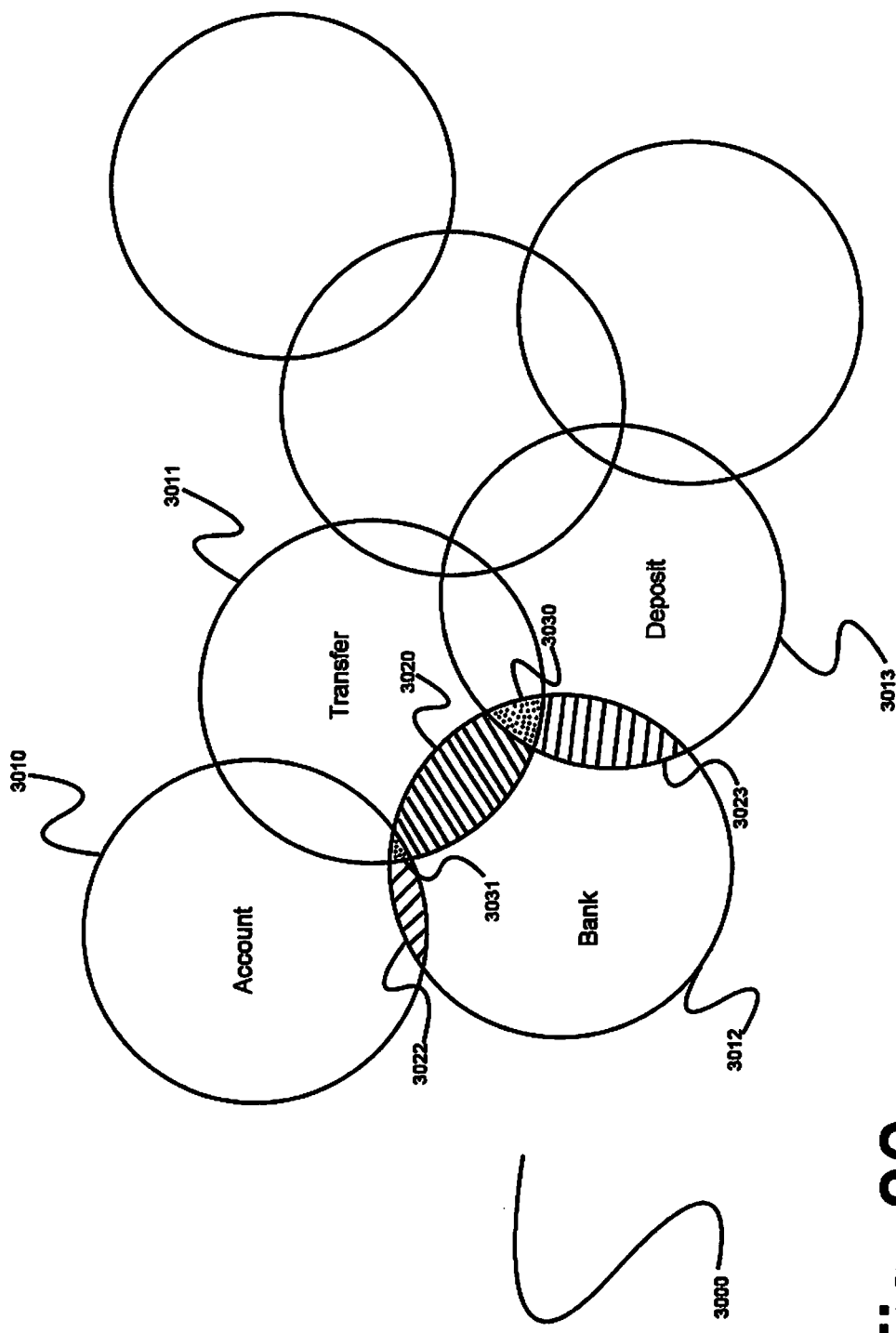
FIG. 30 is a diagram illustrating the relationship between concepts and associations in a natural language corpus, according to an embodiment of the invention.

According to the embodiment, more precise clusters can be created automatically by finding co-occurrences of concepts, which are referred to as associations (see discussion pertaining to FIG. 30).

According to the embodiment, various user interface elements may be provided to assist a user in concept assignment and analysis of semantic concepts of a corpus (or a plurality of corpora). For example, a search bar 2910 may be provided to allow a user to enter a text string comprising one or more words or word fragments, so that a user may query via screen 2900 to identify all concepts associated with a given word (a concept is associated with a word in this sense when at least one input comprising the word is present in the set of inputs that have been assigned to the concept). Similarly, a filter bar 2911 may be presented to allow a user to filter concepts in an analogous way, so that only concepts that contain one or more elements from a text string entered in filter bar 2911 will be displayed (thus, if "account" were entered in filter bar 2911, only concepts such as "Account", "Bank Account", "set savings account", and the like would be displayed). Buttons for viewing concepts 2912, associations 2913, and categories 2914 may also be provided, so that a user can easily switch between related views that may be provided (FIG. 29 illustrates an example of a concepts 2912 view). An input details box 2920 may be provided to provide easy viewing of a range of concepts, and then may easily browse through all of the inputs that comprise any concept of interest (or a plurality of selected concepts, as in most embodiments screen 2900 will support multiple selections via common user interface conventions such as control-click). For example, input details box 2920 is shown for a situation where "Unclassified Inputs" 2901 is selected, and informs a user (in a status bar that acts as a header for input details box 2920) that there are in this case 4,338 inputs for the concept "Unclassified Inputs". Input details box 2920 generally illustrates a selection of inputs associated with a selected concept (or set of concepts) such as, for example, an input 2921 of "careers", of which 62 instances were present in the corpus (or plurality of corpora) being analyzed. Various optional sliders or other elements may be present to allow a user to easily "zoom in" or "zoom out" or otherwise "navigate the data", for instance by varying a total number of concepts to be shown in a given mosaic view display, or by limiting a frequency range of concepts to be displayed. Furthermore, in most embodiments various context-sensitive commands are available by selecting or clicking on various elements of screen 2900. For example, a user might right click on a concept, or select a plurality of concepts and then, while they are selected, right click one of the selected concepts, in order to bring up a context-sensitive menu that provides various actions that may be taken by the user with respect to those concepts. Similarly, one or more inputs 2921 may be selected, and then a user may right click to activate a context sensitive menu that provides input-relevant functions, including assigning an input to a concept or viewing a plurality of inputs directly in their raw form in order to better understand an actual conversational context in which the input was received. It will be appreciated by one having ordinary skill in the art that the user interface conventions illustrated in FIGS. 29-33 are exemplary of various ways that a user may be provided intuitive means to explore a natural language interaction application under development, and its associated inputs, outputs, language recognition rules, and the like; moreover, it will be appreciated that any number of other user interface techniques known in the art may be used according to the invention as well.

FIG. 30 is a diagram illustrating an exemplary set 3000 of relationships between concepts and associations in a natural language corpus, according to an embodiment of the invention. Among the concepts present in set 3000 are "Account" 3010, "Transfer" 3011, "Bank" 3012, and "Deposit" 3013. Clearly these three concepts are closely related (at least, when for example "Bank" refers to lemma "Bank—financial institution" and not to lemma "bank—river bank"). These relationships can be seen graphically by various overlap regions, which represents conceptual overlap (or, more explicitly, they represent sets of inputs that belong to two or more concepts, or the unions of two or more concepts, where concepts are sets of inputs). For example, region 3022 illustrates a region where "Account" 3010 and "Bank" 3012 overlap (region 3031, which also overlaps with "Transfer" 3011, is also part of region 3022). This overlap, or intersection, between two concepts is referred to as an association. Thus region 3022 represents an association between "Account" 3010 and "Bank" 3012; region 3031 represents an association between "Account" 3010, "Bank" 3012, and "Transfer" 3011; region 3030 represents an association between "Bank" 3012, "Deposit" 3013, and "Transfer" 3011; and region 3023 represents an association between "Bank" 3012 and "Deposit" 3013. Furthermore, it should be evident that associations are derived deterministically from concepts, since each association represents a rigorous set-theoretic relationship between at least two concepts. In addition, the algorithm may also create some specific associations: single-concept associations (associations made up from one concept that turned out having no set-theoretic relationship with any other concept) and leftover associations: associations made up from the inputs of a concept that was not included in any intersection (not shared with any other concept), and the like. A third level of granularity may be provided, according to various embodiments of the invention, to facilitate user-generated groupings; this third level is referred to as categories. Generally, associations may be added manually to categories defined by a user. For example, a category "Account Maintenance" might be created, and associations such as "open account", "open savings account", "close checking account", and the like may be added to this category. According to the invention, any input may be assigned to a plurality of concepts, each concept may be part of several associations, and each association may be manually assigned to a plurality of categories to facilitate understanding or analysis.

Figure 31:
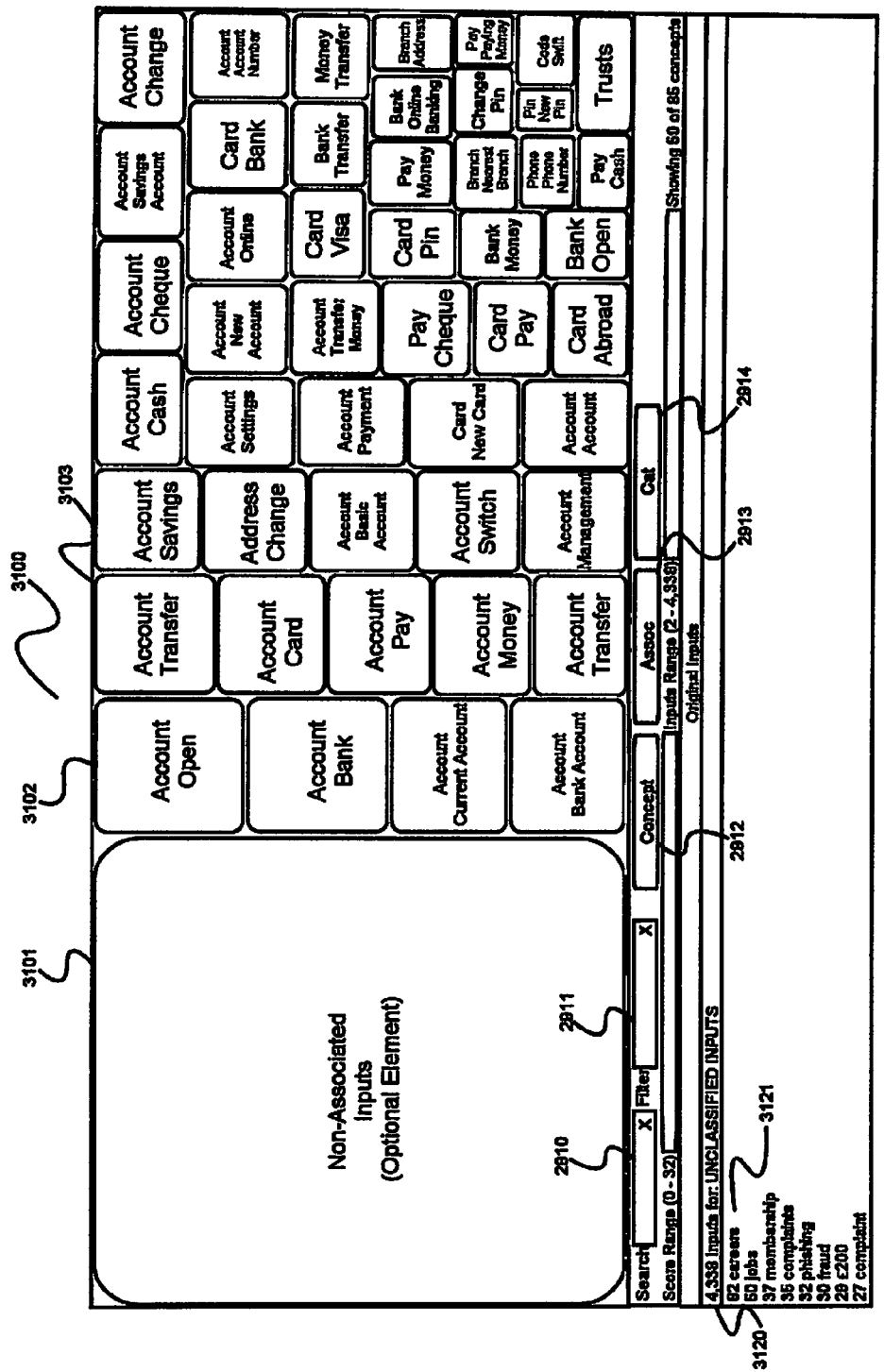
FIG. 31 is a diagram of an exemplary screen for visualizing associations present in a natural language corpus, according to an embodiment of the invention.

FIG. 31 is a diagram of an exemplary user interface screen 3100 for visualizing associations present in a natural language corpus, according to an embodiment of the invention. Similar in many ways to concept screen 2900, association screen 3100 may comprise a mosaic view, tree map visualization, pie chart view, bubble view, network view, and so forth, as well as various interface manipulation controls, and an input details box 3120. Various associations such as "Account Open" 3102, "Account Settings" 3103, and the like may be displayed in mosaic view, along with an optional tile for "Non-Associated Inputs" 3101 (that is, those inputs which are not members of any association, either because they are not members of any concept or because they are members of only one concept and hence not members of any association; non-associated inputs may be omitted from view 3100 in some embodiments). In some embodiments, association tiles may be color coded so that those associations whose name starts with a common concept, such as "Account" (note that associations are generally named by ordering concept names according to the size—number of inputs—of each concept), can be readily identified. As in the case of concepts screen 2900, associations screen 3100 may present input details 3121 in input detail box 3120 to facilitate analysis by users.

According to the embodiment, various user interface elements may be provided to assist a user in analysis of semantic associations of a corpus (or a plurality of corpora). For example, a search bar 2910 may be provided to allow a user to enter a text string comprising one or more words or word fragments, so that a user may query via screen 3100 to identify all associations related to a given set of words or word fragments (an association is related to a word in this sense when at least one input comprising the word is present in the set of inputs that have been assigned to at least one of the concepts that define the association). Similarly, a filter bar 2911 may be presented to allow a user to filter associations in an analogous way, so that only associations that comprise a text string entered in filter bar 2911 will be displayed (thus, if "Account" were entered in filter bar 2911, only associations such as "Account Balance", "Close Account", "Open Savings Account", and the like would be displayed). Buttons for viewing concepts 2912, associations 2913, and categories 2914 may also be provided, so that a user can easily switch between related views that may be provided (FIG. 31 illustrates an example of an associations 2913 view). An input details box 3120 may be provided to provide easy viewing of a range of actual inputs that are comprised by a selected association (or a plurality of selected associations, as in most embodiments screen 3100 will support multiple selections via common user interface conventions such as control-click). For example, input details box 3120 is shown for a situation where "Non-Associated Inputs" 3101 is selected, and informs a user (in a status bar that acts as a header for input details box 3120) that there are in this case 4,338 inputs for the concept "Non-Associated Inputs". Input details box 3120 generally illustrates a selection of inputs associated with a selected association (or set of associations), such as, for example, an input 3121 of "careers", of which 62 instances were present in the corpus (or plurality of corpora) being analyzed. Various optional sliders or other elements may be present to allow a user to easily "zoom in", or "zoom out", or otherwise navigate a natural language interaction application and its data, for instance by varying a total number of associations to be shown in a given mosaic view display, or by limiting a relevance range of associations to be displayed. Furthermore, in most embodiments various context-sensitive commands are available by selecting or clicking on various elements of screen 3100. For example, a user might right click on an association, or select a plurality of associations and then, while they are selected, right click one of the selected associations, in order to bring up a context-sensitive menu that provides various actions that may be taken by the user with respect to those associations. Similarly, one or more inputs 2921 may be selected, and then a user may right click to activate a context sensitive menu that provides input-relevant functions, including assigning an input to a concept or viewing a plurality of inputs directly in their raw form in order to better understand an actual conversational context in which the input was received.

Figure 32:
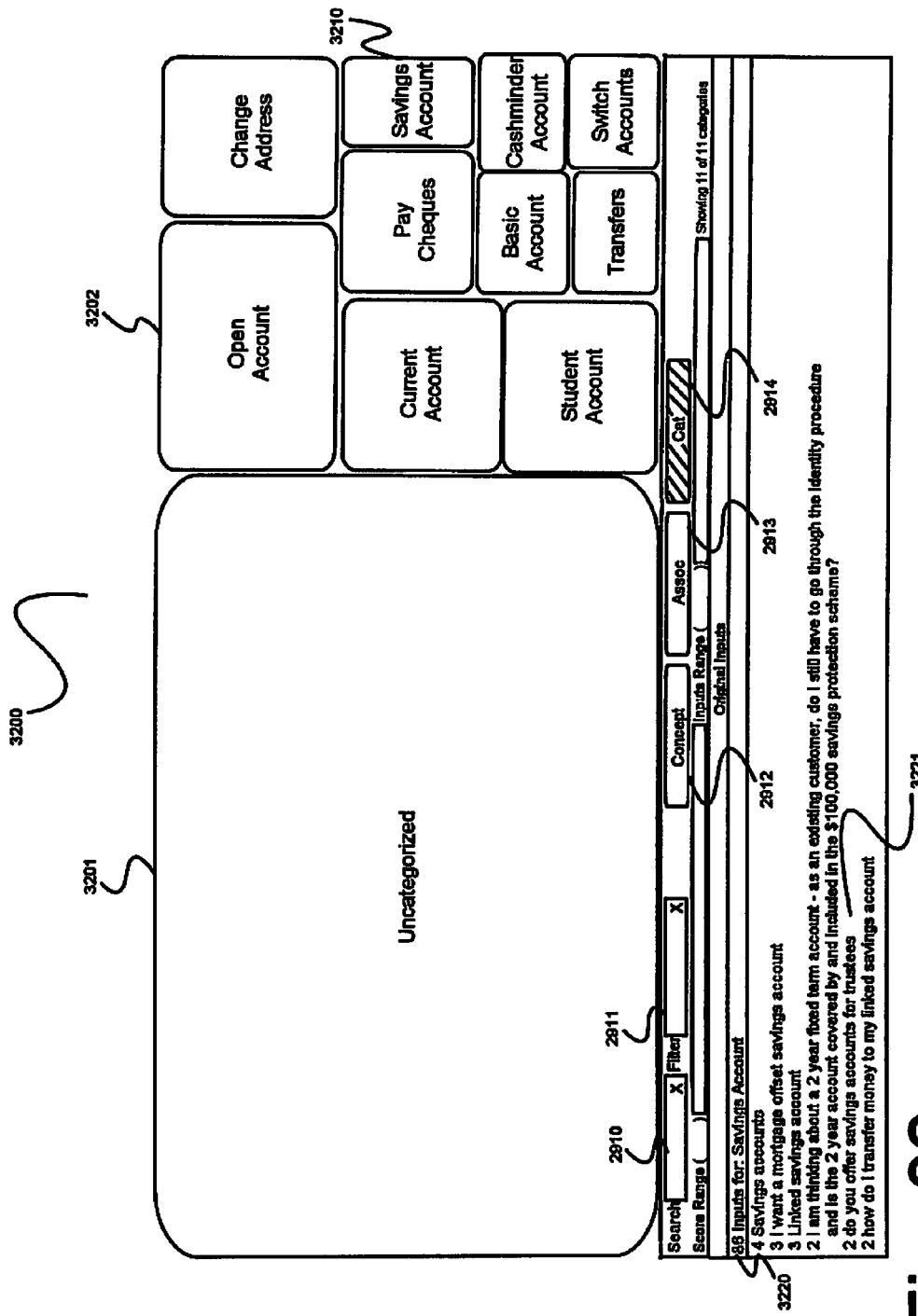
FIG. 32 is a diagram of an exemplary screen for visualizing categories present in a natural language corpus, according to an embodiment of the invention.

FIG. 32 is a diagram of an exemplary user interface screen 3200 for visualizing categories present in a natural language corpus, according to an embodiment of the invention. Similar in many ways to concept screen 2900, category screen 3200 may comprise a mosaic view, various interface manipulation controls, and an input details box 3220. Various categories such as "Open Account" 3202, "Savings Account" 3210, and the like may be displayed in mosaic view, along with a tile for "Uncategorized" 3201 (that is, those concepts or associations which are not members of any category, either because they are not members of any concept or because they are not members of any concepts or associations that have been categorized by a user). As in the case of concepts screen 2900, categories screen 3200 may present input details 3221 in input detail box 3220 to facilitate analysis by users.

According to the embodiment, various user interface elements may be provided to assist a user in analysis of semantic categories of a corpus (or a plurality of corpora). For example, a search bar 2910 may be provided to allow a user to enter a text string comprising one or more words or word fragments, so that a user may query via screen 3200 to identify all categories related to a given set of words or word fragments (a category is related to a word in this sense when at least one concept or association comprising the word is present in the set of inputs that have been assigned to at least one of the concepts or associations that in turn have been categorized as belonging to the category). Similarly, a filter bar 2911 may be presented to allow a user to filter categories in an analogous way, so that only categories that comprise a text string entered in filter bar 2911 will be displayed (thus, if "Account" were entered in filter bar 2911, only categories such as "Open Account", "Current Account", "Savings Account", and the like would be displayed). Buttons for viewing concepts 2912, associations 2913, and categories 2914 may also be provided, so that a user can easily switch between related views that may be provided (FIG. 32 illustrates an example of a categories 2914 view). An input details box 3220 may be provided to provide easy viewing of a range of actual inputs that are comprised by a selected category (or a plurality of selected categories, as in most embodiments screen 3200 will support multiple selections via common user interface conventions such as control-click). For example, input details box 3220 is shown for a situation where "Savings Account" 3210 is selected, and informs a user (in a status bar that acts as a header for input details box 3220) that there are in this case 86 inputs for the category "Savings Account". Input details box 3220 generally illustrates a selection of inputs associated with a selected category (or set of categories), such as, for example, an input 3221 of "do you offer savings accounts for trustees", of which two instances were present in the corpus (or plurality of corpora) being analyzed. Various optional sliders or other elements may be present to allow a user to easily "zoom in", "zoom out", or otherwise navigate the data, for instance by varying a total number of categories to be shown in a given mosaic view display (or any other data visualization techniques known in the art), or by limiting a relevance range of categories to be displayed. Furthermore, in most embodiments various context-sensitive commands are available by selecting or clicking on various elements of screen 3200. For example, a user might right click on a category, or select a plurality of associations and then, while they are selected, right click one of the selected categories, in order to bring up a context-sensitive menu that provides various actions that may be taken by the user with respect to those categories. Similarly, one or more inputs 2921 may be selected, and then a user may right click to activate a context sensitive menu that provides input-relevant functions, including assigning an input to a concept or viewing a plurality of inputs directly in their raw form in order to better understand an actual conversational context in which the input was received.

Figure 33:
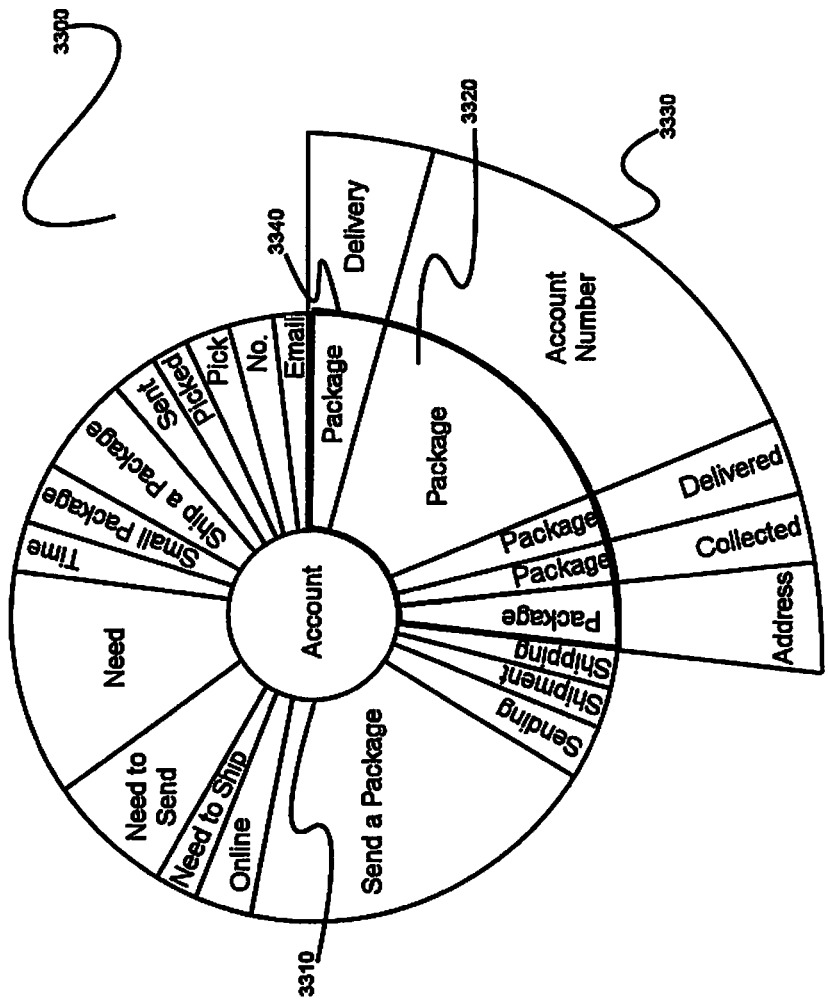
FIG. 33 is a diagram of a graphical element for visualization of relationships between concepts present in a natural language corpus, according to an embodiment of the invention.

FIG. 33 is a diagram of a graphical element 3300 for visualization of relationships between concepts present in a natural language corpus, according to an embodiment of the invention. Generally, element 3300 may be accessed from a concept screen 2900, an association screen 3100, or a category screen 3200 by selecting an appropriate concept, association, or category and from a context sensitive menu selecting an option such as "view starburst view", "view pie chart", by selecting a "view pie chart" or "view starburst view" menu option, or by selecting a pie chart or starburst view tab (of course, other user interface selection conventions known in the art may be used as well, without departing from the scope of the invention). Starburst chart 3300 generally starts with a circular view displaying a plurality of concepts that are related to a central concept (in this case, "Account" 3310). Other concepts are related to a central relationship when they are present in one or more associations with that central concept. Thus, in this example, concept "Package" 3340 is related to central concept "Account" 3310. In most embodiments, when a user mouses over any concept shown in pie chart 3300, she is presented with a pop-up, context-sensitive interface element that typically shows numerical and relational data regarding the concept (for example, its number of occurrences, and its membership in associations and their respective prevalence). Also, in a preferred embodiment a user may select a concept related to a central concept, thereby expanding the related concept with additional concepts that are related to it (other than the central concept to which its relationship is already established graphically). In the example shown, concept "Payment" 3340 was selected, and a second ring or pie subchart 3330 appeared, displaying concepts that are related to "Payment" 3340. For example, an association is seen to exist between concept "Package" 3320 (referring only to the wedge belonging to the association in question) and "Account Number". Thus, for example, a user viewing a concept screen 2900 might select the concept "Account" 2902, then select "view pie chart" to get pie chart 3300, then select concept "Package" 3340 to view expanded pie subchart 3330, thereby appreciating in an easy-to-use, intuitive, and graphical way the various relationships present between concepts, associations, and categories present within one or more corpora. Moreover, at essentially any point within the various screens shown in FIGS. 29-33, a user may select a plurality of concepts or associations and export them to a text file or a spreadsheet or to some other system grouped logically according to their category, concept, or association memberships. A user may also select a plurality of concepts or associations or a categories to use the inputs related to them as a group of EIs as input to the process of autocoding of language recognition rules according 4000 (FIG. 10F). From these screens, a user may also initiate the creation or editing of one or more language objects, language recognition rules, or other relevant objects needed to build natural language interaction applications, with the result that the screens shown in FIGS. 29-33, and the functions accessible via those screens, present a powerful analysis, visualization, and editing tool to enable natural language developers to rapidly discover relevant relationships among a large corpus of actual dialogs that may have occurred, for example, in a live agent chat application. By starting with such useful "real world" data, and analyzing it quickly and intuitively, a natural language interaction application developer may readily augment existing language or domain models to account for unexpected inputs. Moreover, the tools shown in these figures may be used to tune or refine a new or existing natural language interaction application as it is used. For example, after an initial period of use a developer might use these tools by starting with inputs 2901 from an existing natural language interaction application that were unrecognized or that triggered a safety net (for example, other cases are possible), which represent actual inputs from users that were not recognized by existing language recognition rules or that triggered unexpected or safety net rules, in order to quickly identify coverage gaps. Moreover, by periodically using these tools, a developer may be able to observe gradual or sudden changes in behavior of a natural language interaction application or its users. For instance, a new concept may suddenly appear (for instance, when a new product is launched that was not added to an existing natural language interaction application), or an existing minor concept may suddenly become very central to users (for instance, if an existing product suddenly begins to exhibit trouble at a higher rate than usual).

Various additional development tools and techniques are possible, according to the invention. For instance, in some embodiments language recognition rule tuning may be performed using cross-solution comparisons (that is, by combining or comparing language recognition rules from separate, but possible related, natural language interaction applications or solutions in order to ensure that improvements in individual natural language interaction applications may be leveraged in other applications). Such an approach may, for example, iteratively expand or reduce various rules' scope until an overall optimal triggering performance across multiple solutions is achieved.

In some embodiments, highly interactive semiautomated coding techniques for use in building natural language interaction applications may be provided to further assist developers in achieving best results in minimal time. Such techniques may include, but are not limited to:

- Highlighting words corresponding to individual parts of a language recognition rule (color coding may be used to clearly illustrate which words triggered which language recognition rules);
- Provision of a simple navigation tool for navigating various hierarchical levels of a language library, the tool comprising easy-to-use user interface elements to, for example, quickly move a language object to a different location;
- Graphical debugging and visualization of the precise operation of language recognition rules in order to facilitate quick, visual detection of improper rules;
- Automatic simplification of unnecessarily complex language recognition rules with automatic merging and splitting;
- Automatically identifying equivalent or overlapping language recognition rules, even when they appear quite different with the use of automatic merging, splitting and tangle identification;
- Integrating autocoding and optimization based on log data analysis, for instance by providing previewing of how a proposed change to a language recognition rule would affect responses given to for example yesterday's actual user inputs (enabling developers to discard inappropriate changes before publishing them);
- Assigning misunderstood user inputs and regenerating language recognition rules automatically to provide correct responses, with only a single user action such as a button click;
- Identifying probably problem causes by detecting undesired behavior (e.g., input/response loops, frequently interrupted flows, and the like) and user discontent (e.g. by detecting language indicating frustration, annoyance, dissatisfaction, and the like).

The skilled person will be aware of a range of possible modifications of the various embodiments described above. Accordingly, the present invention is defined by the claims and their equivalents.

What is claimed is:

1. A system for supervised automatic code generation and tuning for natural language interaction applications, the system comprising:
    a solution data repository component operating on a server computer and comprising a plurality of hierarchical ontological domain models and a plurality of hierarchical language models comprising a preconfigured, hierarchical arrangement of language objects, a plurality of language recognition rules expressed in terms of elements of the plurality of hierarchical language models;
    a build environment comprising a plurality of software modules stored or operating on a computer, the plurality of software modules comprising a developer user interface, a plurality of automatic text analysis tools, a plurality of automated coding tools, a plurality of automated testing and tuning tools, and a plurality of automated optimization tools; and
    an analytics framework software module operating on a server computer and adapted to receive and analyze a plurality of log files of natural language interaction sessions and a plurality of text corpora;
    wherein a plurality of text samples is assigned to a plurality of input groups based on semantic content, each input group comprising a plurality of semantically related inputs, where the assignment of the plurality of text samples into input groups is performed either with automatic clustering or manually;
    wherein for each of the plurality of input groups a plurality of language recognition rules, a plurality of language objects and a plurality of flow elements are automatically generated by the plurality of the automatic coding tools;
    wherein the plurality of automated testing tools carries out automated testing of the plurality of language recognition rules and generates a plurality of recommendations for tuning or correcting language recognition rules;
    wherein the analytics framework software module performs analysis of a plurality of log files of natural language interaction sessions between a plurality of users and a candidate natural language interaction application in order to identify problems in the candidate natural language interaction application; and
    wherein a plurality of optimizations to the candidate natural language interaction application is carried out by the optimization tools and an optimized natural language interaction application is deployed into production and stored in the solution data repository.

2. A method for supervised automatic code generation and tuning for natural language interaction applications, the method comprising the steps of:
    (a) importing, using an analytics framework software module operating on a server computer, a plurality of text samples into a build environment comprising a plurality of software modules stored or operating on a computer, the plurality of software modules comprising a developer user interface, a plurality of automated coding tools, a plurality of automated testing tools, and a plurality of automated optimization tools;
    (b) automatically assigning, using the analytics framework software module, a plurality of text samples to a plurality of input groups based on semantic content of the plurality of text samples, wherein the assignment is performed using automated clustering;
    (c) automatically generating, using at least one of the plurality of automated coding tools, a plurality of language recognition rules, a plurality of language objects and a plurality of flow elements for each of the plurality of input groups;
    (d) performing, using at least one of the plurality of automated testing tools, automated testing of language recognition rules generated in step (c);
    (e) automatically generating, using at least one of the plurality of automated optimization tools, based on results obtained in step (d), a plurality of recommendations for tuning or correcting language recognition rules;
    (f) providing the plurality of recommendations to a developer via the developer user interface;
    (g) deploying, using the plurality of optimization tools, a candidate natural language interaction application to a plurality of users;

(h) delivering log files of natural language interaction sessions of the plurality of users to an analytics framework software module operating on a server computer for analysis;
(i) performing analysis, using the analytics framework software module, of the log files to identify problems in the candidate natural language interaction application;
(j) carrying out, using the plurality of optimization tools, a plurality of optimizations to the candidate natural language interaction application; and
(k) deploying, using the plurality of optimization tools, an optimized natural language interaction application into production.

* * * * *